(12) United States Patent
Balapour et al.

(10) Patent No.: US 12,351,514 B2
(45) Date of Patent: Jul. 8, 2025

(54) LIGHTWEIGHT AGGREGATES PRODUCED FROM WASTE-COAL COMBUSTION ASH

(71) Applicant: Drexel University, Philadelphia, PA (US)

(72) Inventors: Mohammad Balapour, Philadelphia, PA (US); Yaghoob Farnam, Philadelphia, PA (US)

(73) Assignee: Drexel University, Philadelphia, PA (US)

( * ) Notice: Subject to any disclaimer, the term of this patent is extended or adjusted under 35 U.S.C. 154(b) by 644 days.

(21) Appl. No.: 17/729,039

(22) Filed: Apr. 26, 2022

(65) Prior Publication Data

US 2023/0110778 A1    Apr. 13, 2023

Related U.S. Application Data

(63) Continuation-in-part of application No. 17/469,945, filed on Sep. 9, 2021, now Pat. No. 11,345,634, which is a continuation of application No. PCT/US2020/056976, filed on Oct. 23, 2020.

(60) Provisional application No. 63/326,937, filed on Apr. 4, 2022, provisional application No. 63/004,032, filed on Apr. 2, 2020.

(51) Int. Cl.
    *C04B 18/08*     (2006.01)
    *C04B 111/40*     (2006.01)

(52) U.S. Cl.
    CPC ......... *C04B 18/084* (2013.01); *C04B 2111/40* (2013.01)

(58) Field of Classification Search
CPC .. C04B 18/084; C04B 2111/40; C04B 20/002
See application file for complete search history.

(56) References Cited

U.S. PATENT DOCUMENTS

| | | | |
|---|---|---|---|
| 6,334,885 B1 | 1/2002 | Fukushima et al. | |
| 9,061,940 B2 | 6/2015 | Chen et al. | |
| 11,345,634 B2 * | 5/2022 | Balapour | C04B 18/027 |
| 2021/0309570 A1 | 10/2021 | Guynn | |

OTHER PUBLICATIONS

PCT/US2023/017359 International Preliminary Report on Patentability mailed Aug. 2024.
PCT/US23/17359. International Search Report and Written Opinion. Mailed Jun. 26, 2023.
Balapour, Mohammad, "Conversion of Waste Coal Combustion Ash to Value-Added Construction Lightweight Aggregates through a Holistic Thermodynamics-Guided Manufacturing Framework". Aug. 2021. pp. i., xvi-xviii, 13-14, 58-61, 112-115, 123-125.

* cited by examiner

*Primary Examiner* — Anthony J Green
(74) *Attorney, Agent, or Firm* — Joseph E. Maenner; Maenner & Associates, LLC

(57) ABSTRACT

Manufacturing lightweight aggregate (LWA) by a sintering technique requires a delicate balance among three conditions: forming sufficient amount of molten liquid phase during sintering; reaching an appropriate viscosity for solid-liquid suspension; and emitting sufficient amount of gas that can be entrapped by the liquid phase to form pores. LWAs were made from low-calcium and high-calcium Waste Coal Combustion Ash (W-CCA) including fly ash and bottom ash. A mass fraction of at least 40% liquid phase for fly ash and 50% for bottom ash is required for a successful entrapment of emitted gaseous phases during sintering. Larger pores were observed in the microstructure of LWA samples made using high-calcium W-CCA in comparison to low-calcium W-CCA. This result was mainly attributed to the high-calcium samples forming liquid phases with lower viscosity values and emitting higher amounts of gaseous phase during sintering than did the low-calcium samples. The gaseous phase was generated by hematite reduction and anhydrite decomposition.

13 Claims, 54 Drawing Sheets

LIGHTWEIGHT AGGREGATES PRODUCED FROM WASTE-COAL COMBUSTION ASH

CROSS-REFERENCE TO RELATED APPLICATION

The present application is a continuation-in-art of U.S. patent application Ser. No. 17/469,945, filed on Sep. 9, 2021 now U.S. Pat. No. 11,345,634 B2, which is a 371 of PCT application Serial No. PCT/US20/56976, which claims the benefit of U.S. Provisional Patent Application Ser. No. 63/004,032, filed on Apr. 2, 2020, as well as claims the benefit of U.S. Provisional Patent Application Ser. No. 63/326,937, filed on Apr. 4, 2022, which are all incorporated herein by reference in their entireties.

STATEMENT OF GOVERNMENT INTEREST

This invention was made with government support under Contract No. 1918838 awarded by the National Science Foundation. The government has certain rights in the invention.

BACKGROUND OF THE INVENTION

Field of the Invention

The invention relates to a method of producing lightweight aggregates from Waste-Coal Combustion Ash (W-CCA)

Description of the Related Art

Some of the industrial applications of lightweight aggregate (LWA) are internal curing of concrete, lightweight concrete, lightweight fill for geotechnical applications, wastewater treatment, and green roofs. At the current state, most of the available LWA in the US market are expanded shale, clay, and slate based, which are only available at certain locations/states of the US such as North Carolina, Upstate New York, Texas, Kansas, Colorado, California, and Indiana. This matter has directly impacted the accessibility and consequently the final price of LWA due to the cost of transportation. In recent years, there have been many efforts to explore the production of LWA from urban and industrial solid wastes to not only increase availability/accessibility of LWA, but also to address the growing concerns over sustainability.

W-CCA including fly ash (FA), bottom ash (BA), boiler slag, etc. are of the industrial waste materials that need to be landfilled. In 2018 over 100 million tons of W-CCA were produced, of which about 60 million tons (i.e., ≈60%) were beneficially recycled and the rest has been disposed to the landfills. Over the course of time, this gap in recycling has left the US with a huge stock of waste W-CCA in the landfills, which are imposing negative impacts to the environment (e.g., polluting surface and groundwater) and human health. Having said that, converting the waste W-CCA available in the landfills to LWA is a viable solution that not only promotes landfill diversion, but also can increase the accessibility of LWA. Sintering is one of the techniques that can be employed in order to produce LWA from W-CCA. However, successful production of LWA from W-CCA requires an advanced understanding of sintering mechanisms during the production process.

It would be beneficial to provide an efficient and cost-effective method for producing LWA.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention is a method of manufacturing lightweight aggregate through sintering process comprising the steps of forming at least a 40% by mass molten liquid phase for the lightweight aggregate (LWA) using W-CCA; reaching a viscosity of between 100 Pa·s and $10^7$ Pa·s for solid-liquid suspension; and emitting a minimum gas amount of 0.24% by weight of the LWA to form pores in the liquid phase during the sintering.

BRIEF DESCRIPTION OF THE DRAWINGS

The accompanying drawings, which are incorporated herein and constitute part of this specification, illustrate the presently preferred embodiments of the invention, and, together with the general description given above and the detailed description given below, serve to explain the features of the invention. In the drawings:

FIG. 321D is a front view of C-FA LWA sintered at 1160° C. for four minutes with 6% NaOH;

FIG. 35B is a graph showing measured water absorption of C-FA as a function of time up to 72 hours for three replicates at various concentrations of NaOH;

FIG. 36A is a graph showing vacuum and 72 hour water absorption for F-FA, with the darker area showing water that is readily absorbable by the LWA during 72 hours and is accessible for internal curing, and the light area above the darker area shows the extra water that can be absorbed by the LWA under vacuum;

FIG. 36B is a graph showing vacuum and 72 hour water absorption for C-FA, with the darker area showing water that is readily absorbable by the LWA during 72 hours and is accessible for internal curing, and the light area above the darker area shows the extra water that can be absorbed by the LWA under vacuum;

FIG. 37A is a graph showing the open porosity of F-FA LWA (the error bats indicate ±one standard deviation for three replicates); the XCT shows the open porosity (i.e., total porosity minus closed porosity both obtained using XCT) based upon a single measurement;

FIG. 37B is a graph showing the open porosity of C-FA LWA (the error bats indicate ±one standard deviation for three replicates); the XCT shows the open porosity (i.e., total porosity minus closed porosity both obtained using XCT) based upon a single measurement;

FIG. 38A is a graph showing water desorption response of F-FA LWA based upon single measurement, with the Y=axis broken at 2 for a better presentation;

FIG. 38B is a graph showing water desorption response of C-FA LWA based upon single measurement, with the Y=axis broken at 2 for a better presentation;

FIG. 39A is a chart showing the normalized porosity fraction in the range of >19 μm and 50 nm and less than 50 nm for F-FA LWA;

FIG. 39B is a chart showing the normalized porosity fraction in the range of >19 μm and 50 nm and less than 50 nm for C-FA LWA;

FIG. 40A is a graph showing the corresponding pore size distribution obtained from desorption isotherms for F-FA LWA;

FIG. 40B is a graph showing the corresponding pore size distribution obtained from desorption isotherms for C-FA LWA;

FIG. 41A is a graph showing pore size distribution of F-FA LWA;

Figure 41B:
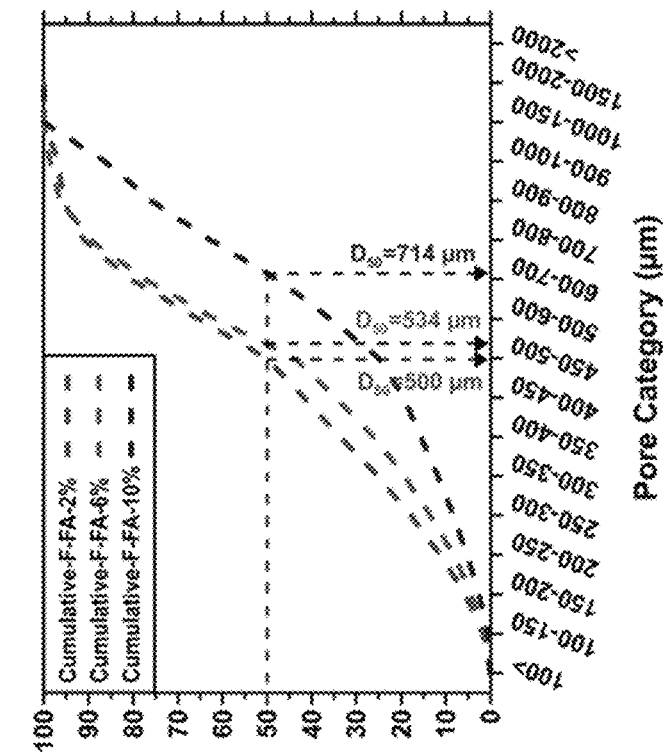
Figure 42B:
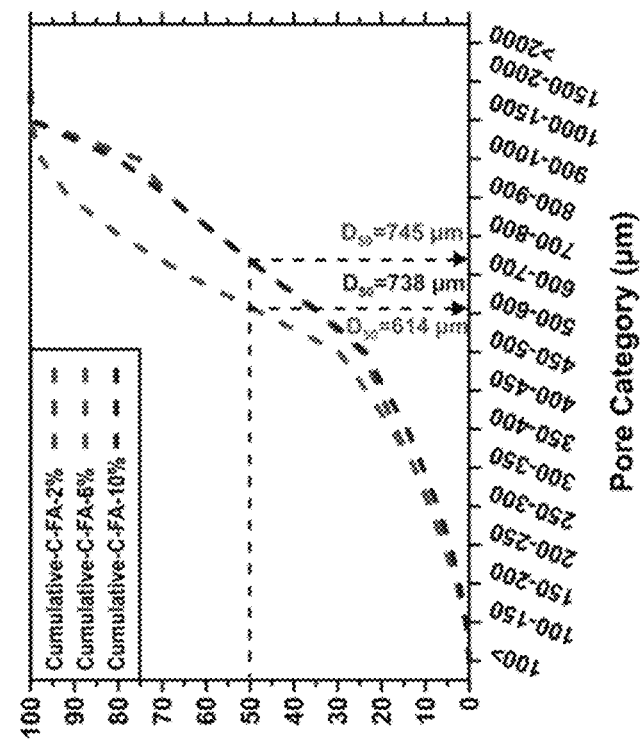
Figure 42A:
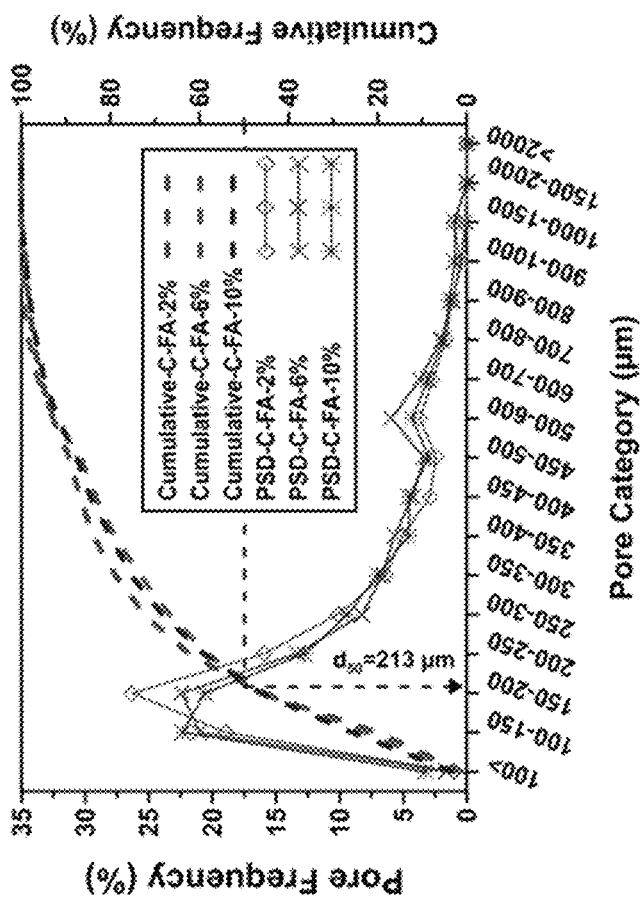

FIG. 41B is a graph showing normalized porosity share of pore categories of F-FA LWA obtained from XCT;

FIG. 42A is a is a graph showing pore size distribution of C-FA LWA; and

FIG. 42B is a graph showing normalized porosity share of pore categories of CFA LWA obtained from XCT.

DETAILED DESCRIPTION

In the drawings, like numerals indicate like elements throughout. Certain terminology is used herein for convenience only and is not to be taken as a limitation on the present invention. The terminology includes the words specifically mentioned, derivatives thereof and words of similar import. As used herein, the term "low calcium" for waste ash refers to ash that the summation of $SiO_2$, $Al_2O_3$, and $Fe_2O_3$ is greater than 50% and the CaO content is less than 18%. As used herein, the term "high calcium" for waste ash refers to ash that the summation of $SiO_2$, $Al_2O_3$, and $Fe_2O_3$ is greater than 50% and the CaO content is greater than 18%. Further, as used herein, with the exception of porosity percentage, which is determined by volume, all other percentages are calculated in terms of mass percent.

The following abbreviations are used throughout:

Waste Coal Combustion Ash: W-CCA

Fly Ash: FA

Bottom Ash: BA

Low-Calcium: LC

High-Calcium: HC

Class C: C

Class F: F

The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

The present invention provides inventive sintering mechanisms by quantitatively evaluating the three crucial sintering conditions required for successful production of LWA using a waste coal combustion ash: a correct amount of the formed liquid phase, a correct viscosity of the liquid-solid suspension, and a correct amount of the emitted gas for pore formation. In a first exemplary embodiment, the W-CCA can be fly ash. In an alternative exemplary embodiment, the W-CCA can be bottom ash.

First, the liquid phase of the multi-component system of W-CCA and fluxing agent are quantified using thermodynamic modeling. Second, the viscosity of the liquid-solid phase is quantified using the output of thermodynamic modelling as inputs into the Browning and Krieger-Dougherty equations. Third, TGA is performed to understand the thermal behavior of geopolymerized (i.e., underwent the chemical reaction between the dissolved species of aluminates and silicates in highly alkaline environment to form a three-dimensional aluminosilicate network) pellets during sintering. Finally, the interior physical features and the LWA pore structure is visualized using 3D x-ray computed tomography (X-CT) to confirm the desired structure.

Figure 1:
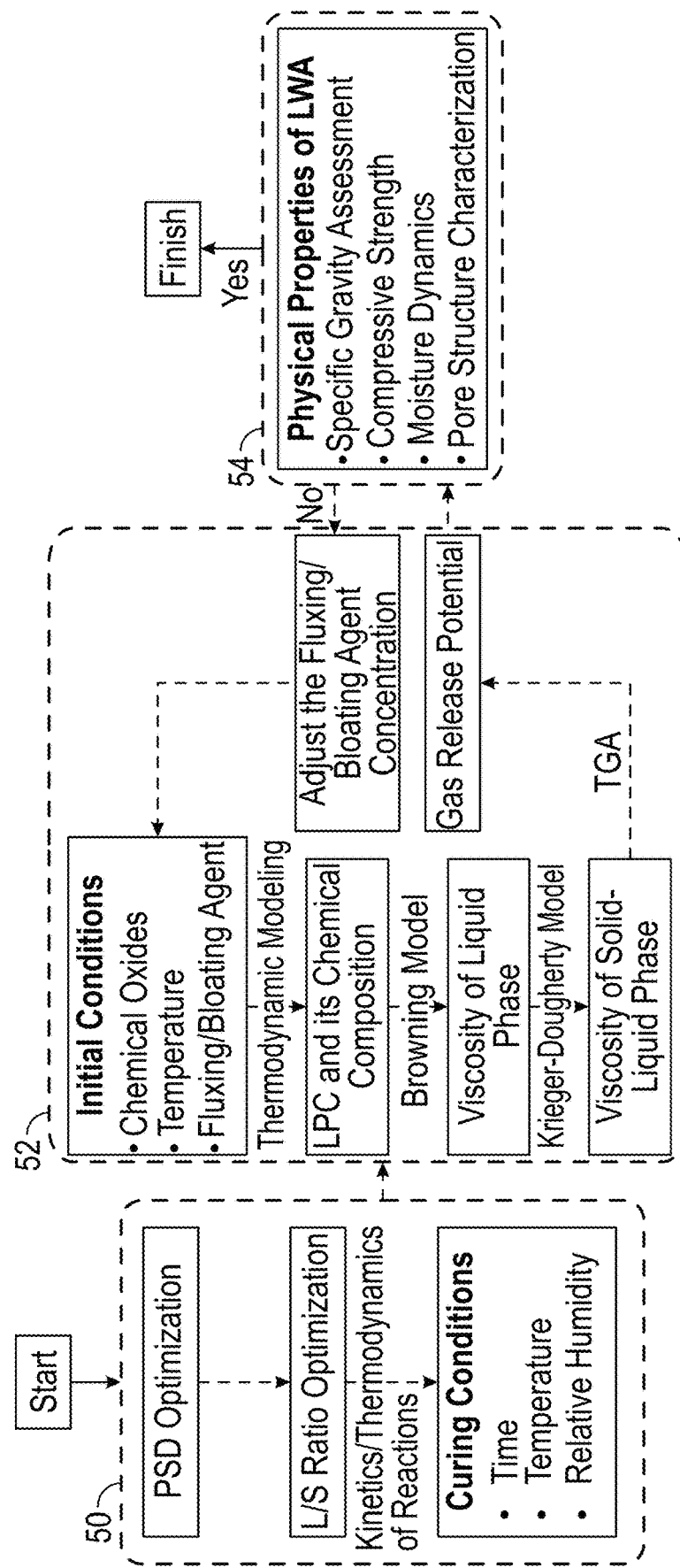
FIG. 1 is a flowchart showing an exemplary thermodynamic-based framework for the production of LWA independent of source materials.
Figure 2A:
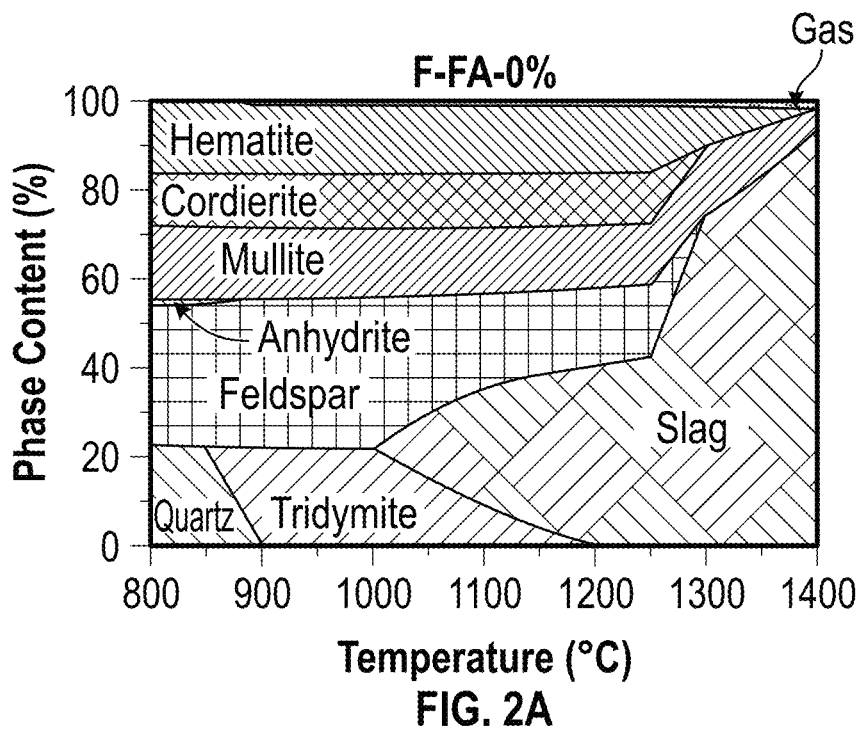
FIG. 2A is a phase diagram for waste low calcium (class F) fly ash (F-FA) with 0% NaOH.
Figure 2B:
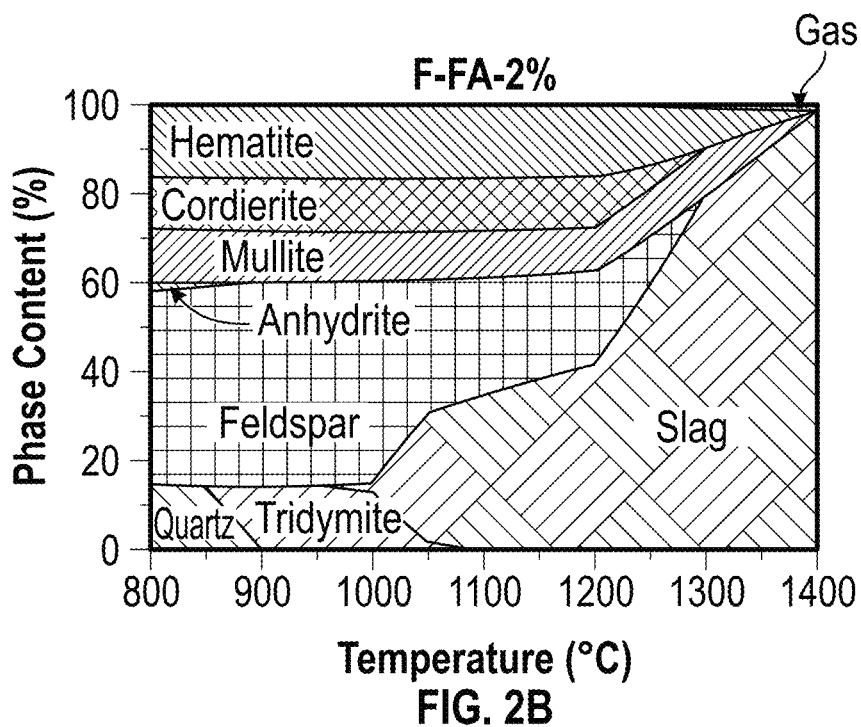
FIG. 2B is a phase diagram for F-FA with 2% NaOH.
Figure 2C:
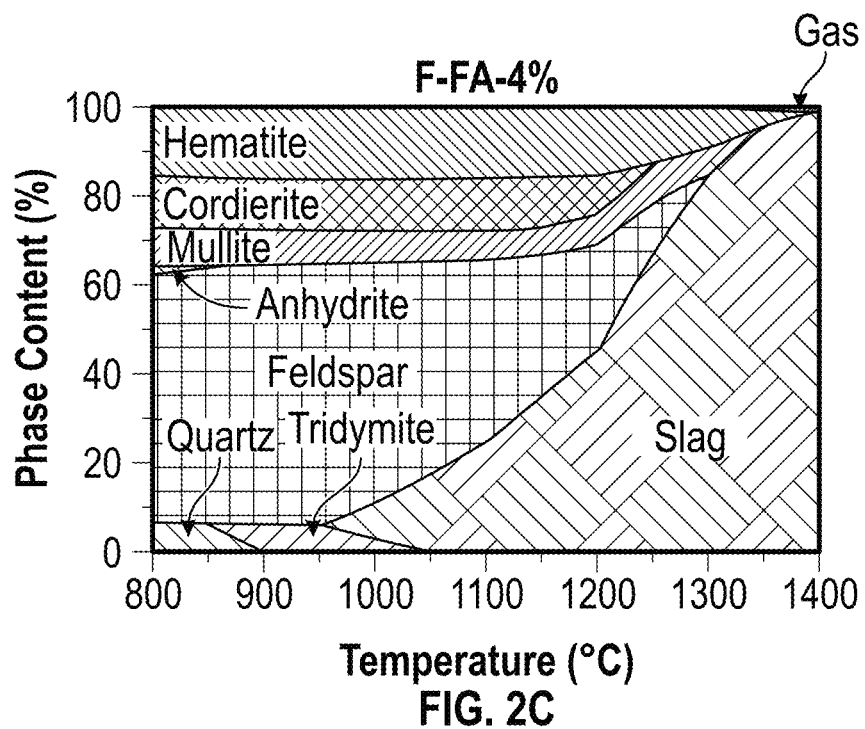
FIG. 2C is a phase diagram for F-FA with 4% NaOH.
Figure 2D:
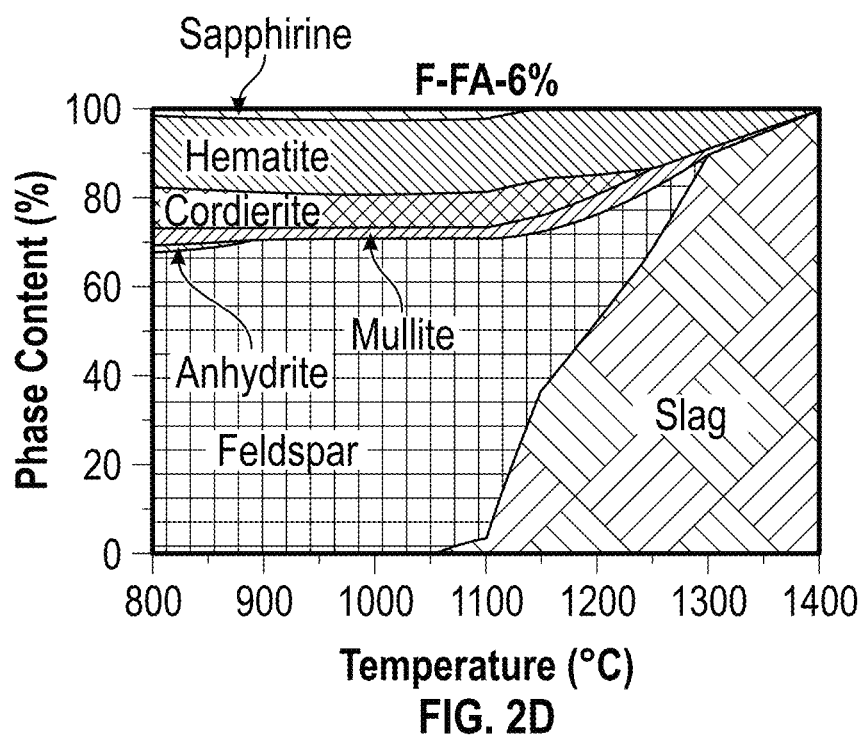
FIG. 2D is a phase diagram for F-FA with 6% NaOH.
Figure 2E:
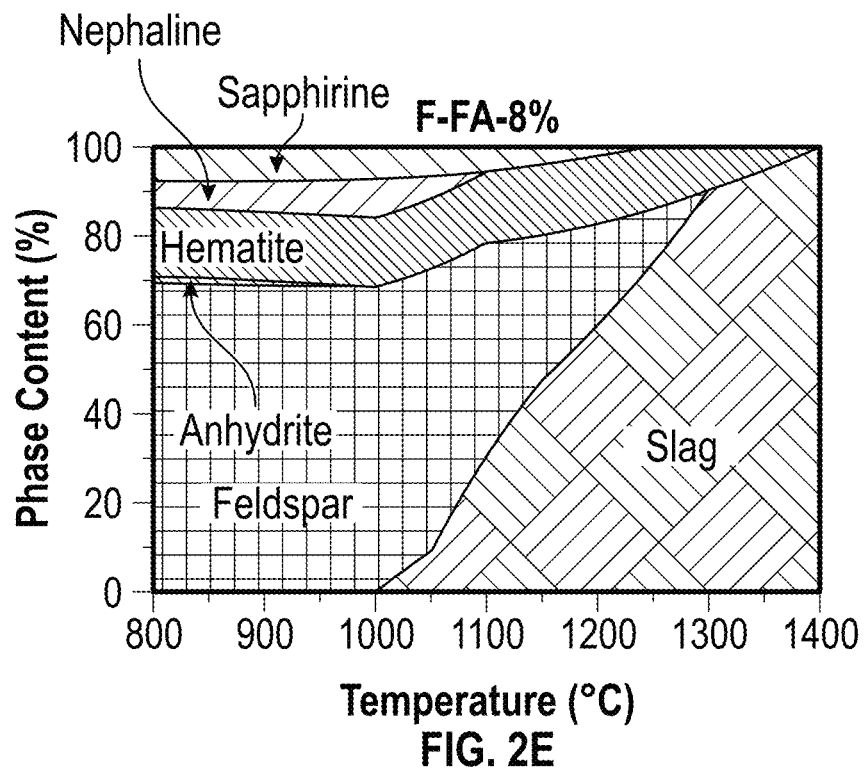
FIG. 2E is a phase diagram for F-FA with 8% NaOH.
Figure 2F:
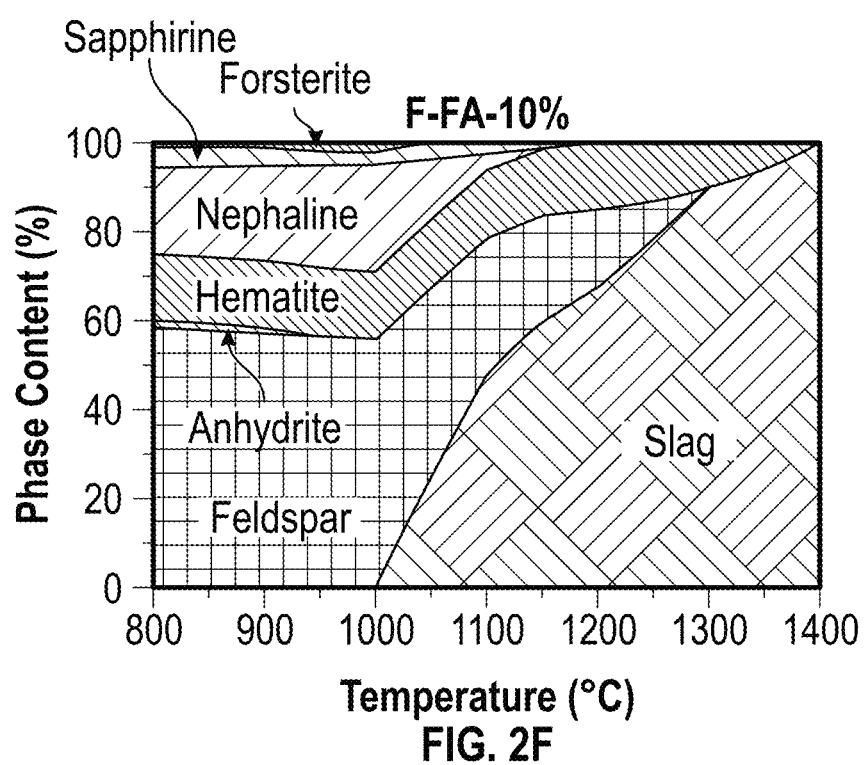
FIG. 2F is a phase diagram for F-FA with 10% NaOH.
Figure 3A:
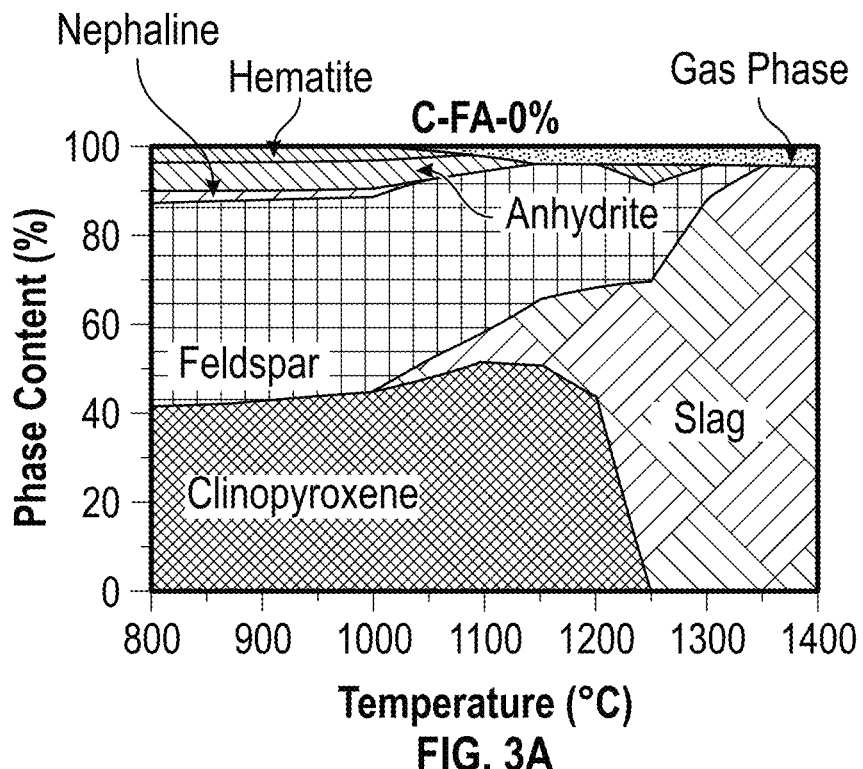
FIG. 3A is a phase diagram for waste high calcium (class C) fly ash (C-FA) with 0% NaOH.
Figure 3B:
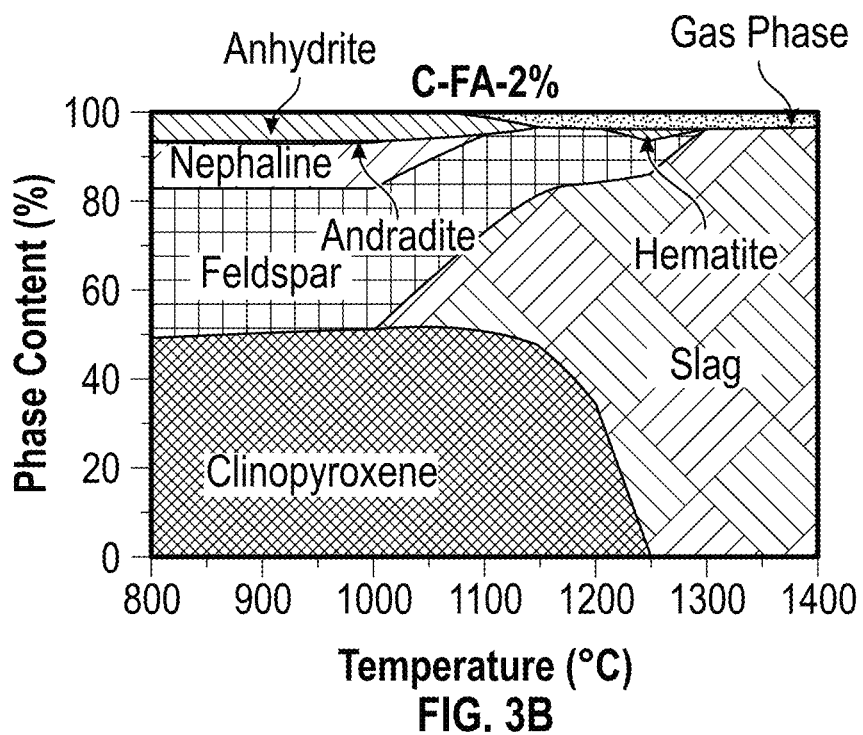
FIG. 3B is a phase diagram for C-FA with 2% NaOH.
Figure 3C:
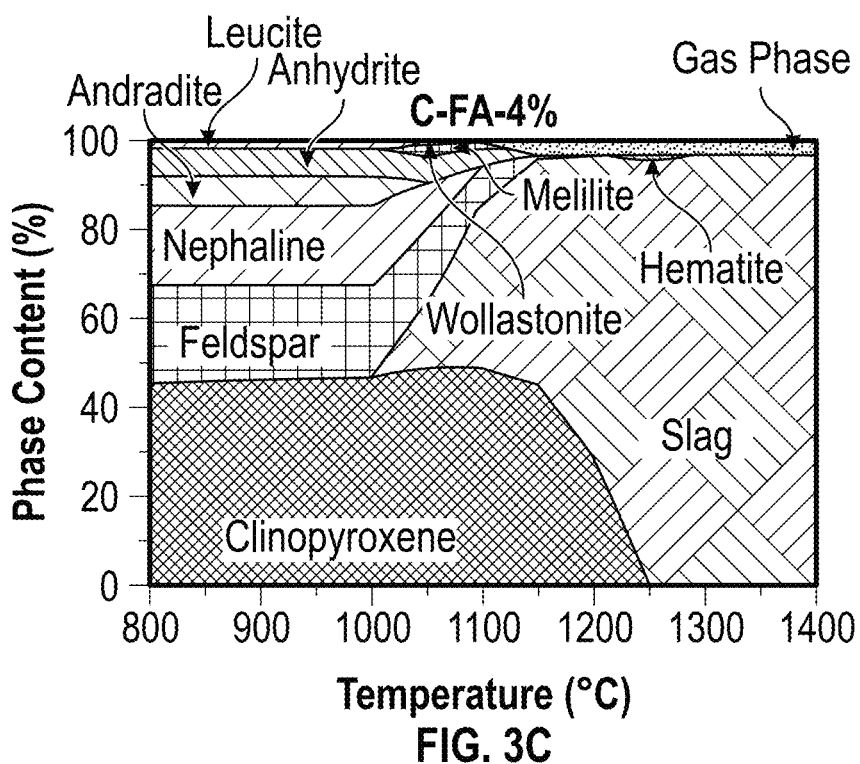
FIG. 3C is a phase diagram for C-FA with 4% NaOH.
Figure 3D:
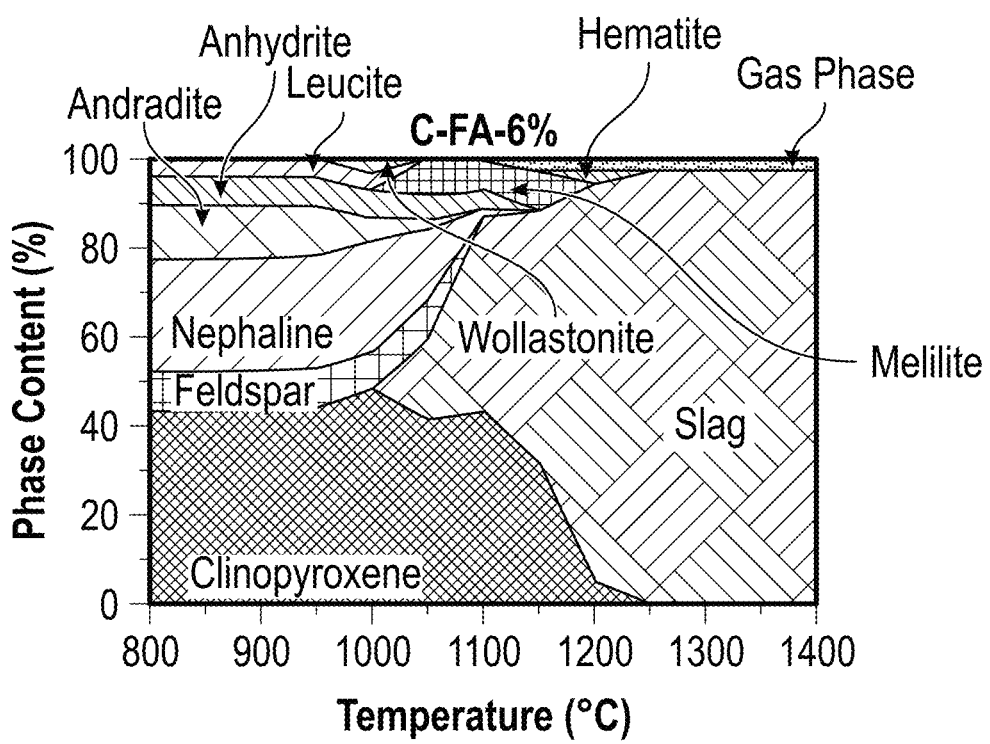
FIG. 3D is a phase diagram for C-FA with 6% NaOH.
Figure 3E:
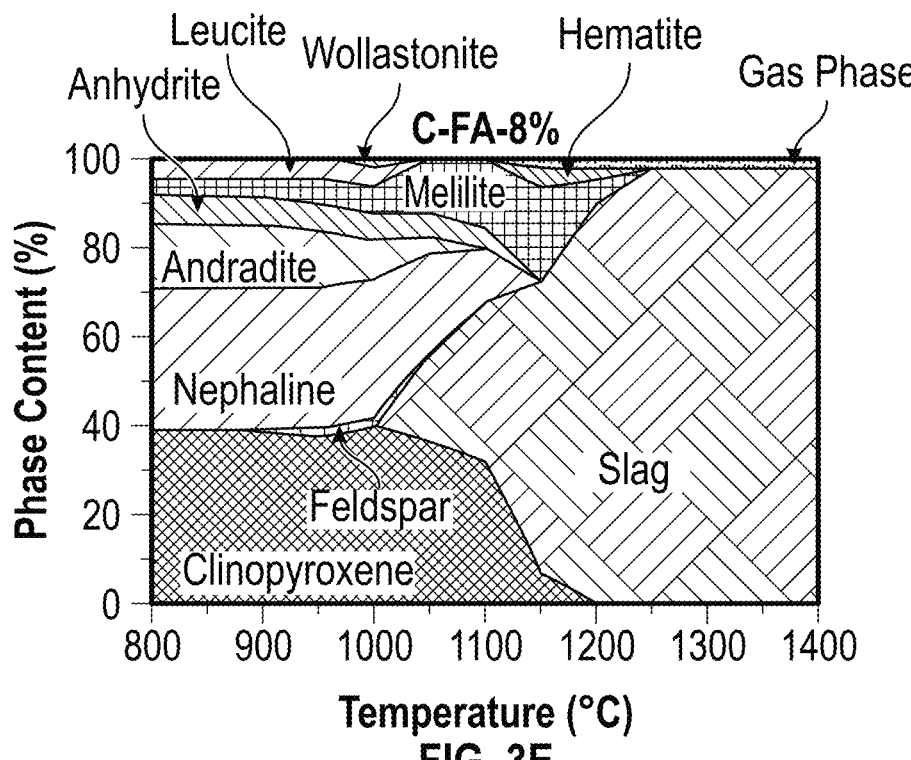
FIG. 3E is a phase diagram for C-FA with 8% NaOH.
Figure 3F:
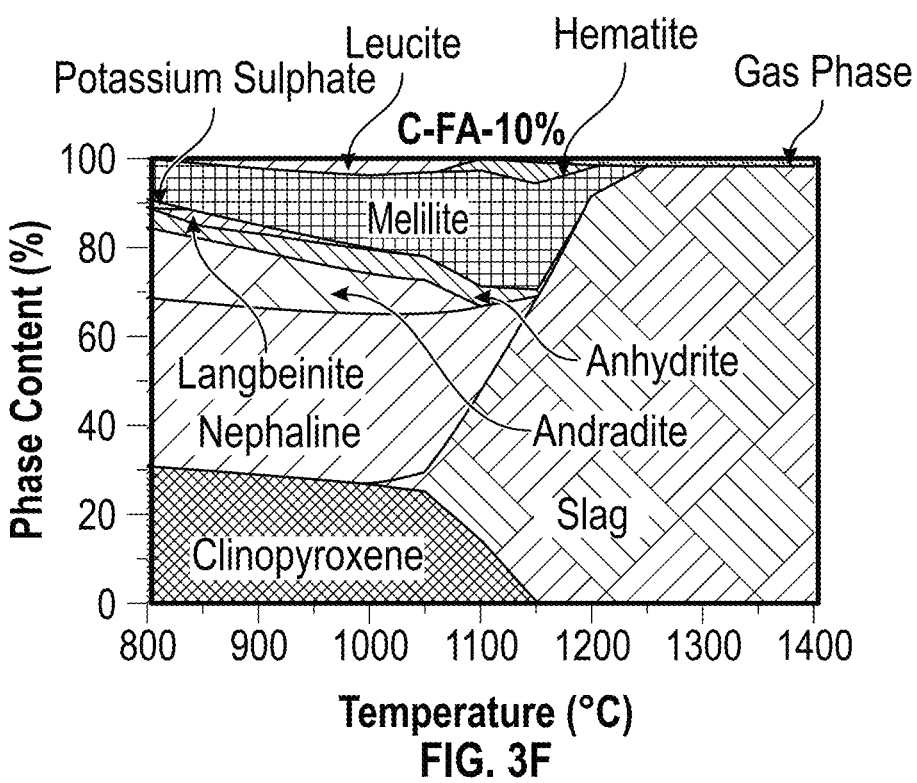
FIG. 3F is a phase diagram for C-FA with 10% NaOH.

FIG. 1 demonstrates the extended thermodynamics-based framework that can be used for the production of LWA from various W-CCA. As shown, the figure considers three major steps for the successful production of LWA. Box 50 is associated with the production of spherical fresh pellets. This procedure starts with particle size optimization of the source materials as a physical property which can affect the engineering properties of the final product i.e., LWA. Afterward, an optimum liquid to the solid ratio for the technological aspects of spherical pellets should be chosen. It should be noted that the liquid here is the mixture of water and a specific concentration of the fluxing agent. Next, the fresh pellets will be kept in a controlled condition for a certain time to dry and be used for the sintering procedure.

The next step, identified as box 52 in FIG. 1, is associated with the optimization of the sintering process for the production of porous LWA. First, the chemical composition of raw material, the temperature of interest, and the dosage of fluxing/bloating agents are used as the inputs of thermodynamic modeling. Next, the outputs of thermodynamic modeling are used to quantify the formation of different phases and more importantly the liquid phase and its chemical composition that has formed during sintering. Afterward, the liquid phase quantity and its chemical composition are used as the inputs for the Browning et al. model to estimate the viscosity of the liquid phase in the LWA during sintering. The estimated viscosity of the liquid phase and quantity of solid phase are used as the inputs for the Krieger-Dougherty viscosity model to estimate the viscosity of the solid-liquid phase. Next, Thermogravimetric Analyses (TGA) are performed on the fresh pellets to quantify the gas release potential of materials that is essential for the production of porous LWA.

In the third and final step, shown in box 54 FIG. 1, the physical properties of the produced LWA including specific gravity, compressive strength, moisture dynamics, and pore structure are assessed. If those physical properties are satisfied, the LWA design is finalized. Otherwise, the fluxing/bloating agent can be modified by returning to box 52 to go through the loop again to ensure appropriate physical properties are achieved for the LWA.

Example 1—Waste Fly Ash

Materials and Sample Preparation Using Fly Ash

Based on ASTM C618 fly ash is categorized as class F (referred to as low-calcium) fly ash when summation of $SiO_2$, $Al_2O_3$, and $Fe_2O_3$ is greater than 50% and the CaO content is less than 18%. For class C (referred to as high-calcium) fly ash the summation of $SiO_2$, $Al_2O_3$, and $Fe_2O_3$ has to be greater than 50%, and the CaO content must be greater than 18%. Two types of waste fly ashes were used in this study which are based on ASTM C618 and their chemical composition are (i) waste class F (low calcium) fly ash designated by F-FA, and waste class C (high calcium) fly ash designated by C-FA. Additionally, waste fly ash refers to the waste fly ash that does not pass at least one of the requirements proposed by ASTM C618 or AASHTO M 295; therefore, cannot be directly used in concrete. One of the most important requirements of ASTM C618 for fly ash is a Loss on Ignition (LOI) less than 6%. In addition, based on AASHTO M 295, the LOI limit for fly ash in more than thirty-nine states shall be less than 5%. Accordingly fly ashes used in this experiment can be classified as waste fly ash owing to a high LOI content (see Table 1). Table 1 shows the chemical oxide of the waste fly ashes obtained through x-ray fluorescence (XRF).

TABLE 1

Chemical oxides of waste fly ash

| Chemical Composition | Sample Name | |
|---|---|---|
| (% by mass) | F-FA | C-FA |
| $SiO_2$ | 49.5 | 38.19 |
| $Al_2O_3$ | 23.8 | 18.76 |
| $Fe_2O_3$ | 15.45 | 10.88 |
| $SO_3$ | 0.75 | 3.59 |
| CaO | 3.2 | 18.8 |
| $Na_2O$ | 0.42 | 1.12 |
| MgO | 1.6 | 3.6 |
| $K_2O$ | 2.3 | 0.98 |
| $P_2O_5$ | — | 0.7 |
| $TiO_2$ | — | 1.31 |
| Total | 97.02 | 97.93 |
| LOI | 5.3 | 8.47 |
| Unburnt Carbon | 2.33 | 7.0 |
| Initial moisture content | 0.4 | 1.21 |

TABLE 1-continued

Quantitative x-ray diffraction (QXRD) analysis was performed using the Rigaku Smartlab instrument using 0.02° steps in the range of 5° to 80° on the fly ashes (F-FA and C-FA) to quantify their amorphous content and crystalline phases. 20% rutile ($TiO_2$) was used as an internal standard for the purpose of quantification. Table 2 shows the crystalline phases and amorphous content of the ashes, which indicates that a great portion of the ashes is composed of an amorphous phase.

TABLE 2

The crystalline phases content of raw waste fly ashes

| Phase name | Sample Name | |
|---|---|---|
|  | F-FA | C-FA |
| Quartz | 7.0 | 5.9 |
| Mullite | 10.7 | 3.5 |
| Hematite | 4.5 | 1.0 |
| Anhydrite | 1.9 | 3 |
| Calcium alumioferrite | 0 | 1.6 |
| Amorphous | 75.9 | 84.9 |

The manufacturing of FA LWA includes four main steps: drying, palletization, curing, and sintering. In the first step, the ashes were dried in an oven at 110° C.±5° C. for 24 hours to remove their moisture. In the second step i.e., palletization the dried ash was mixed with NaOH aqueous solution with molarities of 0 mol/L (i.e., pure deionized water), 2.5 M, 5 M, 7.5 M, 10 M, and 12.5 M with a liquid to solid (L/S) ratio of 0.2. It should be noted that other chemical agents could be used instead of NaOH as long as these other agents yield the three required conditions for successful production of LWA. These concentrations led to mass concentrations (i.e., mass of solid NaOH per mass of solid FA) of 0%, 2%, 4%, 6%, 8%, and 10%. The ash and aqueous NaOH (or deionized water) were mixed thoroughly to achieve a mixture of uniform consistency. ABS plastic mold of 16 mm diameter was used to pelletize the mixed ashes. In step three, the pallet was placed in the environmental chamber of 40° C. and 30% RH for 24 hours. In the final step, the fresh aggregates were sintered at 1160° C. for 4 min to produce FA LWA Samples are designated as XX-YY %, where XX shows the type of materials (i.e., either F-FA or C-FA), while YY represents the NaOH concentration.

Research Methodology

To quantitatively investigate the three required conditions for successful production of LWA from waste FA, analytical modeling and experimental program were employed. The analytical modeling was consisted of thermodynamic modeling to quantify the formation of the liquid phase and employing viscosity models to calculate the viscosity of solid-liquid suspension in the LWA. The experimental program was consisted of thermogravimetric analysis (TGA) and X-ray computed tomography (X-CT) to measure the extent of gas release during the sintering and to investigate the pore structure of LWA, respectively.

Analytical Modeling
Thermodynamic Modeling

Factsage v7.2, a thermodynamic modeling software that operates based on Gibbs free energy minimization, coupled with FToxide database was used in order to predict the phase equilibria of the ash+NaOH system as the temperature varied from 800° C. to 1400° C. with the steps of 50° C. The modeling was performed under 0.101 MPa (1 atm) pressure and ordinary air which was consisted of 0.21 mol fraction oxygen and 0.79 mol nitrogen. The chemical oxides that were considered in modeling included $SiO_2$, $Al_2O_3$, $Fe_2O_3$, $SO_3$, CaO, $Na_2O$, MgO, and $K_2O$, which were obtained through XRF. Those skilled in the art will recognize that other thermodynamic modeling software can be used.

Viscosity Calculations

The viscosity of the liquid phase (slag) in LWA was quantified by employing the empirical viscosity model developed by Browning et al. This model has been shown to be more appropriate to calculate the viscosity of coal ash slag compared to other empirical models. The Browning model assumes that the viscosity of the slag falls into a Newtonian region and correlates viscosity with temperature (T) using a temperature shift (Ts) (Equation 1). Ts, as presented in Equation 2, is a function of a composition parameter, i.e., "A." "A" is defined as the weighted molar ratio of network formers (numerator of Equation 3) to network modifiers (denominator of Equation 3) elements as presented in Equation 3, where the quantity of each component is in mole fraction and their summation must add up to unity (Equation 4).

$$\log_{10}\left(\frac{\eta_L}{T-T_S}\right) = \frac{14788}{T-T_S} - 10.931 \quad \text{Equation 1}$$

$$T_S = 306.63 \cdot \ln(A) - 574.31 \quad \text{Equation 2}$$

$$A = \frac{3.19\ Si^4 + 0.855\ Al^{3+} + 1.6\ K^+}{0.93\ Ca^2 + 1.50\ Fe^{n+} + 1.21\ Mg^{2+} + 0.69\ Na^+ + 1.35\ Mn^{n+} + 1.47\ Ti^{4+} + 1.91\ S^{2-}} \quad \text{Equation 3}$$

$$Si^{4+} + Al^{3+} + Ca^{2+} + Fe^{n+} + Mg^{2+} + Na^+ + K^+ + Mn^{n+} + Ti^{4+} + S^{2-} = 1 \quad \text{Equation 4}$$

The composition of the liquid phase (slag) at different temperatures for each LWA was obtained using Factsage with varying fluxing agent concentrations and was used to estimate the viscosity of the liquid phase. It should be noted that during sintering at some temperatures, the LWA system is composed of liquid and solid phase concurrently; therefore, the suspension's (solid-liquid phase) viscosity becomes highly dependent on the volume fraction of solid phase. Thus, to estimate the viscosity of the solid-liquid suspension, the Krieger and Dougherty model was used (Equation 5).

$$\eta_s = \eta_L \left(1 - \frac{\phi}{\phi_m}\right)^{-[\eta]\phi_m} \quad \text{Equation 5}$$

where $\eta_s$ is the viscosity of the liquid-solid suspension, $\eta_L$ is the liquid phase (slag) viscosity, $\varphi$ is the volume fraction of solids (assumed to be equal to the mass fraction), $\varphi_m$ is the maximum particle packing fraction, and $[\eta]$ is the intrinsic viscosity. This equation is applicable in the range of $0<\varphi<\varphi_m$. In this study, it was assumed that particles are spheres leading to $[\eta]=2.5$, and $\varphi_m$ was calculated according to Stovall et al. model and was estimated to be 0.74.

Experimental Investigation
Thermogravimetric Analysis (TGA)

TGA was performed using a TA Instrument Q5000 IR model to (i) measure the unburnt carbon content of FA (which directly can affect the gas release potential of LWAs close to sintering temperature) and (ii) to evaluate the gas release potential of LWAs necessary for lightening mechanism. Those skilled in the art will recognize that other measuring instruments can be used.

In order to measure the unburnt carbon content of raw FA, a 2-atmosphere TGA (2A-TGA) performed under air and nitrogen was defined. The 2A-TGA steps were as follows: (1) the temperature was kept constant at 100° C. for 5 min, (2) with a 20° C./min incremental ramp, under nitrogen atmosphere, the temperature was increased to 750° C., (3) still under nitrogen gas the temperature was decreased to 100° C. with a 20° C./min ramp, (4) the atmosphere was changed to air and the temperature was kept at 100° C./min for another 5 min, and (5) finally, the temperature was increased to 1000° C. with a 20° C./min ramp. An approximate sample mass of 30 mg of raw FA was used for testing.

To simulate the sintering process and monitor the weight change (corresponding to gas release) of LWA, the TGA was performed on the geopolymerized pellets under air atmosphere, where the temperature was increased to 1160° C. with a ramp of 10° C./min and was held at that temperature for 4 min. To prepare the sample for this test, after 24 hours of curing the geopolymerized pellet was crushed using a mortar and pestle and then was sieved through a #200 sieve. ≈30 mg of collected powder was placed in a crucible pan, which was covered with fine refractory ceramic to prevent molten LWA (formed closed to sintering temperature) adhering to the pan.

X-Ray Computed Tomography (X-CT)

A Ziess Versa XRM 500 was used to perform X-CT and evaluate the pore structure of produced LWA. The x-ray tube was set for a voltage of 120 kV and a current of 83 μA while the scanning resolution was set for ≈19 μm. The exposure time per step for a rotation of 360° was ≈0.45 s. 2D projections of the LWA were collected and using the software supplied with the Ziess Versa XRM 500, tomographic reconstruction was performed to obtain approximately 1000 2D cross-sectional slice of the LWA. The visualization and calculations presented in this paper were performed using Dragonfly Software. Those skilled in the art will recognize that other measuring instruments and software can be used.

Phase Equilibria Predictions and Quantification of Liquid Phase Content

FIGS. 2A-2F show the phase diagrams for the F-FA with 0%, 2%, 4%, 6%, 8%, and 10% NaOH system, respectively, as a function of temperature. In F-FA+NaOH system, increasing the NaOH concentration transformed mullite and cordierite toward formation of a higher amount of Feldspar. Feldspar phase was composed of Anorthite ($CaAl_2Si_2O_8$), Albite ($NaAlSi_3O_8$), and k-feldspar ($KAlSi_3O_8$), which at lower temperature it was mainly composed of albite, while as the temperature increased the main composition transformed toward pure Anorthite. This is due to the fact that albite and k-feldspar have melting points of ≈1100° C. and ≈1200° C., respectively, while Anorthite's melting temperature is 1555° C. Increasing the NaOH concentration up to 6% promoted transformation of mullite and cordierite toward formation of feldspar and did not help with the formation of liquid phase. At 8% and 10% NaOH concentration the feldspar stability shifted toward formation of nepheline, which by increasing the temperature led to the formation of a greater quantity of liquid phase.

FIGS. 3A-3F demonstrate the predicted phase diagrams for C-FA with 0%, 2%, 4%, 6%, 8%, and 10% of NaOH, respectively, as the temperature changes from 800° C. to 1400° C. The initial melting temperature for all the NaOH concentrations was estimated to be at 1000° C. Incorporation of higher percentage of NaOH influences the stability of Feldspar, which is mainly a calcium bearing phase toward formation of Nepheline ($NaAlSiO_4$). Feldspar (Anorthite) has a melting point of 1555° C. while the melting point for Nepheline can lie between 1100° C. to 1256° C. This behavior can promote formation of higher amount of slag phase as can be seen from the phase diagrams.

Figure 4:
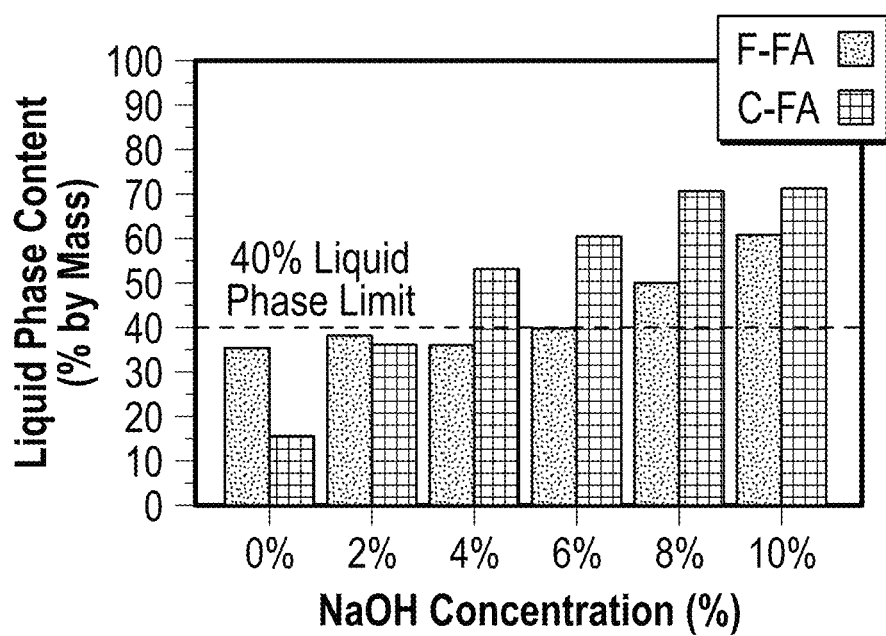
FIG. 4 is a graph showing liquid phase content of F-FA and C-FA at 1160° C. as a function of NaOH concentrations.

FIG. 4 shows the liquid phase content at 1160° C. for F-FA and C-FA as a function of NaOH concentration. For F-FA, the liquid phase content with NaOH concentrations of 0% to 6% was almost the same (i.e., ≈40%) and stayed below 40% limit, while with 8% and 10% NaOH concentration the liquid phase content passed this limit. On the other hand, for C-FA the liquid phase content gradually increased with incorporation of higher NaOH Concentration and at 4% NaOH concentration passed the 40% liquid phase content limit. This behavior is directly related to higher CaO content in C-FA. In the system of $Na_2O$—$Al_2O_3$—$SiO_2$ addition of CaO can promote the melting behavior of the system.

Figure 5A:
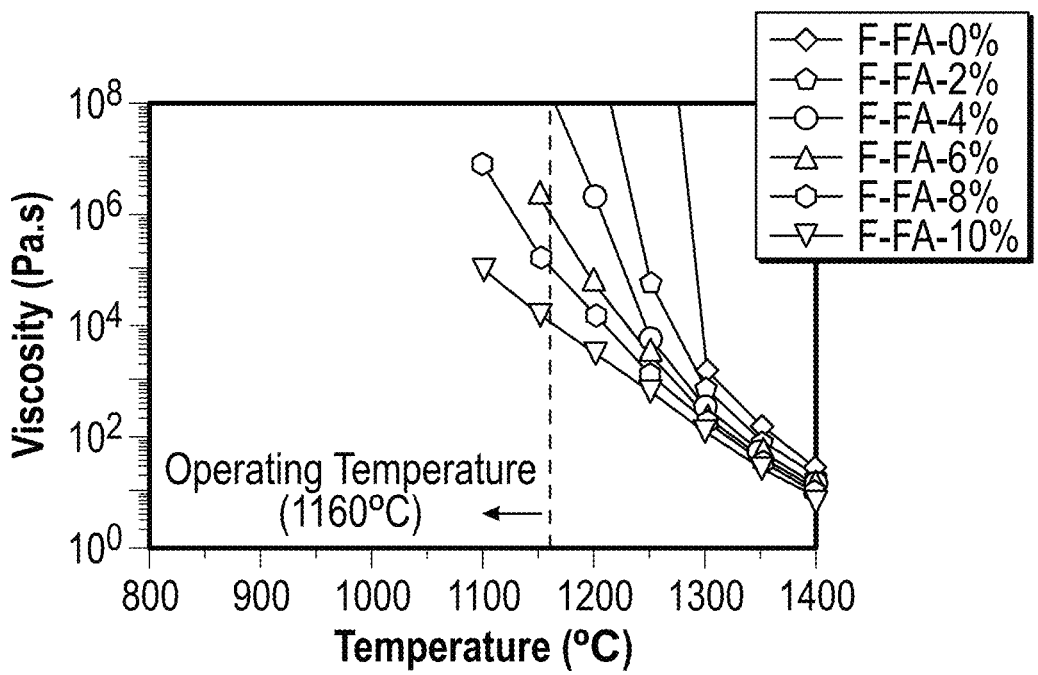
FIG. 5A is a graph of viscosity calculations for a solid-liquid suspension of LWA with various NaOH concentrations for F-FA.

FIG. 5A shows the viscosity of solid-liquid suspension in LWA made from F-FA. As can be seen by increasing the NaOH concentration the viscosity of solid-liquid decreased. It should be noted that although the F-FA 0% to 6% almost had the same liquid phase content (≈40%), however, increase in the NaOH concentration led to higher molar fraction of Na+, which has a fluxing role, in the liquid phase composition and reduced the liquid phase viscosity and consequently total viscosity.

Figure 5B:
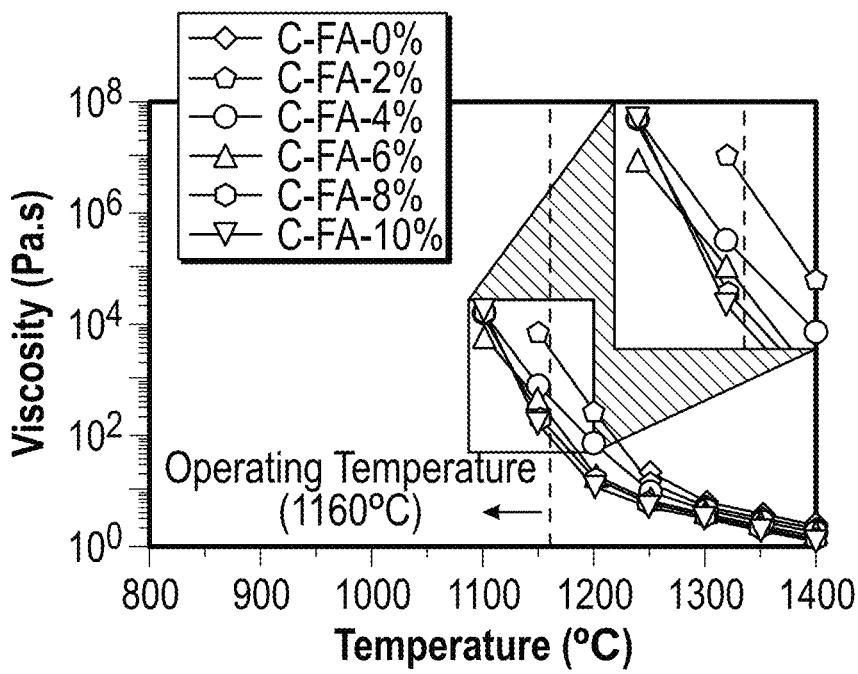
FIG. 5B is a graph of viscosity calculations for a solid-liquid suspension of LWA with various NaOH concentrations for C-FA.

FIG. 5B shows the solid-liquid suspension viscosity for the LWA made from C-FA. Incorporation of higher concentration of NaOH gradually reduced the viscosity by (i) promoting the formation of higher liquid phase content and (ii) the intensifying the fluxing role of $Na^+$. Generally, the lower viscosity values for C-FA in comparison with F-FA was due to the fact that C-FA had higher content of CaO, which has a notable fluxing role and can reduce the viscosity of liquid phase substantially.

Figure 6A:
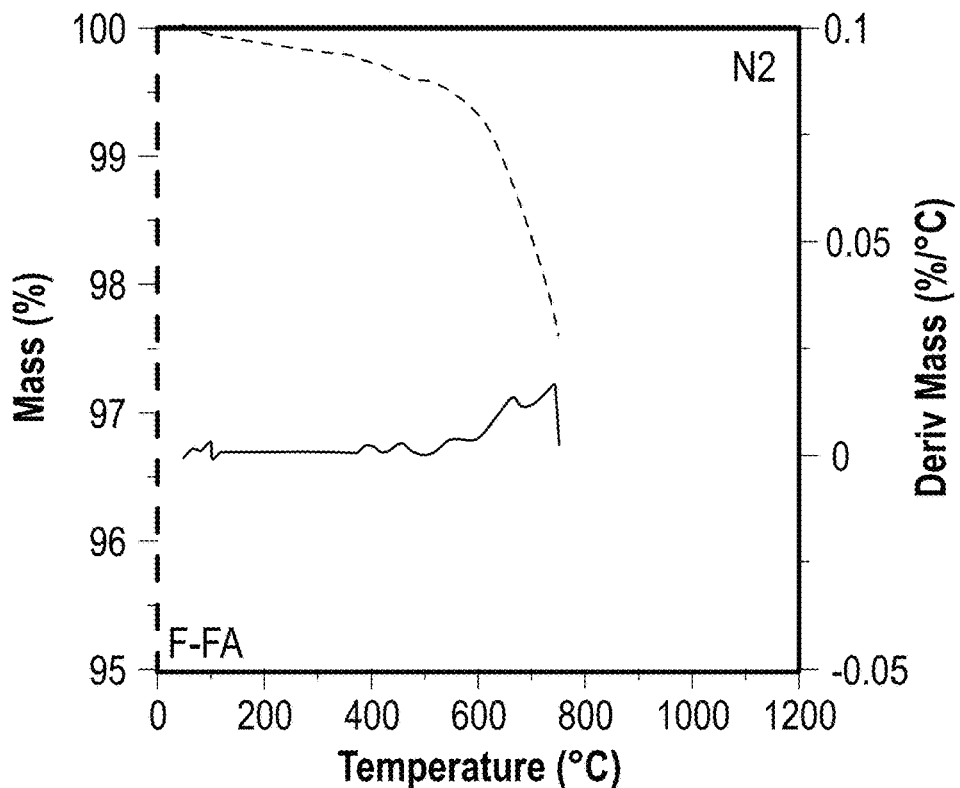
FIG. 6A is a graph of 2-atmosphere Thermogravimetric Analysis (TGA) performed on raw F-FA to determine unburnt carbon under a nitrogen atmosphere.
Figure 6B:
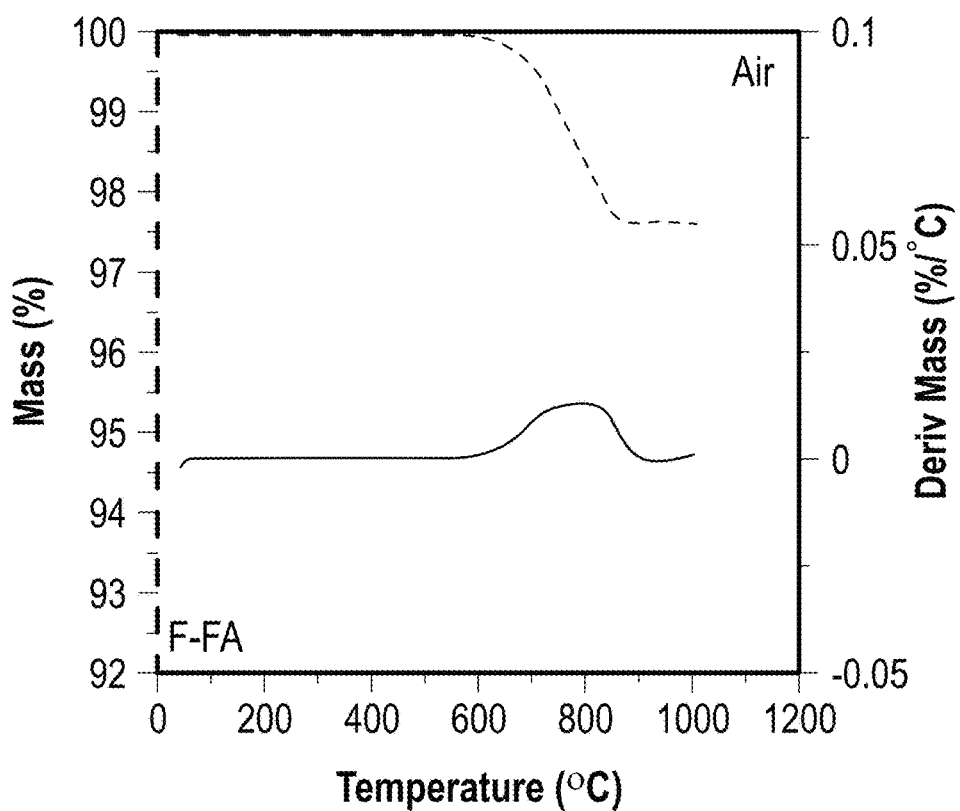
FIG. 6B is a graph of 2-atmosphere TGA performed on raw F-FA to determine unburnt carbon under an air atmosphere.
Figure 7A:
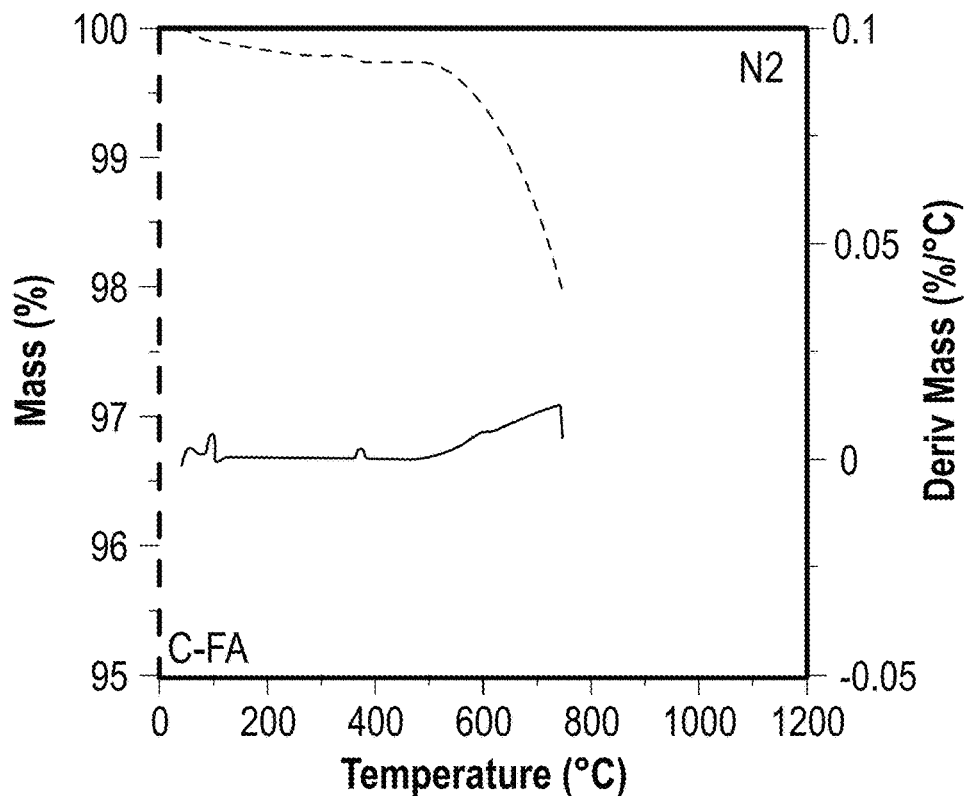
FIG. 7A is a graph of 2-atmosphere TGA performed on raw C-FA to determine unburnt carbon under a nitrogen atmosphere.
Figure 7B:
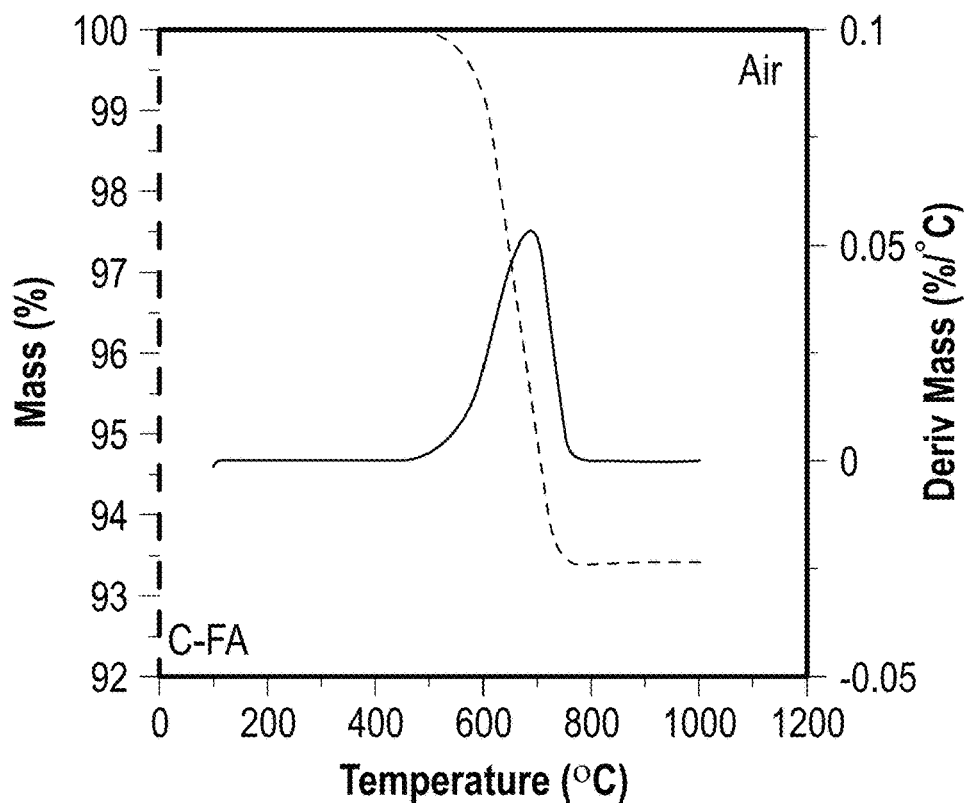
FIG. 7B is a graph of 2-atmosphere TGA performed on raw C-FA to determine unburnt carbon under an air atmosphere.
Figure 8A:
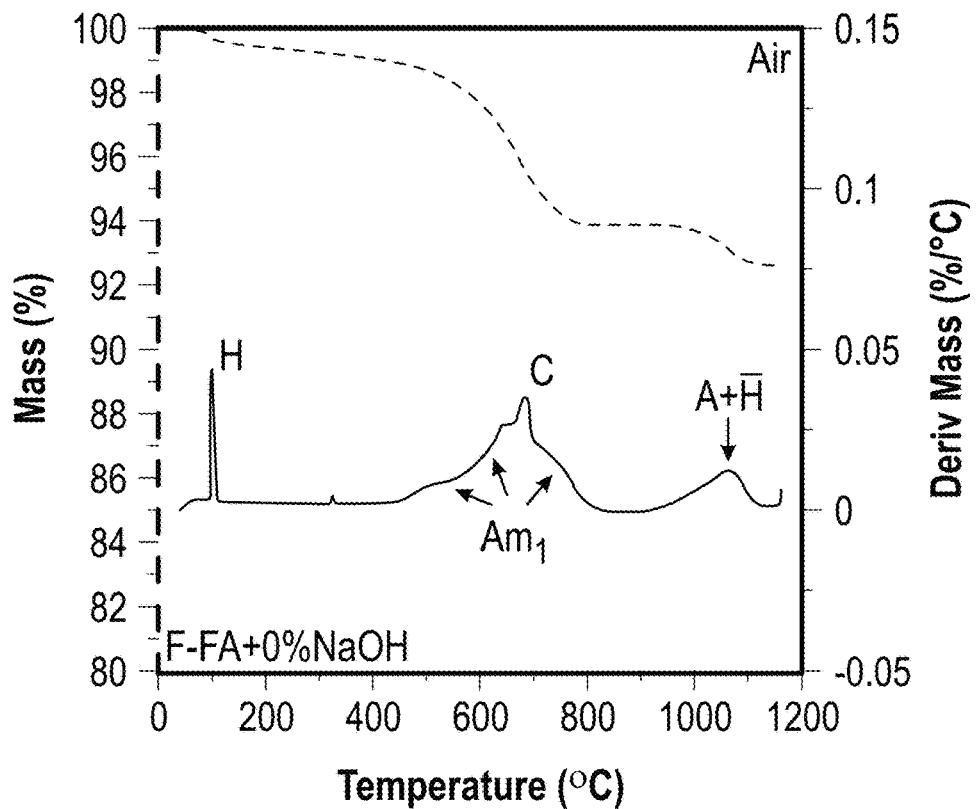
FIG. 8A is a graph showing Thermogravimetric Analysis/Derivative Thermogravimetry (TGA/DTG) curves for F-FA with 0% NaOH.
Figure 8B:
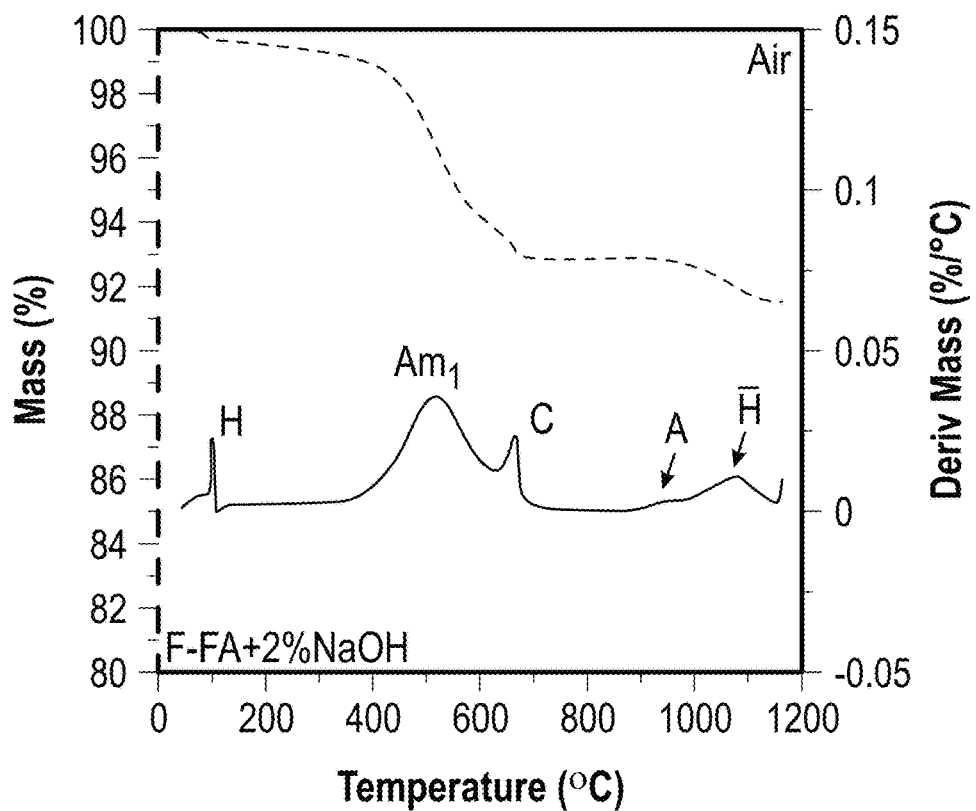
FIG. 8B is a graph showing TGA/DTG curves for F-FA with 2% NaOH.
Figure 8C:
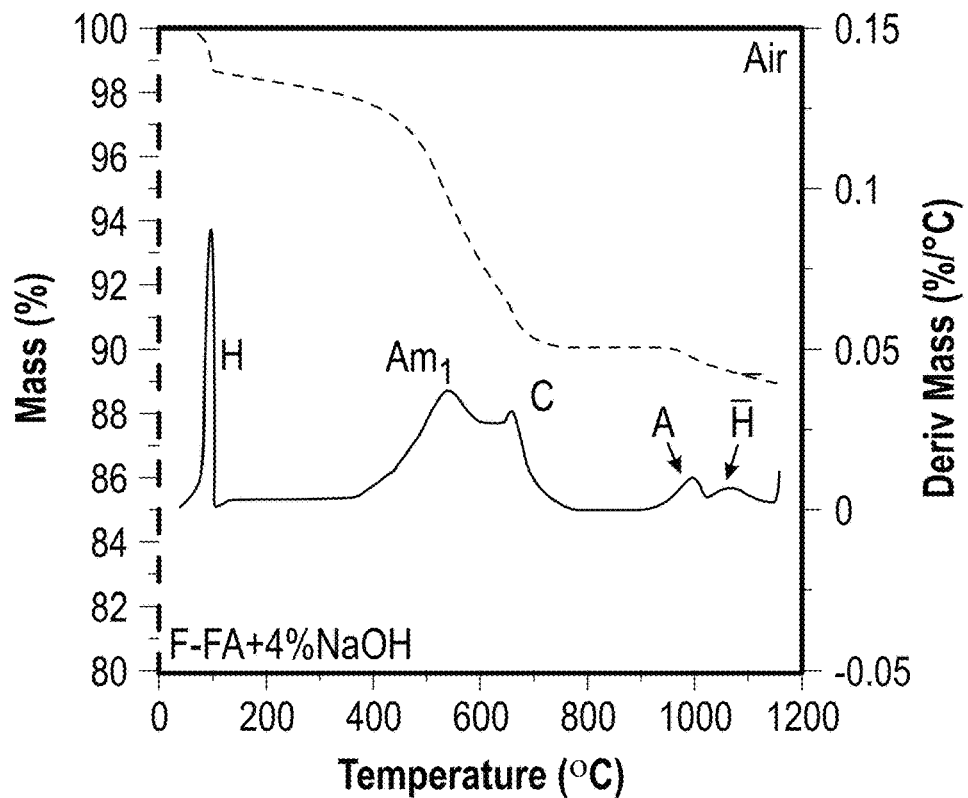
FIG. 8C is a graph showing TGA/DTG curves for F-FA with 4% NaOH.
Figure 8D:
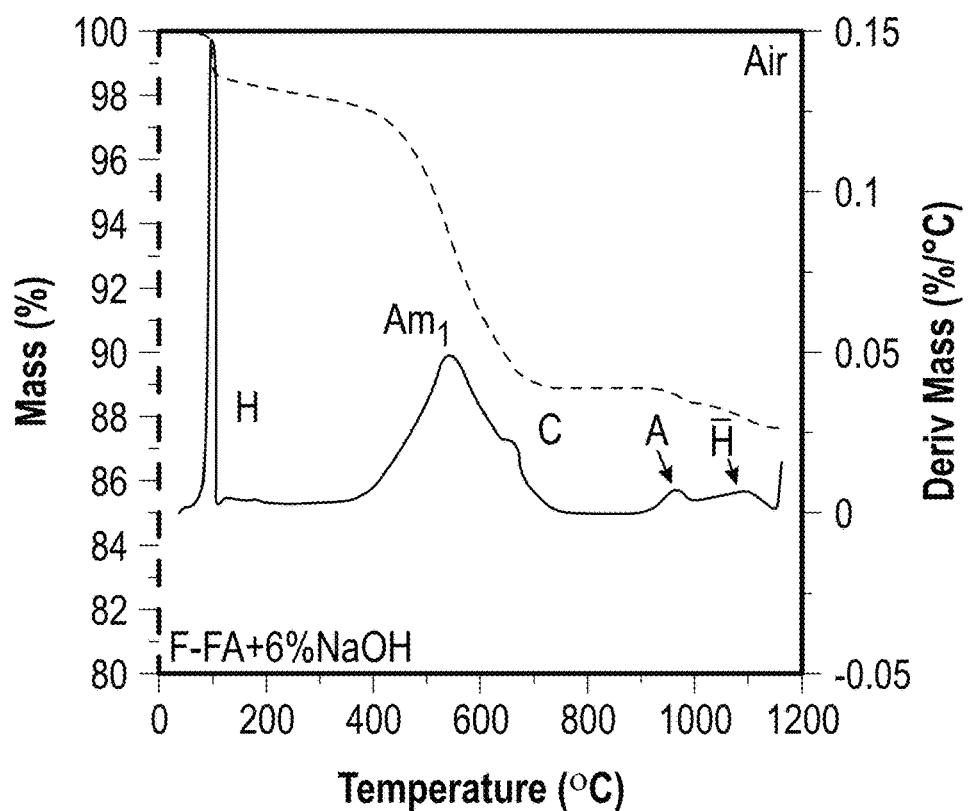
FIG. 8D is a graph showing TGA/DTG curves for F-FA with 6% NaOH.
Figure 8E:
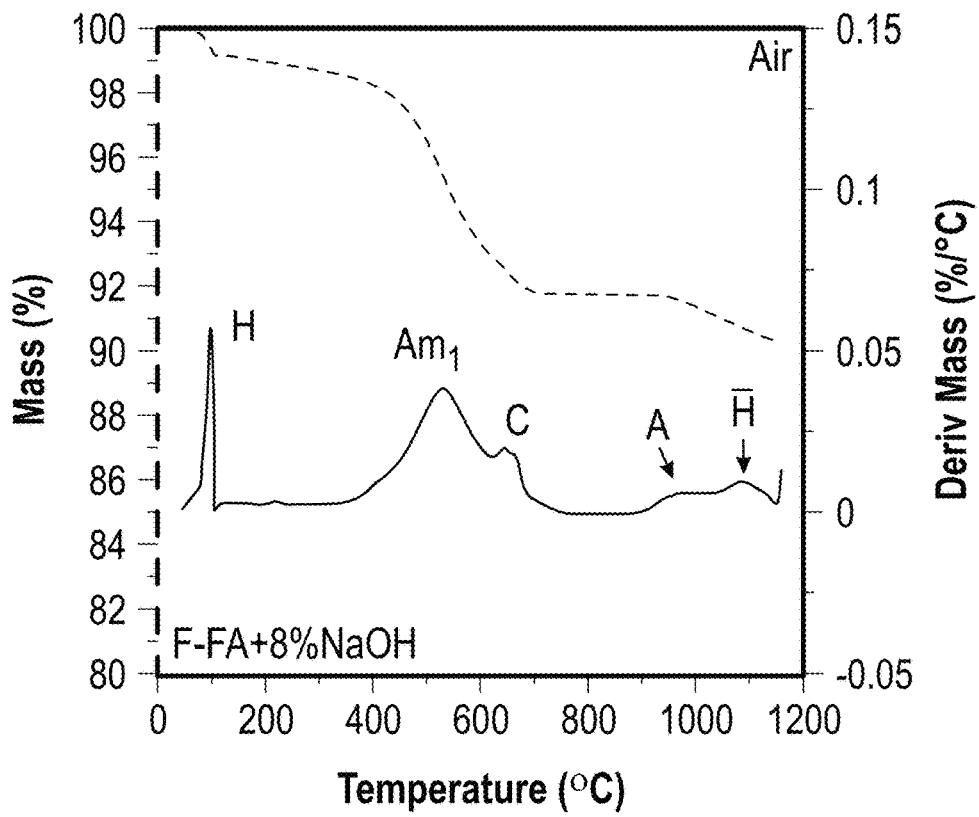
FIG. 8E is a graph showing TGA/DTG curves for F-FA with 8% NaOH.
Figure 8F:
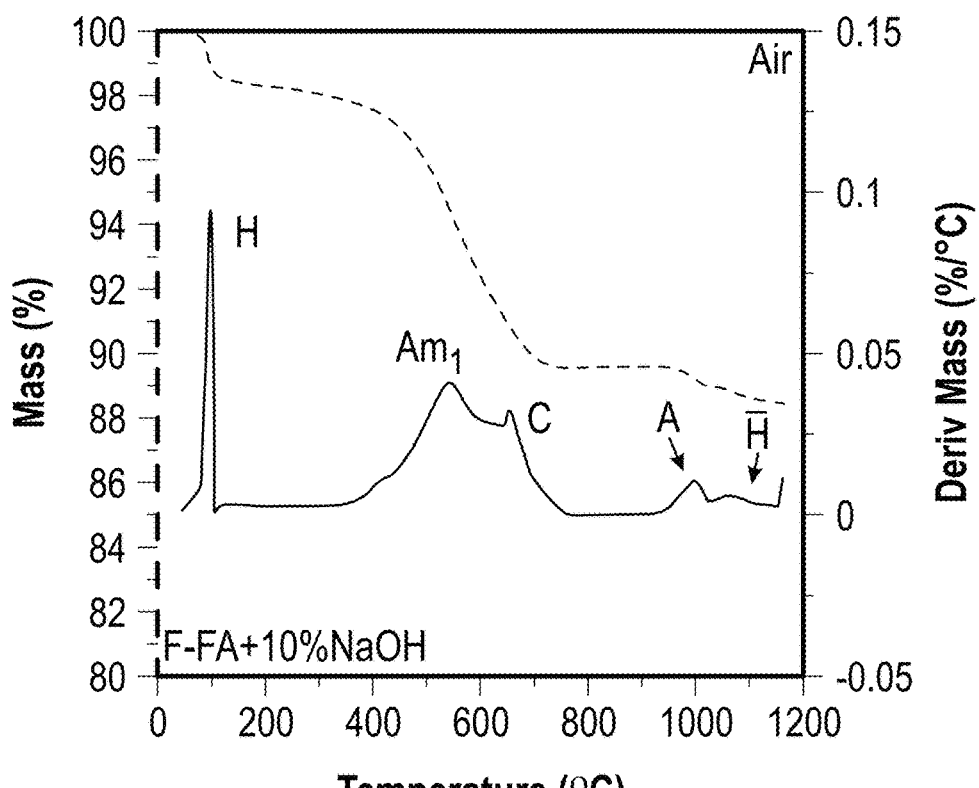
FIG. 8F is a graph showing TGA/DTG curves for F-FA with 10% NaOH.
Figure 9A:
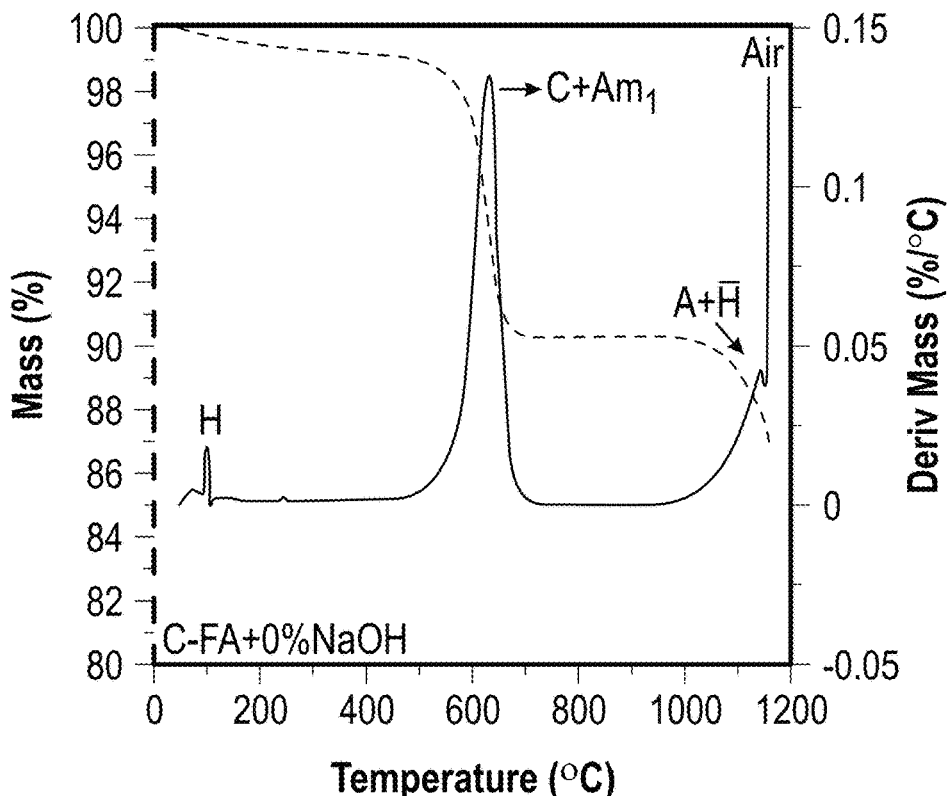
FIG. 9A is a graph showing TGA/DTG curves for C-FA with 0% NaOH.
Figure 9B:
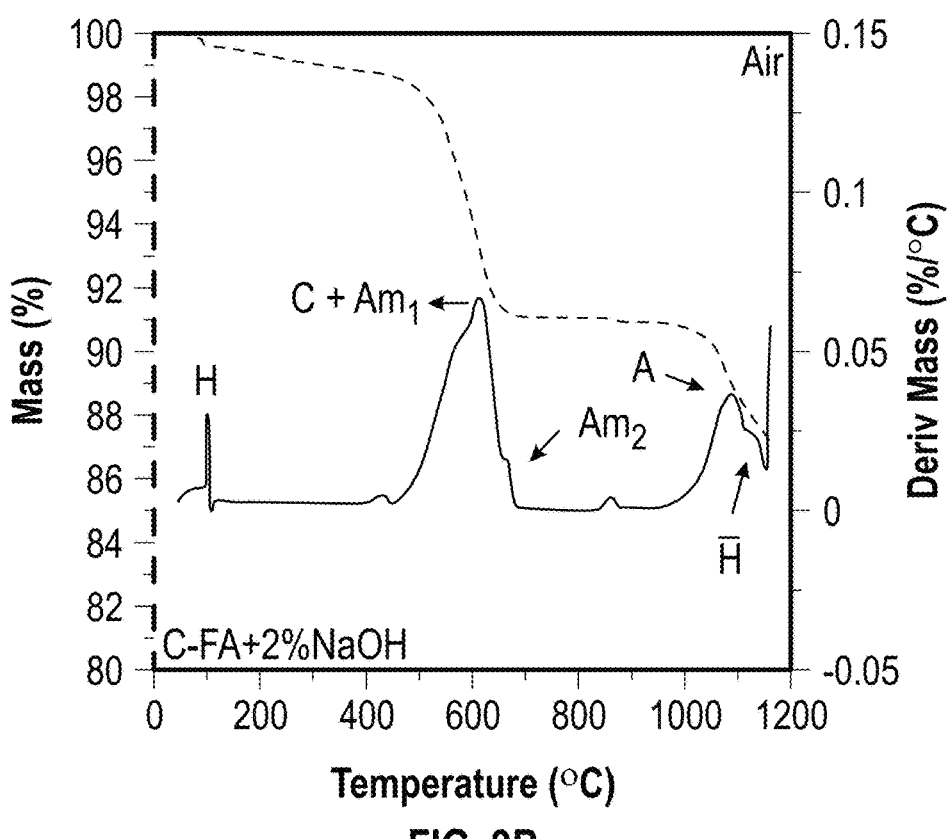
FIG. 9B is a graph showing TGA/DTG curves for C-FA with 2% NaOH.
Figure 9C:
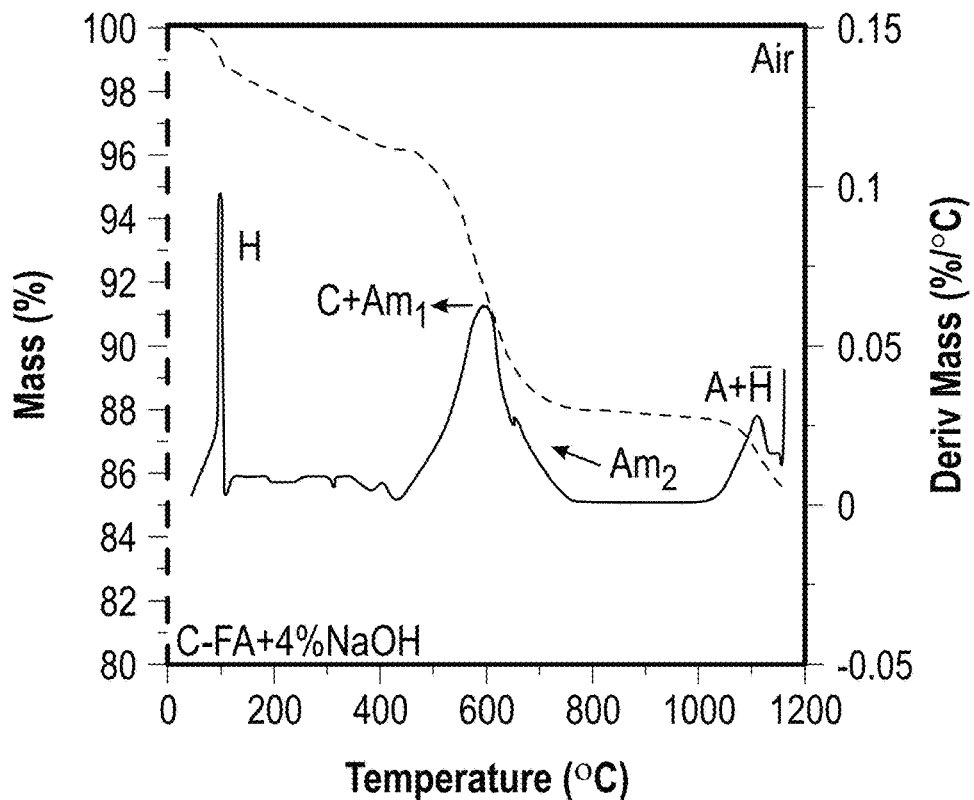
FIG. 9C is a graph showing TGA/DTG curves for C-FA with 4% NaOH.
Figure 9D:
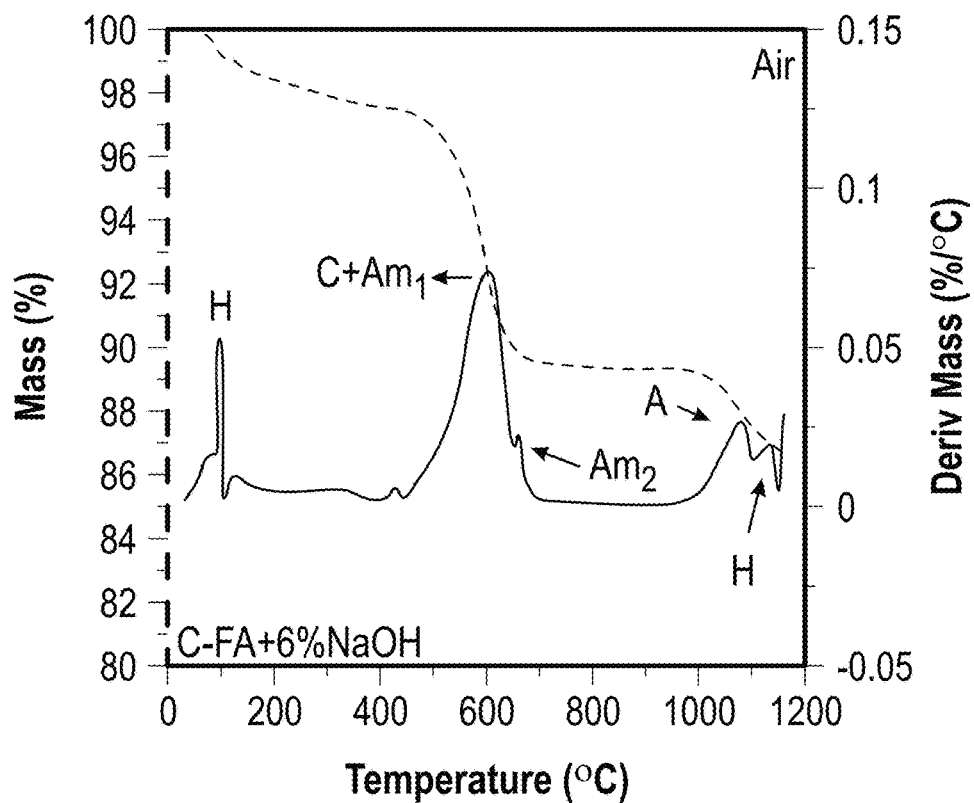
FIG. 9D is a graph showing TGA/DTG curves for C-FA with 6% NaOH.
Figure 9E:
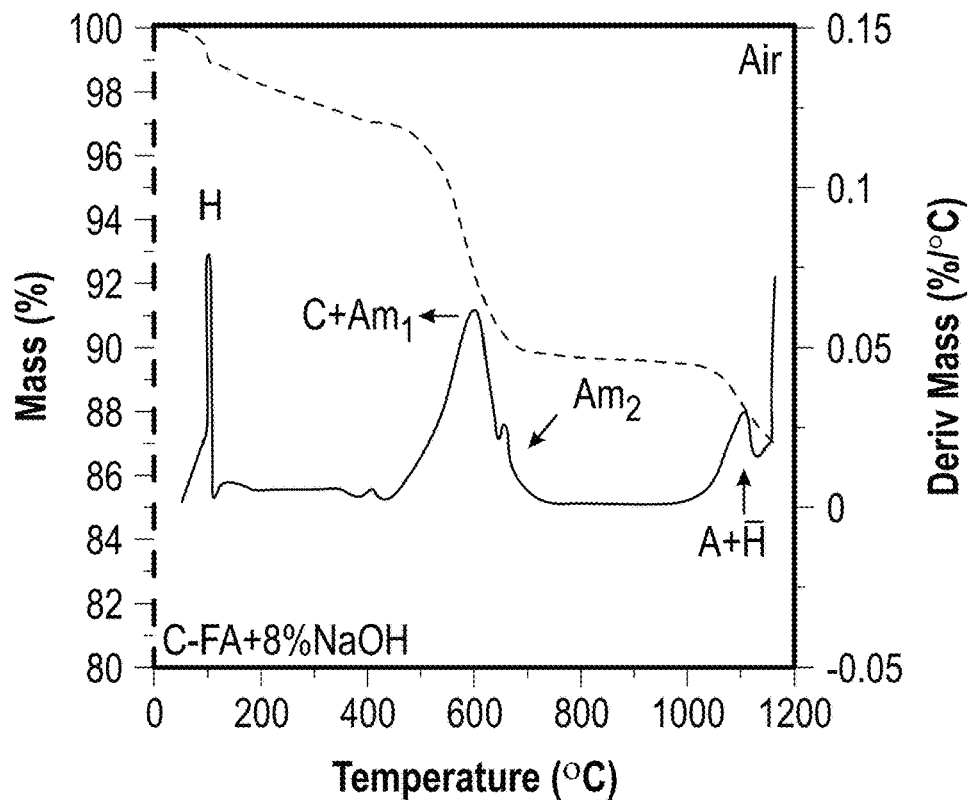
FIG. 9E is a graph showing TGA/DTG curves for C-FA with 8% NaOH.
Figure 9F:
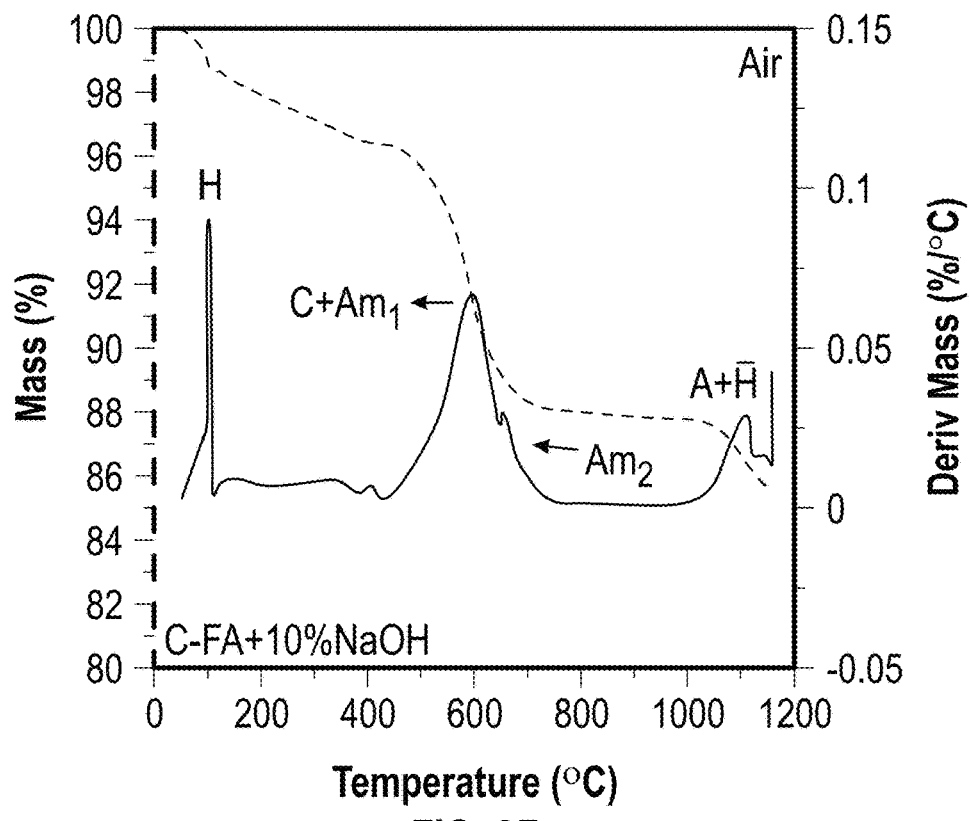
FIG. 9F is a graph showing TGA/DTG curves for C-FA with 10% NaOH.
Figure 10A:
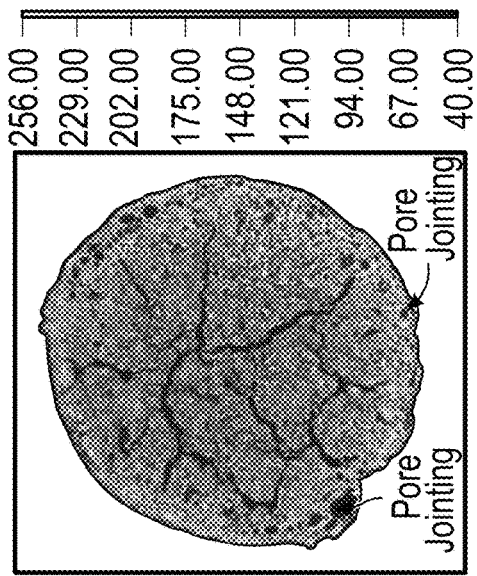
FIG. 10A is an X-ray Computed Tomography (X-CT) slice of 0% NaOH F-FA sintered LWA manufactured according to an exemplary method of the present invention.
Figure 10B:
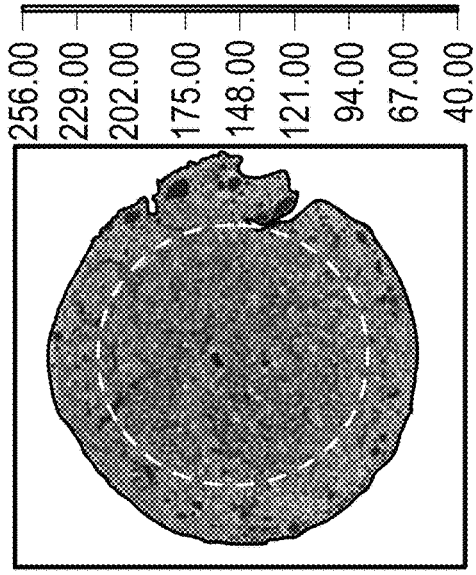
FIG. 10B is an X-CT slice of 2% NaOH F-FA sintered LWA manufactured according to an exemplary method of the present invention.
Figure 10C:
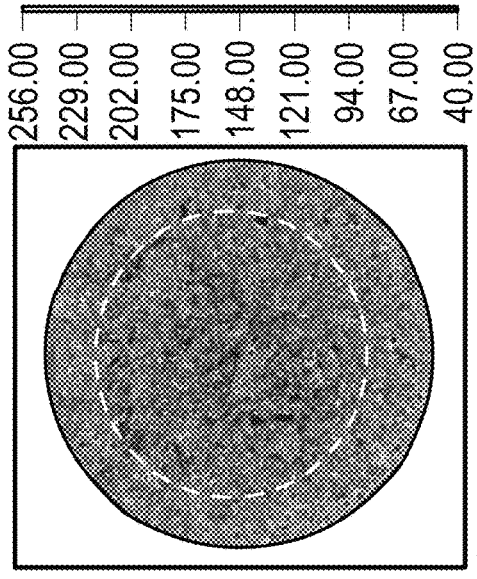
FIG. 10C is an X-CT slice of 4% NaOH F-FA sintered LWA manufactured according to an exemplary method of the present invention.
Figure 10D:
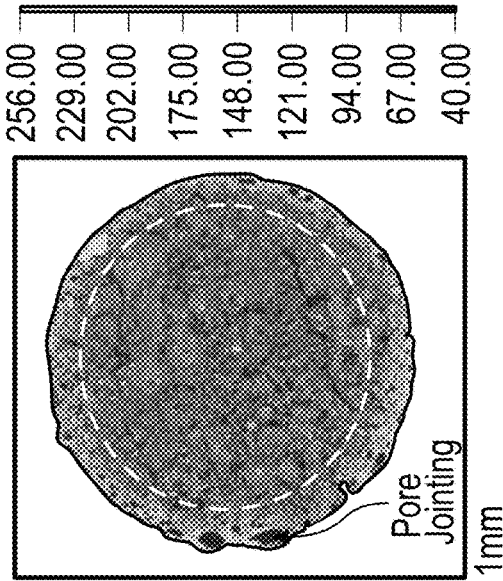
FIG. 10D is an X-CT slice of 6% NaOH F-FA sintered LWA manufactured according to an exemplary method of the present invention.
Figure 10E:
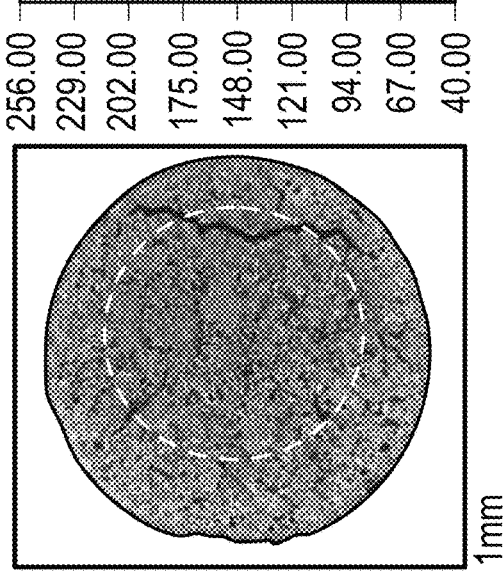
FIG. 10E is an X-CT slice of 8% NaOH F-FA sintered LWA manufactured according to an exemplary method of the present invention.
Figure 10F:
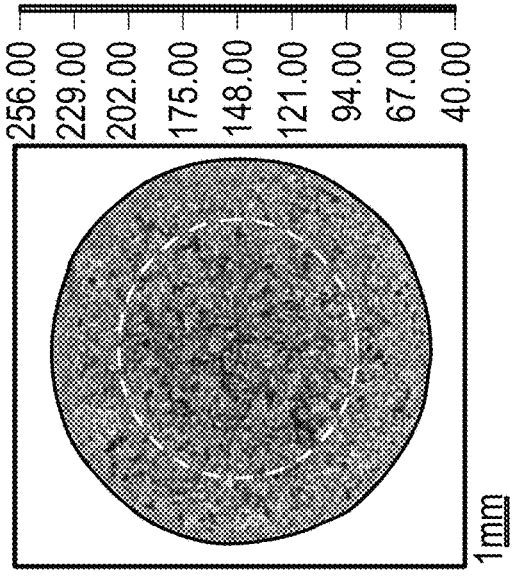
FIG. 10F is an X-CT slice of 10% NaOH F-FA sintered LWA manufactured according to an exemplary method of the present invention.
Figure 11A:
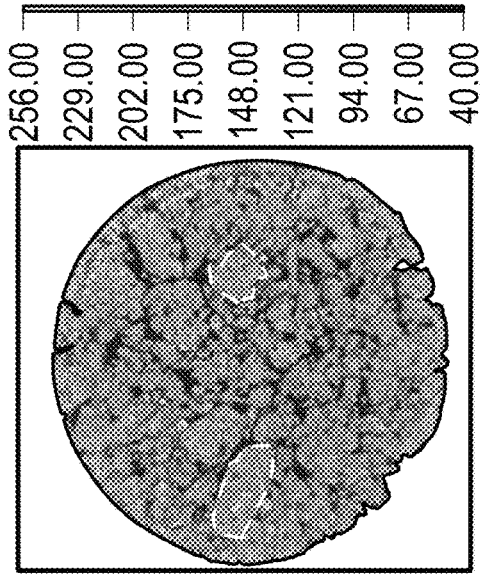
FIG. 11A is an X-CT slice of 0% NaOH C-FA sintered LWA manufactured according to an exemplary method of the present invention.
Figure 11B:
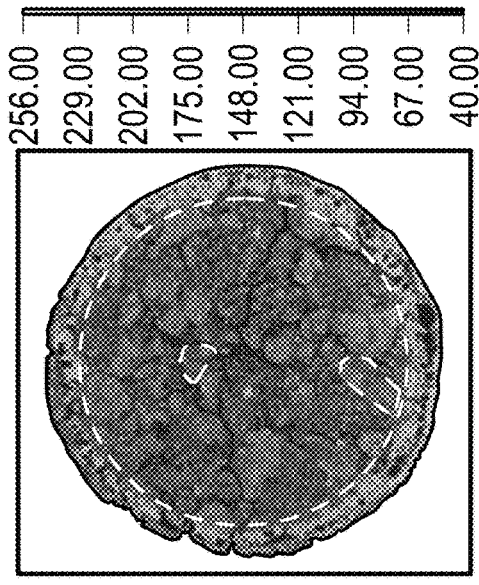
FIG. 11B is an X-CT slice of 2% NaOH C-FA sintered LWA manufactured according to an exemplary method of the present invention.
Figure 11C:
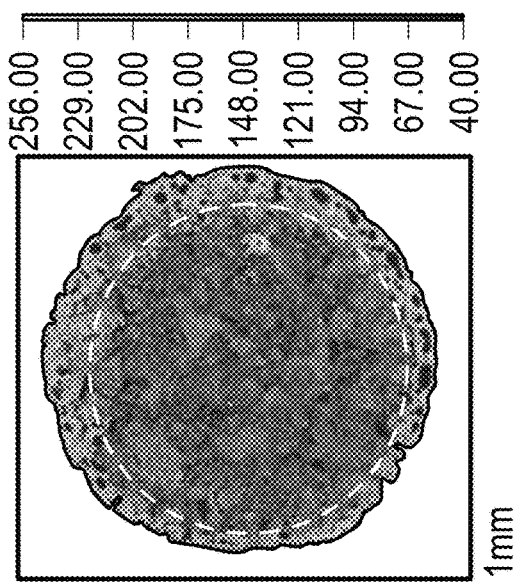
FIG. 11C is an X-CT slice of 4% NaOH C-FA sintered LWA manufactured according to an exemplary method of the present invention.
Figure 11D:
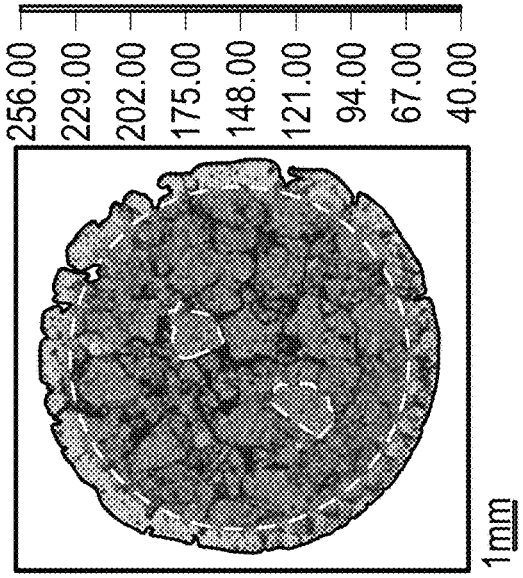
FIG. 11D is an X-CT slice of 6% NaOH C-FA sintered LWA manufactured according to an exemplary method of the present invention.
Figure 11E:
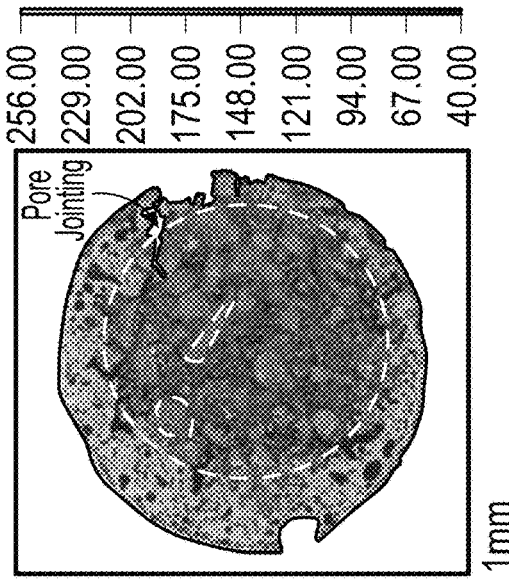
FIG. 11E is an X-CT slice of 8% NaOH C-FA sintered LWA manufactured according to an exemplary method of the present invention.
Figure 11F:
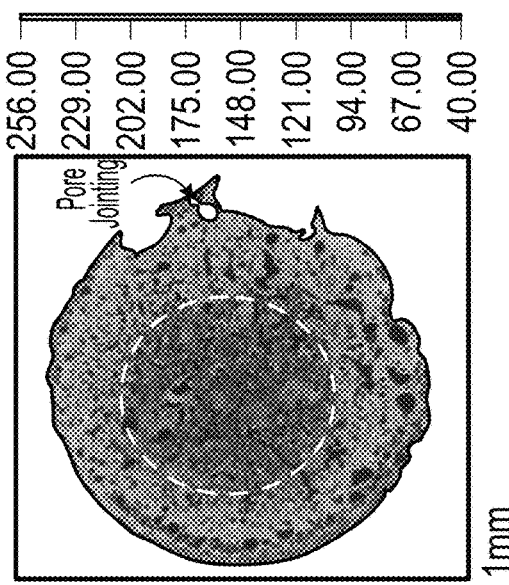
FIG. 11F is an X-CT slice of 10% NaOH C-FA sintered LWA manufactured according to an exemplary method of the present invention.

The unburnt carbon content available in the system can influence the extent of gas release close to sintering temperature; therefore, it is crucial to determine the unburnt carbon content of the fly ash. FIGS. 6A-B and 7A-B show the 2A-TGA performed on F-FA and C-FA respectively. For F-FA, as shown in FIG. 6A under $N_2$ atmosphere, the weight loss up to 500° C. could be related to evaporation of moisture and from 500° C. to 750° C. could be attributed to decomposition of amorphous phase available in the ash (see Table 2). In the second step, as shown in FIG. 6B and, under air atmosphere, the weight loss could be related to oxidation of unburnt carbon. It should be noted that the decomposition in the second step started at 600° C., which shows an overlap with the decomposition of amorphous phase in the first step i.e., under $N_2$ gas; therefore, it could be inferred that amorphous phase and carbon oxidation have overlapping in their decomposition. In the case of C-FA, as can be seen in FIG. 7A, the weight loss before 500° C. could be related to gradual evaporation of water, while after this temperature the decomposition can be related to amorphous phase. Similarly, the weight loss under air atmosphere demonstrated in FIG. 7B, which started at 500° C. was related to oxidation of unburnt carbon. The unburnt carbon content for F-FA and C-FA was determined to be 2.3% and 7%, respectively.

TGA was performed on geopolymerized pellets to simulate the sintering process and evaluate the gas release potential of LWA that leads to bloating mechanism. FIGS. 8A-8F show the TGA/DTG curves for the F-FA with incremental concentration of NaOH from 0% to 10%, respectively. As the temperature increased from room temperature to 1160° C., a few weight losses were observed which were corresponding to the decomposition of phases and accordingly gas release. H Peak is related to the release of free water from the structure of material. As the NaOH concentration increased a peak indicated as $Am_1$ was intensified in the range of ~400° C. to 650° C., which was corresponded to the formation of N-A-S-H gel in the material. The other peak designated by C occurring at 650° C. was most probably related to burning the free carbon content. However, it should be kept in mind, the decomposition of amorphous phase and carbon could overlap with each other. It should be noted that from 2A-TGA it was understood that burning the free carbon occurred between 600° C. and 900° C., with a peak at 800° C. However, in the case of geopolymerized pellets it appears that free carbon burning peaked at ~650° C. Two more decompositions occurred at temperatures greater than approximately 950° C., which were merged at 0% NaOH concentration and started to separate as the NaOH concentration increased. These two decompositions were seemingly related to anhydrite (showed with A) and hematite (showed with $H^-$). Hematite reduction could be facilitated by the presence of unburnt carbon in the ash. Therefore, it is speculated the reason for observing the gas release by reduction of hematite is partially related to the presence of 2.3% unburnt carbon.

FIGS. 9A-9F show the TGA performed on C-FA with NaOH concentration varying from 0% to 10%. The peak occurred at constant temperature of 100° C. indicated by H was related to free moisture release. The sharp peak designated by C+$Am_1$ was related to co-occurrence of amorphous phase decomposition and oxidation of free carbon from the material occurring at the range of 500° C. to 700° C. By increasing the NaOH concentration from 0% to 10% a peak located at the shoulder of peak C+$Am_1$ was appeared, designated by $Am_2$, which most probably was related to the formation of amorphous C—(N)-A-S-H gel. Finally, two peaks were identifiable in the range of 950° C. to 1160° C., which was corresponded to decomposition of anhydrite and release of oxygen from hematite. These two peaks are indicated by A and $H^-$ denoting anhydrite and hematite, respectively. C-FA LWA releases gaseous phase almost as three times as that of F-FA LWA close to the final sintering temperature. It could be related to the fact that C-FA had 2 times and 3 times more anhydrite and unburnt carbon, respectively, compared to F-FA. Greater unburnt carbon could be a potential source to facilitate reduction of hematite.

Evaluation of LWA Pore Structure Using X-CT

FIGS. 10A-10F and 11A-11F show the 2D slice of F-FA (FIGS. 10A-10F) and C-FA (FIGS. 11A-11F) with incremental NaOH concentration. As can be seen for F-FA LWA, a "core-shell" morphology could be identified for the LWA.

These two regions are separated by the circular/elliptical white dashed line on the 2D slices. The "shell" refers to the outer part of white dashed circle/ellipse, where spherical type pores were located. While the pores formed in the shell of F-FA-0% were in the size of 100 μm, the general trend implied that upon incremental NaOH addition, the pore located in the shell of LWA became larger. On the other hand, the middle part of the LWA (inner part of the white dashed line circle/ellipse), which is surrounded by shell is referred to as "core". In this region, seemingly pores are more interconnected and elongated. One of the reasons for formation of this morphology is related to the heat barrier created by the shell which delays the heat transfer to the middle part of the LWA. This phenomenon most probably resulted in the observation that the shell of LWA tends to have a higher gray scale value (GSV) compared to the core, which corresponds to higher density (this observation is more pronounced in the case of C-FA LWA). Interestingly, some major cracks were observed in the core of F-FA-4% LWA, and to a lesser extent for F-FA-8% and F-FA-10%. Two possible explanation could be considered for this observation: (i) occurrence of thermal cracking due to shrinkage during rapid sintering and (ii) displacement of the core of LWA by the release gas from the material.

As can be seen for C-FA-O %, a severe cracking occurred in the LWA, which could possibly be related to the two aforementioned reasons. Upon adding NaOH to the LWA, the core-shell morphology occurred for C-FA LWA as well. The shell embedded spherical type pores, which indicated the fluxing role of NaOH and formation of the liquid phase in the LWA. By passing 6% NaOH concentration the shell's thickness increased noticeably and the core of the LWA became smaller. As it can be seen, even in the presence of NaOH some cracks were formed in the core of the LWA. The cracks in the core of the LWA caused formation of island-type solid phase demonstrated by the white dashed line. Presence of the cracks in the core could potentially affect the structural integrity of the LWA. On the other hand, it is plausible that cracks could help with moisture transport and dynamics in the LWA pores. As it was mentioned the shell appears to have higher GSV and density, which is related to the fact that shell has experienced higher temperature compared to the core and more densification has occurred in that part.

The three required conditions for successful production of LWA through sintering (i.e., (i) sufficient amount of liquid phase; (ii) appropriate viscosity for the solid-liquid suspension; and (iii) adequate amount of effective gas release) are now discussed.

Formation of Liquid Phase During Sintering

Formation of the liquid phase in the LWA is a crucial factor to provide a medium for pore expansion and consequently the lightening mechanism. It is known that formation of 50% liquid phase in the LWA made from bottom ash could ensure presence of sufficient amount of liquid phase that can lead to lightening mechanism (bloating). However, presently, the raw material is FA with a considerably smaller particle size distribution (or higher surface area) compared with bottom ash is expected to have a different liquid phase content limit that can ensure pore expansion in the LWA. This was mainly due to the fact that higher surface area can supposedly promote the liquid phase formation. Presently, a 40% liquid phase content limit was defined (see FIG. 4). Correlating this limit with the XCT observations revealed that for F-FA LWA, starting with F-FA 0% (having 35.4% liquid phase content) the small spherical type pores (in the range of 100 microns) were formed in the shell of the LWA.

As the NaOH concentration gradually increased the liquid phase content got closer to 40% limit and finally passed it, which was consistent with the XCT observations, where showed formation of bigger spherical/round type pores (in the range of 500 microns) in the shell of the LWA. F-FA LWA passed the 40% limit at 6% NaOH concertation, which by looking at XCT observations formation of larger pores was notable.

In the case of C-FA LWA the liquid phase content for C-FA 0% was 15.7%, which was far below 40% limit. Correlating that with XCT observation (see FIGS. 10A-10F) it can be seen that no spherical type pores were formed in the shell of LWA. While as soon as in C-FA 2% the liquid phase content got close to 40% limit, some round pores started to form in the shell of LWA. In addition, as the NaOH concentration gradually increased the fluxing role of NaOH promoted formation of more liquid phase content (see FIG. 4), which provided a greater medium for pore expansion in the LWA. One of the reasons that C-FA LWA formed bigger pores compared with F-FA LWA, is due to higher liquid phase content for the former at each NaOH concertation (except 0% NaOH concertation) (see FIG. 4).

Viscosity of Solid-Liquid Phase During Sintering

Appropriate viscosity plays two major roles in the successful production of LWA through sintering; (i) allowing for the pores created by diffusion of gaseous phase into the liquid phase to expand and contribute to the bloating of LWA (the lesser viscosity the easier pore expansion occurs); and (ii) preventing excessive deformation for the LWA under gravitational force or the force created by pore expansion. For F-FA LWA as it was observed (see FIG. 5A) increasing the NaOH concentration decreased the viscosity of solid-liquid phase. Correlating this observation with that of XCT, it was observed that by increasing the NaOH concentration the pores became larger and some pore jointing occurred. This was directly related to the decreasing trend of viscosity for solid-liquid phase which allowed easier expansion and movement of pores in the liquid phase. Almost the same trend was observed for the C-FA LWA, i.e., as the NaOH concentration increased the viscosity of solid-liquid phase decreased, which allowed for easier expansion and jointing of the pores. A comparison between the pore structure of C-FA LWA and F-FA LWA implies formation of larger pores in the former. One of the reasons related to this difference is the lesser viscosity for the solid-liquid phase in C-FA LWA compared to F-FA LWA (see FIGS. 5A and 5B). C-FA possessed a higher content of CaO, which has a notable fluxing role and reduced the viscosity considerably.

Gaseous Phase Formation During Sintering

Figure 12:
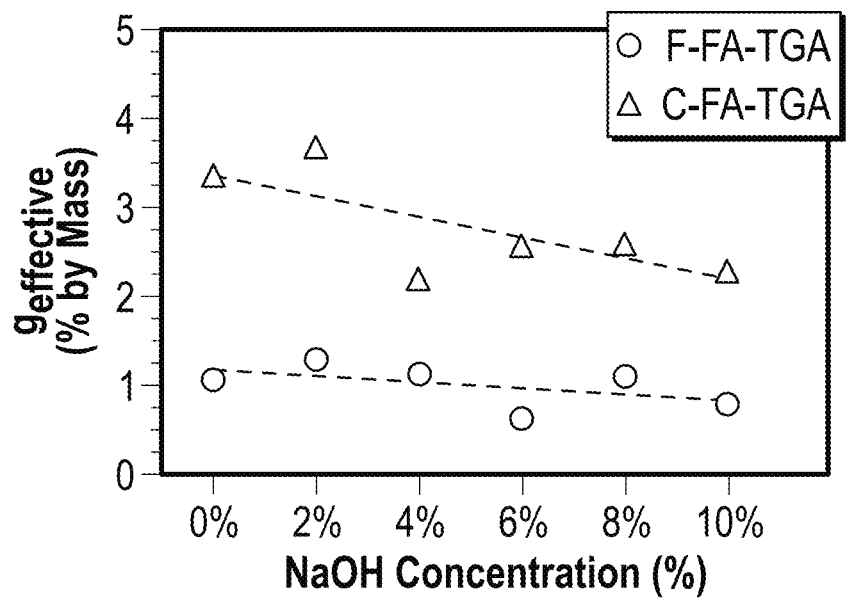
FIG. 12 is a graph showing effective gas release measured using TGA for F-FA and C-FA with varying NaOH concentration.

Formation of gaseous phase close to the sintering temperature that can be captured by the liquid phase would ensure pore creation and consequently occurrence of bloating in the LWA. In this study, the effective gas release ($g_{effective}$), which can contribute to the bloating of LWA was defined as the amount of released gas between the initial melting temperature (obtained from the phase diagrams) and ultimate sintering temperature i.e., 1160° C. FIG. 12 shows the $g_{effective}$ for F-FA and C-FA with varying NaOH concentration based on TGA results. As can be seen, TGA results indicated a considerable amount of gas release for both types of materials. When conditions (i) and (ii) are both satisfied with even 0.24% of $g_{effective}$, formation of gas filled pores is ensured in the LWAs made from bottom ash. The minimum $g_{effective}$ measured using TGA was that of F-FA 6% LWA equal to 0.64%, which by looking at XCT observation spherical type pore formation could be confirmed. It should be noted that, another possible reason for larger pores formed in C-FA LWA compared with F-FA LWA could be related to the higher $g_{effective}$ by former LWA.

Based on FIG. 12, TGA results indicated a trend for $g_{effective}$, where a slight reduction was observed for both FAs as the NaOH concentration increased. The thermodynamic modelling indicated that at low NaOH concentration the gas release was a mixture of $O_2$, $SO_2$, and $SO_3$. However, as the NaOH concentration increased the $O_2$ portion of the gas mixture decreased. This could be related to oxidation reactions occurring at high temperature which resulted in oxygen absorption. Higher $g_{effective}$ for C-FA in comparison with F-FA was related to both higher $SO_2+SO_3$ and $O_2$ gaseous phase released by this material. This could be partly justified by higher content of $SO_3$ in the chemical composition of C-FA (see Table 1).

Figure 13:
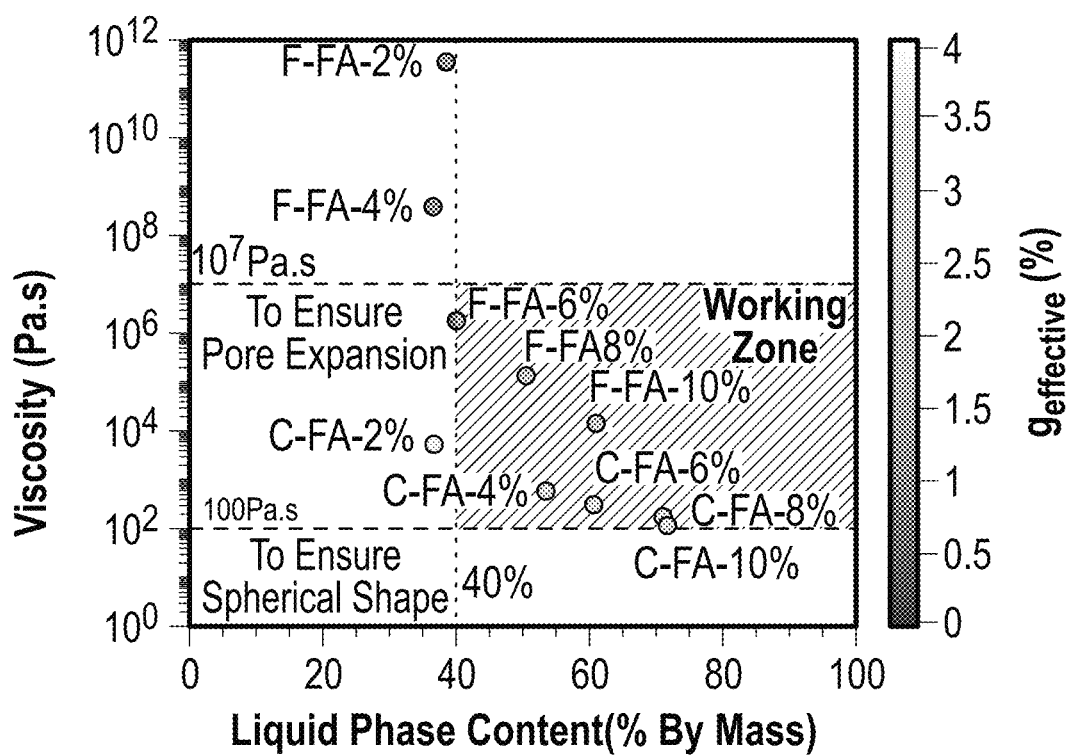
FIG. 13 is a plot showing a working zone satisfying the three necessary conditions for LWA production using fly ash.

To put the three required conditions (liquid phase content, viscosity of solid-liquid phase, and effective gas release amount) into perspective, a diagram was developed based on these quantified conditions, which is presented in FIG. 13. The location of each circle, associated with the produced LWA, is based on its liquid phase content and viscosity, and the color is associated with the $g_{effective}$ of that LWA from TGA results. As shown in FIG. 13, no LWA exceeds 80% liquid phase content.

If an LWA cannot be observed on this diagram that is due to the high viscosity for the solid-liquid phase. As it was discussed, 40% liquid phase content was necessary to provide a medium for expansion of the pores. The vertical dashed line shows the limit associated with the liquid phase content. For the LWA produced from bottom ash, a minimum 100 Pa·S viscosity was required to prevent deformation under gravitational force and retain the spherical shape. Correlating the XCT observation with that of viscosity it was found that distinguishable pore expansion started to occur in F-FA 6% LWA. This observation was translated to an upper limit of $10^7$ Pa·S, which below that the pore expansion could be expected in the LWA. Based on the proposed limitations F-FA 6%, F-FA 8%, F-FA 10%, C-FA 4%, C-FA 6%, C-FA 8%, and C-FA 10% were placed in this working zone. In this working zone the minimum $g_{effective}$ was that of F-FA 6%, which was 0.64%. Based on this work and the previous work it appears that even a minimum of 0.24% $g_{effective}$ could effectively contribute to pore creation in the LWA. Based on the proposed working zone and "C-FA LWA" it is expected that more than 80% liquid phase content could decrease the viscosity to less than 100 Pa·S for C-FA LWA, which deviates the spherical shape of the LWA. Therefore, a maximum of 80% liquid phase content was selected for the upper bound of C-FA LWA.

Therefore, the three necessary conditions for the production of LWA from low and high calcium waste FA through sintering process include: (i) formation of an adequate liquid phase content for the LWA; (ii) appropriate viscosity for the solid-liquid phase in the LWA; and (iii) release of sufficient amount of gaseous phase. The following primary conclusions can be drawn from this method:

Formation of at least 40% liquid phase content is necessary for the LWA prepared with both types of FA to ensure gas-filled pore creation in the LWA. For the LWAs with liquid phase content less than this limitation gas filled pores rarely could be observed.

The viscosity of solid-liquid phase can control the size of formed pores in the pore structure of the LWA. Larger pores were observed in C-FA LWA compared with F-FA LWA due to lesser viscosity for the former. A lower bound of 100 Pa·S was confirmed to prevent the deformation of LWA during sintering (affected by gravitational force). In addition, $10^7$ Pa·S was found to be the upper limit for LWA prepared with FA, below which the pore expansion could occur in the LWA.

$g_{effective}$ was found to be necessary for pore creation in the LWA considering the requirements mentioned in (i) and (ii) were satisfied. A considerable amount of $g_{effective}$ was observed for all the LWA developed in this study, where C-FA LWA had almost three times greater $g_{effective}$ compared with F-FA LWA. The higher $g_{effective}$ could be one possible reason for the formation of larger pores in C-FA LWA. The gas release was related to presence of hematite and anhydrite in the raw FA. In addition, it was found that presence of higher unburnt carbon content and anhydrite in C-FA could be the possible reason for higher $g_{effective}$ of LWA prepared with this material.

Based on the predictive diagram developed in this study it was found that a minimum of 6% and 4% NaOH concentration could produce a successful LWA from F-FA and C-FA, respectively. These minimum concentrations could be beneficial from a cost and environmental impact point of view. However, at the same time, the functionality (i.e., engineering properties such as, specific gravity, compressive strength, water absorption, and water desorption) of these LWA needs to be assessed to determine an optimal NaOH concentration as well; this is due to the fact that different NaOH concentrations could influence the performance of LWA.

FA-LWA can be used for different applications such as lightweight concrete production, internal curing of concrete, green roofs, and embarkment, where each application may require a specific engineering properties for the LWA.

While the above method is described to manufacture LWA according to an exemplary embodiment of the present invention using fly ash, those skilled in the art will recognize that bottom ash can also be used. Below is an exemplary method of manufacturing LWA using bottom ash, using similar methods to the method using fly ash as described above.

Example 2—Waste Bottom Ash

Two types of bottom ash (BA), low-calcium (LC) and high-calcium (HC), were used for LWA production. The LWA manufacturing procedure started by drying the raw ash material, followed by sieving to the appropriate particle size distribution. Afterward, the prepared ash was mixed with various NaOH solutions (molarities of 2.5 M, 6.25 M, and 10 M) to reach mass concentrations (mass of solid NaOH per mass of bottom ash) of 4%, 10%, and 16%. NaOH solutions with a liquid to solid ratio of 0.4 were used for geopolymerization during the curing period as well as to serve as a fluxing agent to reduce the melting temperature of the mixture. The mixture was then pelletized into spherical shape and cured at 40° C. and 30% relative humidity (RH) for 24 h. Finally, the pellets were sintered at 1160° C. to produce LWA. Samples were labeled as XX-BA-YY %, where XX represents the BA type (LC or HC), while YY % indicates the concentration of NaOH.

Research Methodology

The research methodology was divided into two parts, analytical modeling and experimental investigation, to examine the required conditions for LWA production. The analytical part employed thermodynamic modelling and viscosity calculations to quantify liquid phase formation as a function of temperature during sintering and to calculate viscosity values for the resulting solid-liquid suspension. Experiments were used to study the chemical compounds that can lead to gas emission during the sintering process and quantify the amount of the emitted gaseous phase that leads to LWA pore formation. The pore-solid structure of LWA was investigated using X-CT with respect to these three required for successful LWA production.

Analytical Modeling

Analytical modeling consisted of developing phase equilibria and quantification of liquid phase formation using the Factsage software as well as using the thermodynamic modeling outputs, including the chemical composition of the liquid phase content, to calculate the viscosity of solid-liquid system.

Factsage Simulation

The Factsage thermodynamic modelling software, along with the FToxide database, was used to predict the multi-phase equilibria based on Gibbs free energy minimization algorithm for the multi-component system during sintering. The simulation was performed at 1 atm under an ordinary air atmosphere, which was composed of 0.21 mole oxygen and 0.79 mole nitrogen, in accordance with the conditions of LWA sintering. The initial and final temperatures for the modeling were set to 800° C. and 1400° C., respectively, with 50° C. intervals. The major chemical oxides of the ashes, which were used as the input in the Factsage software, were determined using x-ray fluorescence (XRF). For LC-BA, the oxide content was 63.2% $SiO_2$, 20.1% $Al_2O_3$, 3.51% CaO, 6.66% $Fe_2O_3$, 0.97% MgO, and 1.43% $Na_2O$ by mass. For HC-BA, the oxide content was 43.1% $SiO_2$, 17.1% $Al_2O_3$, 20.1% CaO, 7.29% $Fe_2O_3$, 4.1% MgO, and 1.19% $Na_2O$ by mass. In addition, NaOH was used as the fluxing agent in the thermodynamic modelling.

Viscosity Calculations

Empirical models have been developed to predict coal ash liquid phase (slag) viscosity based on a simplified slag chemical composition. The empirical model developed by Browning et al. was found to be more applicable for the prediction of the liquid phase (slag) viscosity due to experimentally determined lower bias and higher accuracy compared with earlier developed models. The Browning model assumes that the viscosity of the slag falls into a Newtonian region and correlates viscosity with temperature (T) using a temperature shift (Ts) (Equation 1). Ts, as presented in Equation 2 is a function of the composition parameter, i.e., "A." "A" is defined as the weighted molar ratio of network former (numerator of Equation 3) to network modifier (denominator of Equation 3) elements as presented in Equation 3, where the quantity of each component is in mole fraction and their summation must add up to unity (Equation 4).

The composition of the liquid phase (slag) at different temperatures for each LWA was obtained using Factsage with varying fluxing agent concentrations and was used to estimate the viscosity of liquid phase. It should be noted that during sintering at some temperatures the LWA system is composed of liquid and solid phase concurrently; therefore, the suspension's (solid-liquid phase) viscosity falls into non-Newtonian region, and becomes highly dependent on the volume fraction of solid phase. Thus, to estimate the viscosity of solid-liquid suspension, the Krieger and Dougherty model was used (Equation 5).

Experiments consisted of four parts: (1) characterizing the properties of as-received raw materials, (2) characterizing the mineral phases of the geopolymerized pellets before sintering, (3) understanding the sintering process of the pellets at elevated temperature, and (4) characterizing the pore structure of the final LWA product. Table 3 summarizes the techniques used to study each part.

TABLE 3

Experimental program

| Part | Test | Purpose |
| --- | --- | --- |
| (I): Raw Material Acquisition | XRF | To assess the chemical composition of ashes (discussed in Section Error! Reference source not found. and conducted by the bottom ash provider) |
| | QXRD | To quantify the mineral phases of ashes |
| | TGA | To determine the free carbon content of ashes |
| (II): Geopolymerization | QXRD | To assess formation of new phases at different concentrations of NaOH in the geopolymerized pellets |
| (III): Sintering | TGA | To identify the candidate reactions and products that contribute to the formation of pores |
| (IV): Final product | X-CT | To assess internal morphological features and the LWA pore structure |

Quantitative x-Ray Powder Diffraction (QXRD)

X-ray diffraction analysis was performed using a Rigaku Smartlab instrument using steps of 0.02° in a 10° to 70° 2θ range. A $Cu_{K\alpha}$ source operating at 40 Kv and 40 mA was used during the test. Phase identifications and Rietveld refinements were performed using the open source Profex software.

To perform QXRD on the raw materials, the following procedure was adopted: (1) raw LC- and HC-BA (with a particle size distribution described in [3]) were taken separately, (2) the powder was crushed using a mortar and pestle, (3) the obtained powder was sieved through an ASTM #200 sieve (75 μm mesh opening), (4) the portion of powder that was retained on the #200 sieve was re-crushed and sieved to make sure the entire powder passed through the #200 sieve, (5) 0.8 g±0.001 g of the prepared powder was blended with 0.2 g±0.001 g of Rutile ($TiO_2$), used as a reference powder with purity greater than 99% and mean particle size of 5 μm, and (5) the final blended powder was used in the QXRD test. The same sample preparation procedure was used to prepare QXRD samples of geopolymerized pellets after curing in an environmental chamber at 40° C. and 30% RH for 24 h.

TGA

Figure 14:
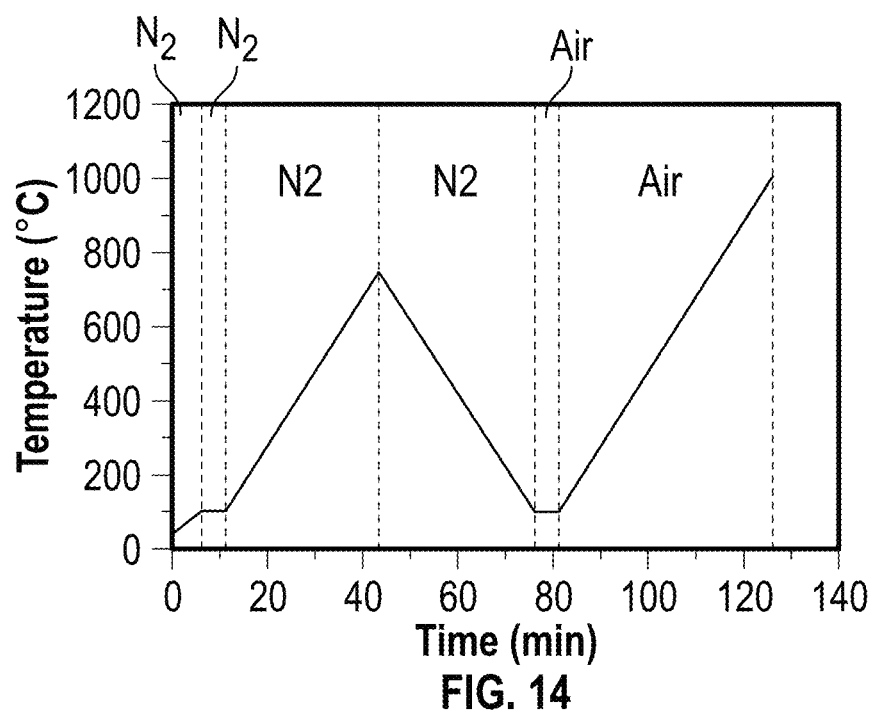
FIG. 14 is a graph showing time v. temperature of a 2-atmosphere TGA application for determination of unburnt carbon content of raw materials.
Figure 15A:
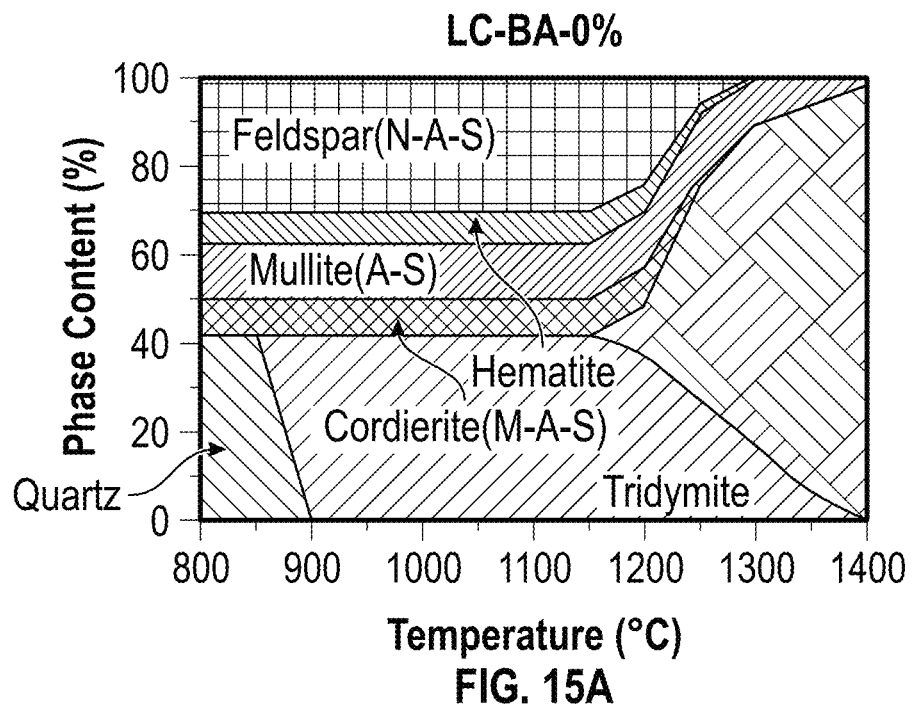
FIG. 15A is a phase diagram for low-calcium (LC) bottom ash (BA) with 0% NaOH.
Figure 15B:
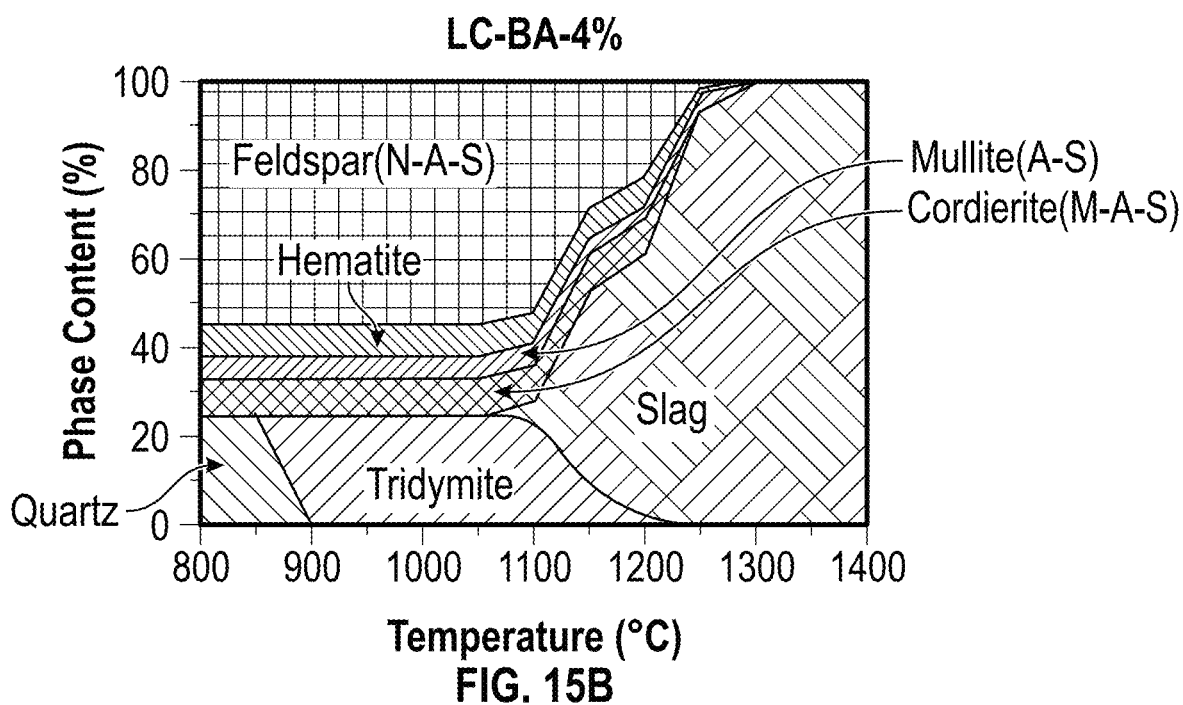
FIG. 15B is a phase diagram for LC-BA with 4% NaOH.
Figure 15C:
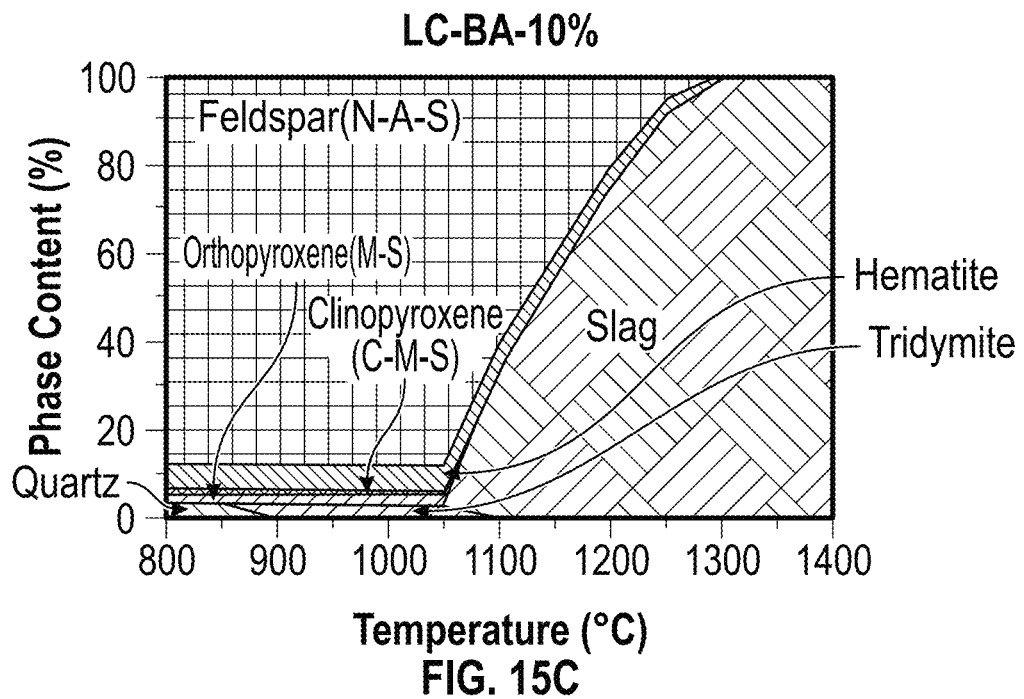
FIG. 15C is a phase diagram for LC-BA with 10% NaOH.
Figure 15D:
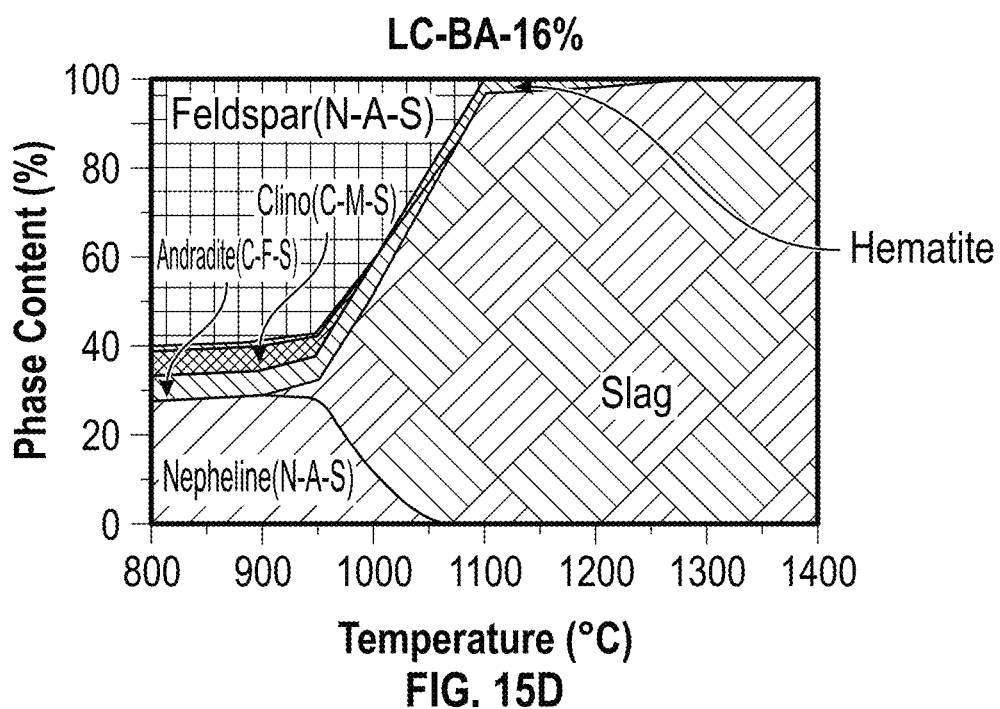
FIG. 15D is a phase diagram for LC-BA with 16% NaOH.
Figure 16A:
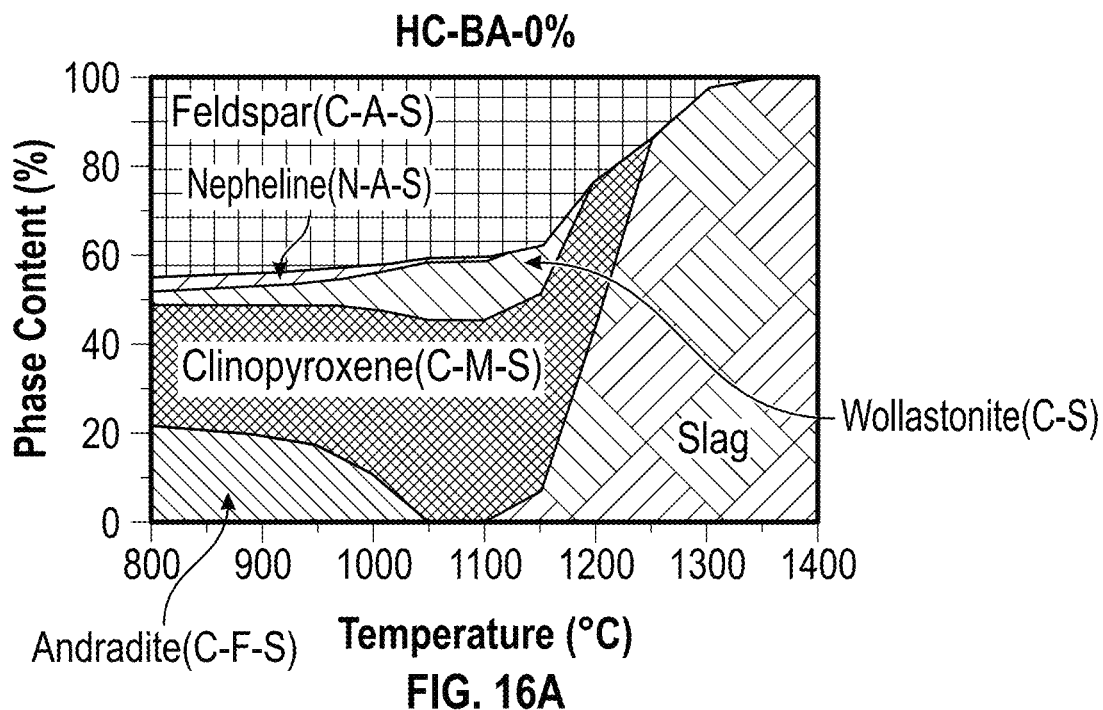
FIG. 16A is a phase diagram for HC-BA with 0% NaOH.
Figure 16B:
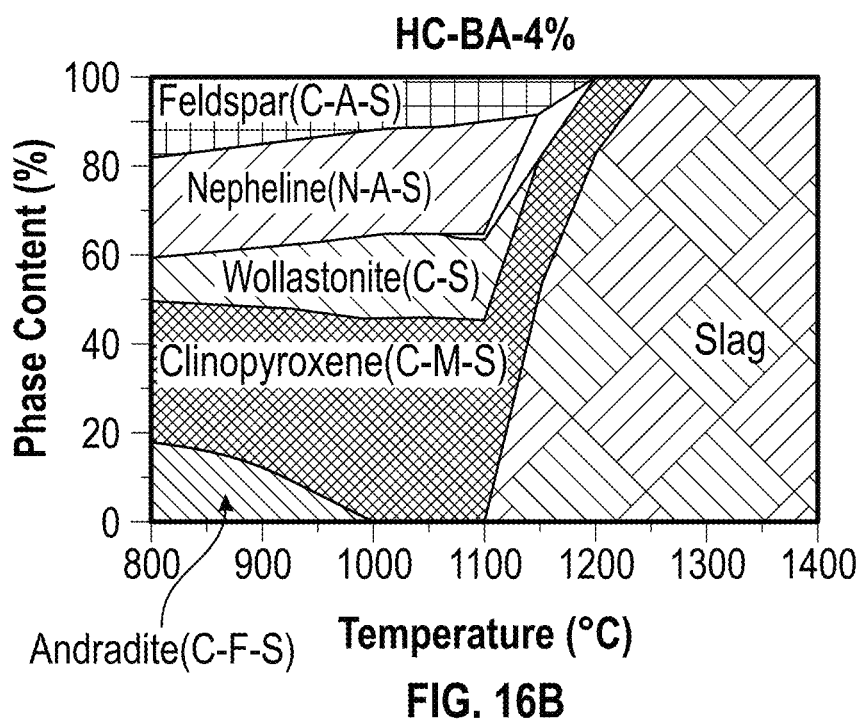
FIG. 16B is a phase diagram for HC-BA with 4% NaOH.
Figure 16C:
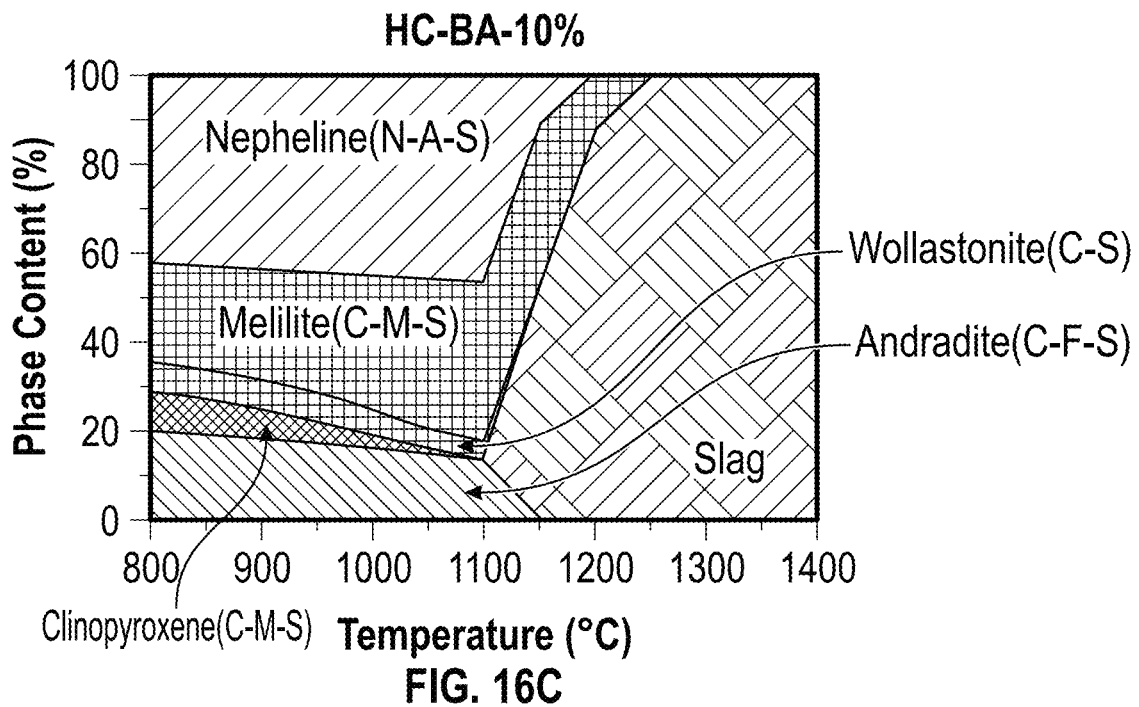
FIG. 16C is a phase diagram for HC-BA with 10% NaOH.
Figure 16D:
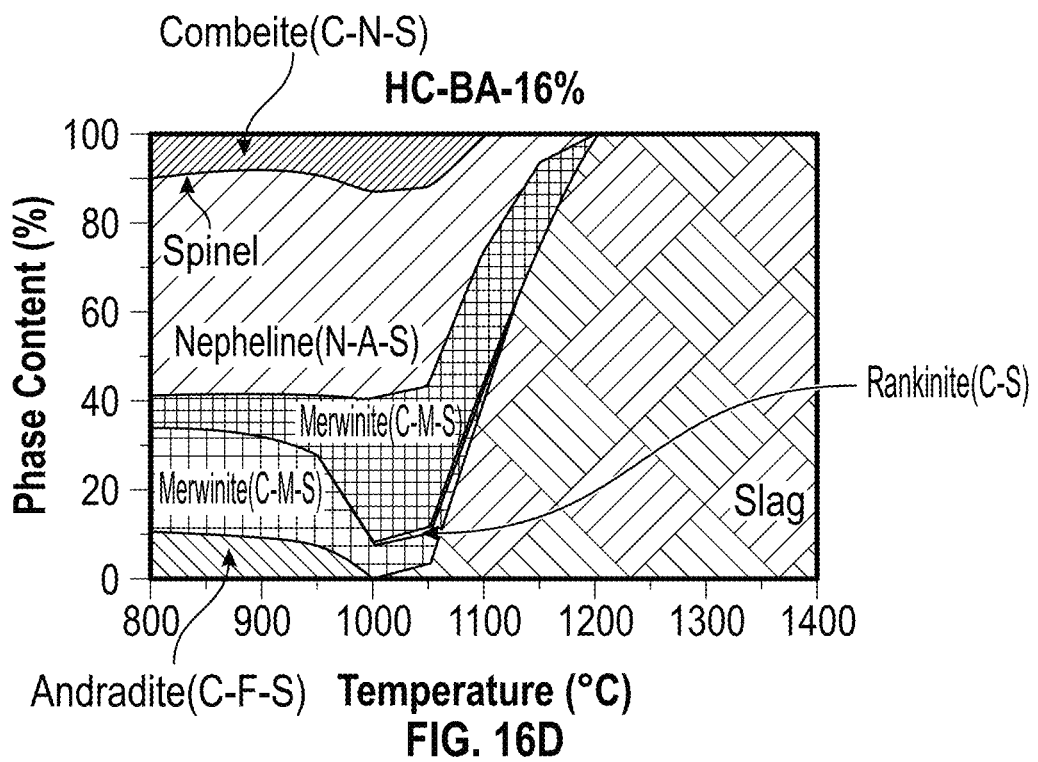
FIG. 16D is a phase diagram for HC-BA with 16% NaOH.

TGA was carried out using a TA Instrument Q5000 IR model. To determine the unburned carbon content of the raw material, a 2-atmosphere TGA (2A-TGA) procedure using nitrogen and air gases was performed according to FIG. 14. Those skilled in the art will recognize that other measuring instruments can be used.

This was mainly to separate the oxidization of carbon from other decomposition reactions occurring in the same range of temperatures. In this regard, temperature was increased to 100° C. and was kept there for 5 min under nitrogen atmosphere in order to evaporate the free water. Next, still under nitrogen gas, temperature was increased to 750° C. with a ramp of 20° C./min. Afterwards, under nitrogen gas the temperature decreased back to 100° C. with a ramp of 20° C./min. In the next step, the gas was changed to air and temperature was kept at 100° C. for 5 min. Finally, under air gas, temperature was increased to 1000° C. with a ramp of 20° C./min. Raw materials were crushed using a mortar and pestle and were sieved through a #200 sieve. Crushing and sieving was repeated to ensure that the entire amount of the initial powder had a size smaller than 75 μm. Sample masses of 30 mg to 40 mg was used in the TGA tests. Considering the melting behavior of LWA at sintering temperature near 1160° C., a fine crucible refractory ceramic powder was used as a bed in the TGA pan to prevent any sintered material adhering to the crucible pan during melting.

For geopolymerized pellets, the same sample preparation procedure was adopted; however, TGA tests were performed under an air atmosphere only to simulate the actual sintering conditions in LWA production. Samples were heated at a rate of 10° C./min to 1160° C. (the sintering temperature) and then were held at this temperature for 4 min.

X-Ray Computed Tomography (X-CT)

X-CT was performed to non-destructively assess the LWA internal morphology. In this method, a series of projection images of the sample, which is mounted on a rotating stage, were collected. Using tomographic reconstruction, cross sectional 2D slices were then obtained. 3D sample reconstruction was obtained by vertically stacking the 2D slices. The X-CT was carried out using a Zeiss Versa XRM 500 system. The x-ray synchrotron was set for 80 kv and 87 mA. The exposure time per step for 180° rotation was ~0.6 sec. The images were taken with a voxel size of approximately 18 μm. For constructing 3D images, visualizing 2D slices, and videos, the Dragonfly software was used.

Results

The results of thermodynamic predictions to quantify the liquid phase and its viscosity formed during sintering are presented. The QXRD and the TGA/DTG results are also presented to assess the phase development before sintering and identify the potential compounds that could contribute to gas emission during sintering and consequently pore creation. Furthermore, the LWA pore structure was assessed using X-CT.

Thermodynamic Predictions of LWA Multi-Component System During Sintering

Phase Equilibria and Quantification of Liquid Phase Formation

FIGS. 15A-15D show the predicted phase diagrams for LC-BA with 0%, 4%, 10%, and 16% addition of NaOH, respectively, as the fluxing agent. NaOH has three main effects on the sintering process according to thermodynamic modeling: (1) reducing the LWA melting temperature (BA+NaOH), (2) reducing the liquid phase viscosity (since $Na^+$ is a network modifier), and (3) initiating geopolymerization for the LWA (BA+NaOH) system. Thermodynamic modeling calculates equilibrium conditions only and does not consider any kinetics governing the sintering process, which may influence the quantity and the type of formed phases. For example, formation of a viscous liquid phase near the LWA surface may hinder the penetration of the oxygen to the LWA inner core, which can result in a reduction in atmospheric pressure in outer area and alter the kinetics of phase formation phenomena.

A good quality LWA requires enough liquid phase (slag) to entrap emitted gas near the sintering temperature (1160° C.). The slag contents for LC-BA-0%, LC-BA-4%, LC-BA-10%, and LC-BA-16% at 1160° C. were estimated to be 2.6%, 47.2%, 59.5%, and 97.8%, respectively. FIGS. 16A-16D show the predicted phase diagrams for HC-BA with 0%, 4%, 10%, and 16% addition of NaOH. The slag content for HC-BA-0%, HC-BA-4%, HC-BA-10%, and HC-BA-16% at 1160° C. were estimated to be 10.3%, 58.3%, 65.3%, and 85.5%, respectively.

HC-BA-0% had a lower melting temperature (i.e., 1100° C.) compared with LC-BA-0% (i.e., 1150° C.). This can be justified by the fact that in a system without NaOH and major presence of $SiO_2$—$Al_2O_3$ compounds, increasing the amount of CaO lowers the melting temperature for the CaO—$SiO_2$-$Al_2O_3$ system due to the formation of compounds that have lower melting temperature than that of mullite ($3Al_2O_3.2SiO_2$) formed in a binary system of $Al_2O_3$ and $SiO_2$. For LC-BA, incorporation of a higher amount of NaOH led to the formation of higher Na-bearing Feldspar ($NaAlSi_3O_8$) content (as can be seen in the phase diagram), which has a melting temperature between 730° C. and 1100° C. Therefore, the melting temperature of LC-BA was reduced by increasing the NaOH concentration and higher liquid phase (slag) content was formed. The melting temperatures for LC-BA-4%, LC-BA-10%, and LC-BA-16% were 1050° C., 1050° C. and 900° C., respectively.

Addition of NaOH to HC-BA did not significantly change the melting temperature for the system (FIGS. 16A-16D). This can be explained by formation of several Ca-bearing phases at elevated temperature in the HC-BA geopolymerized pellets (NaOH added) that have high melting temperatures along with Nepheline ($NaAlSiO_4$), which has a melting temperature between 1100° C. to 1256° C. Accordingly, the melting temperature of the HC-BA-NaOH system remained higher compared to the LC-BA+NaOH system. The melting temperatures for HC-BA-4%, HC-BA-10%, and HC-BA-16% were predicted to be 1100° C., 1100° C., and 1000° C., respectively. It should be noted that formation of Na bearing phases such as Nepheline (with major quantity) in HC-BA-NaOH system helped to increase the liquid phase content.

Viscosity Predictions of Solid-Liquid System

Figure 18A:
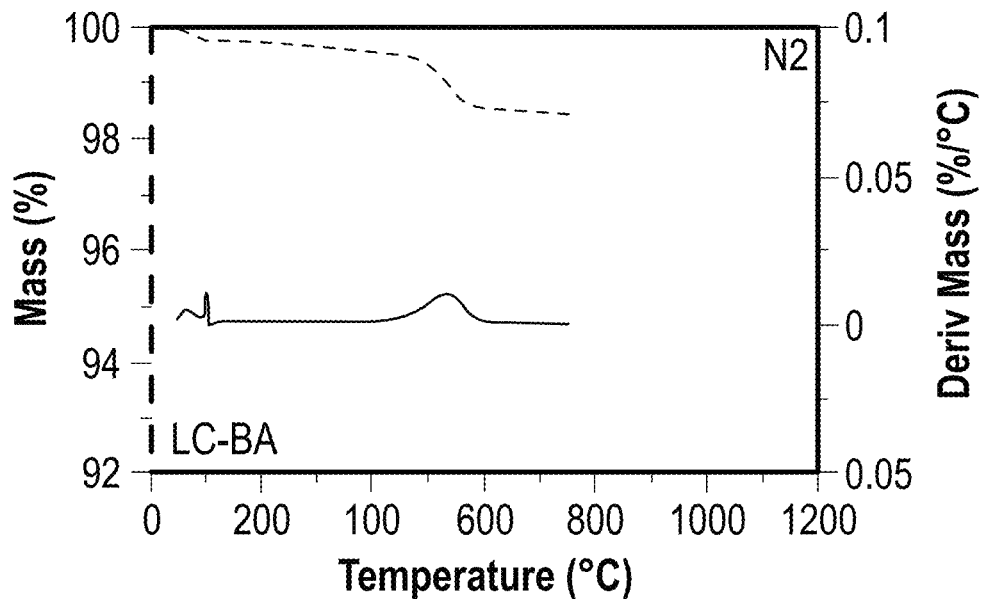
FIG. 18A is a graph of 2-atmosphere TGA performed on raw LC-BA to determine unburnt carbon under a nitrogen atmosphere.
Figure 18B:
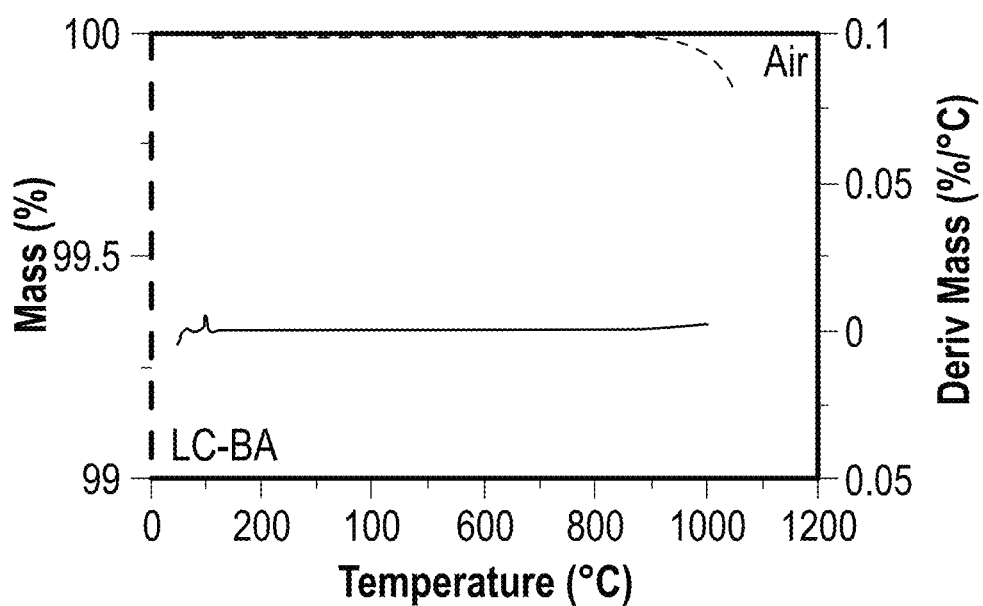
FIG. 18B is a graph of 2-atmosphere TGA performed on raw LC-BA to determine unburnt carbon under an air atmosphere.
Figure 19A:
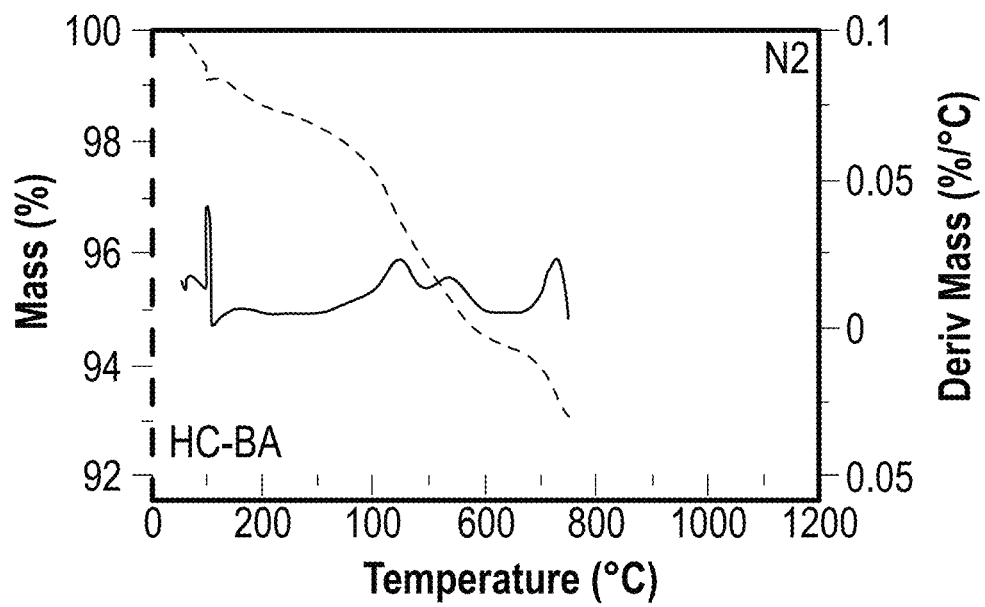
FIG. 19A is a graph of 2-atmosphere TGA performed on raw HC-BA to determine unburnt carbon under a nitrogen atmosphere.
Figure 19B:
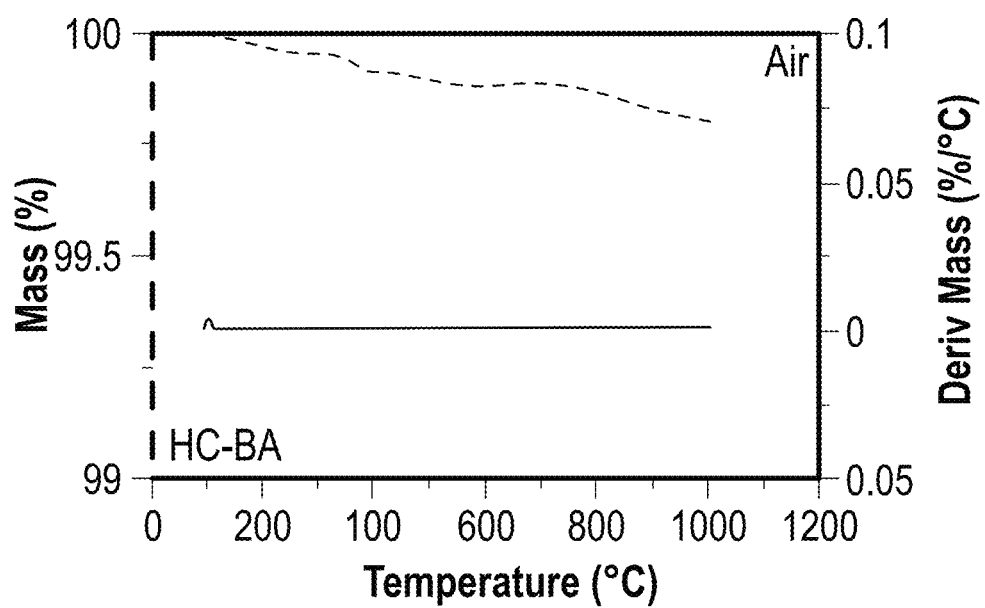
FIG. 19B is a graph of 2-atmosphere TGA performed on raw HC-BA to determine unburnt carbon under an air atmosphere.
Figure 20A:
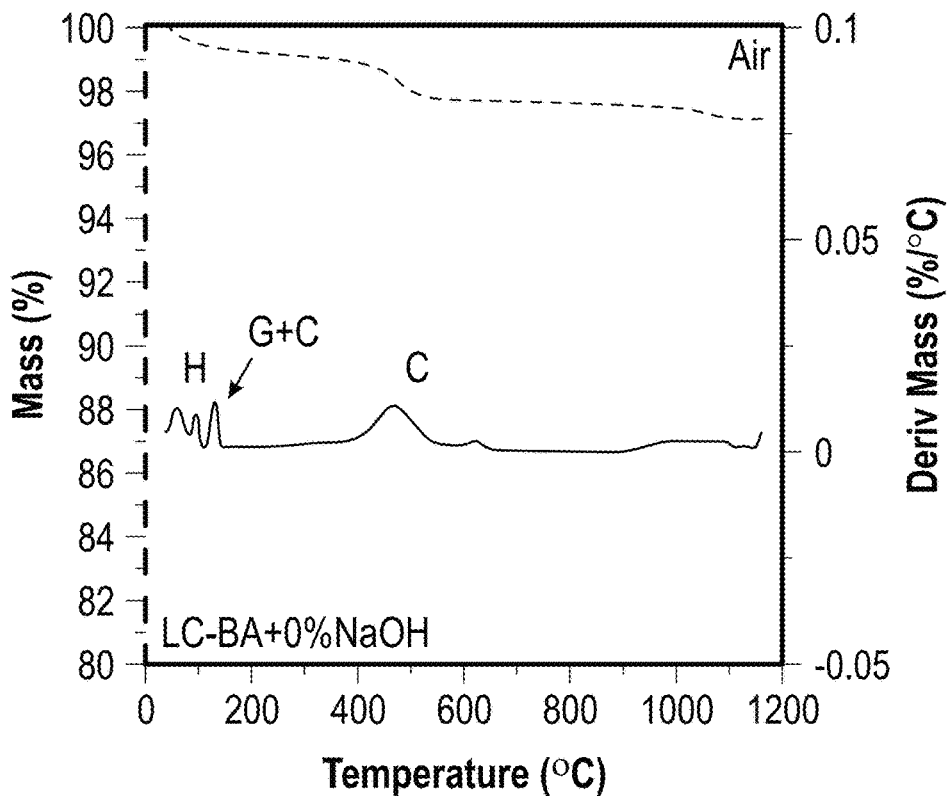
FIG. 20A is a graph showing Thermogravimetric Analysis/Derivative Thermogravimetry (TGA/DTG) curves for LC-BA with 0% NaOH.
Figure 20B:
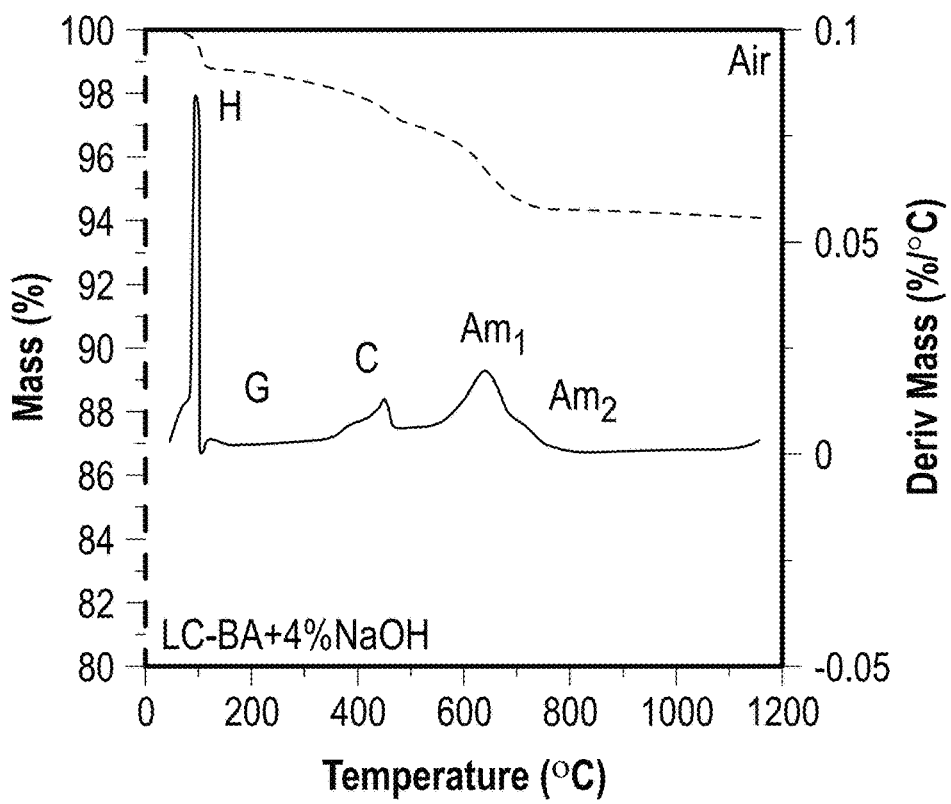
FIG. 20B is a graph showing TGA/DTG curves for LC-BA with 4% NaOH.
Figure 20C:
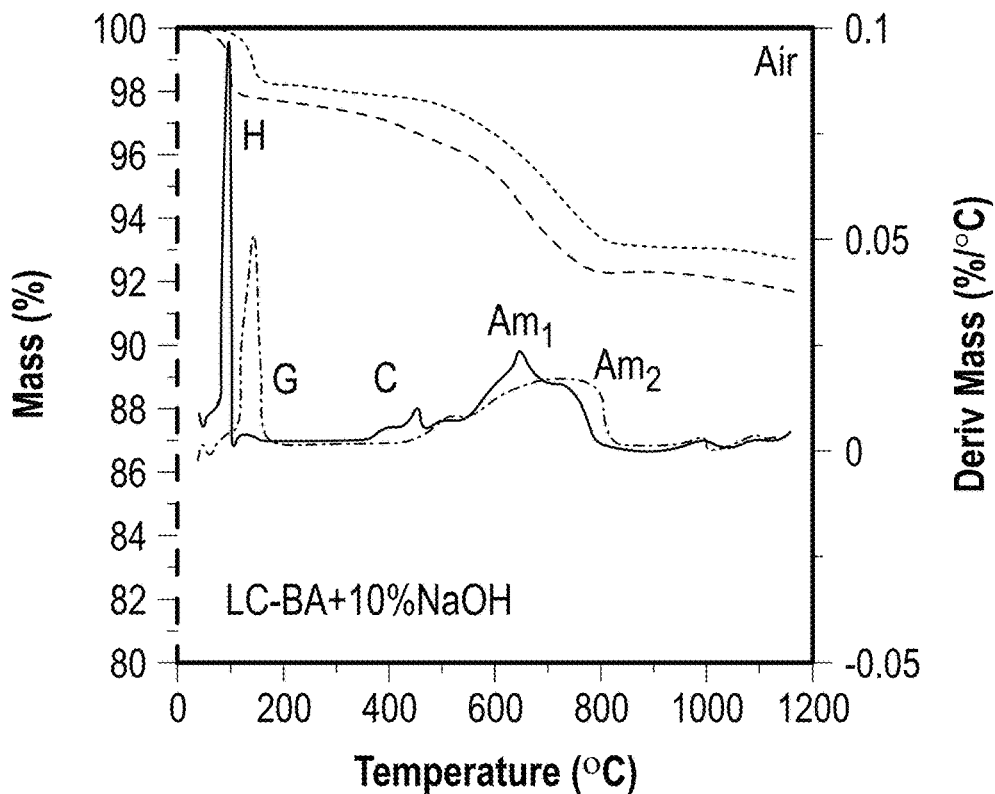
FIG. 20C is a graph showing TGA/DTG curves for LC-BA with 10% NaOH.
Figure 20D:
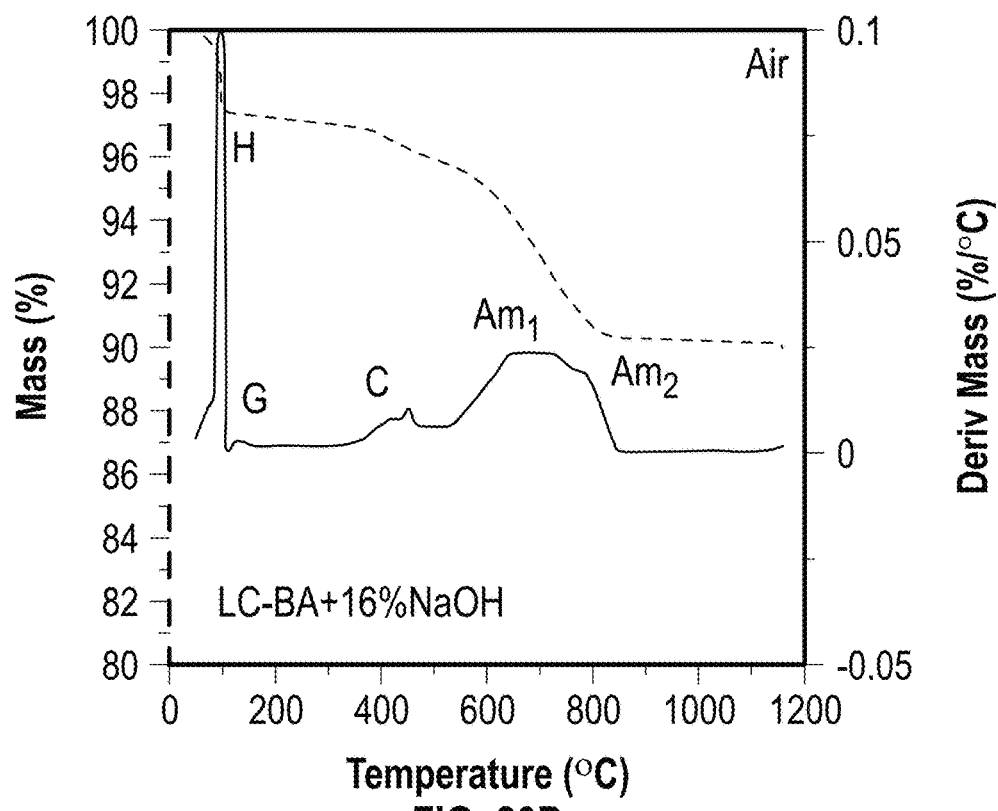
FIG. 20D is a graph showing TGA/DTG curves for LC-BA with 16% NaOH.
Figure 21A:
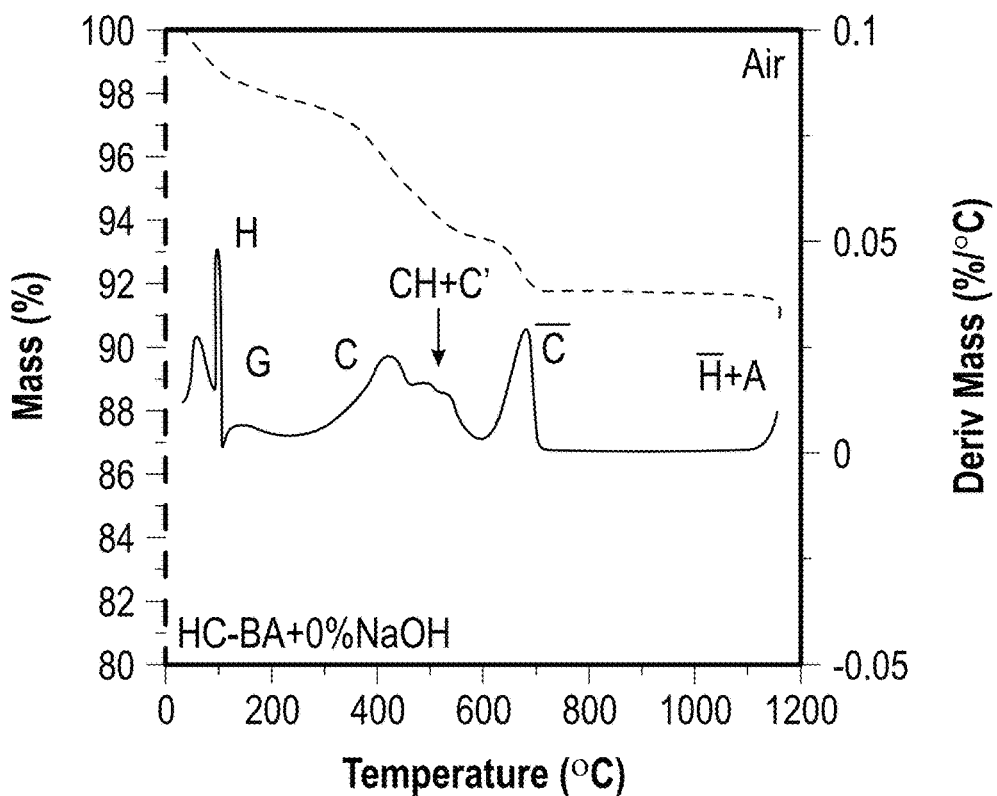
FIG. 21A is a graph showing TGA/DTG curves for HC-BA with 0% NaOH.
Figure 21B:
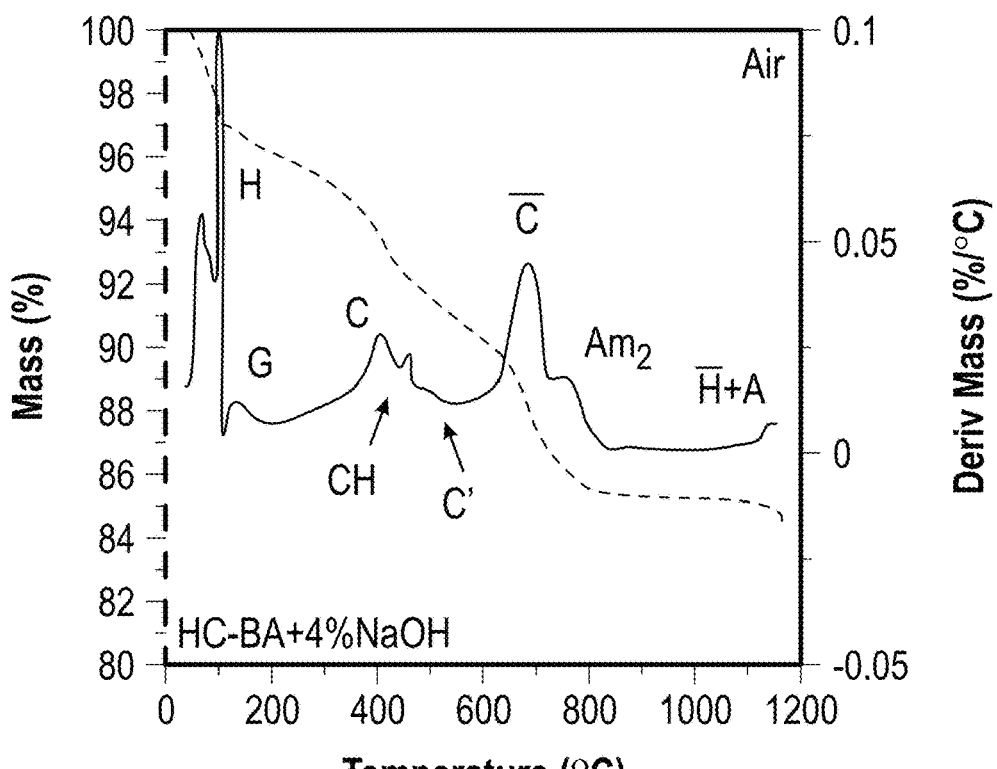
FIG. 21B is a graph showing TGA/DTG curves for HC-BA with 4% NaOH.
Figure 21C:
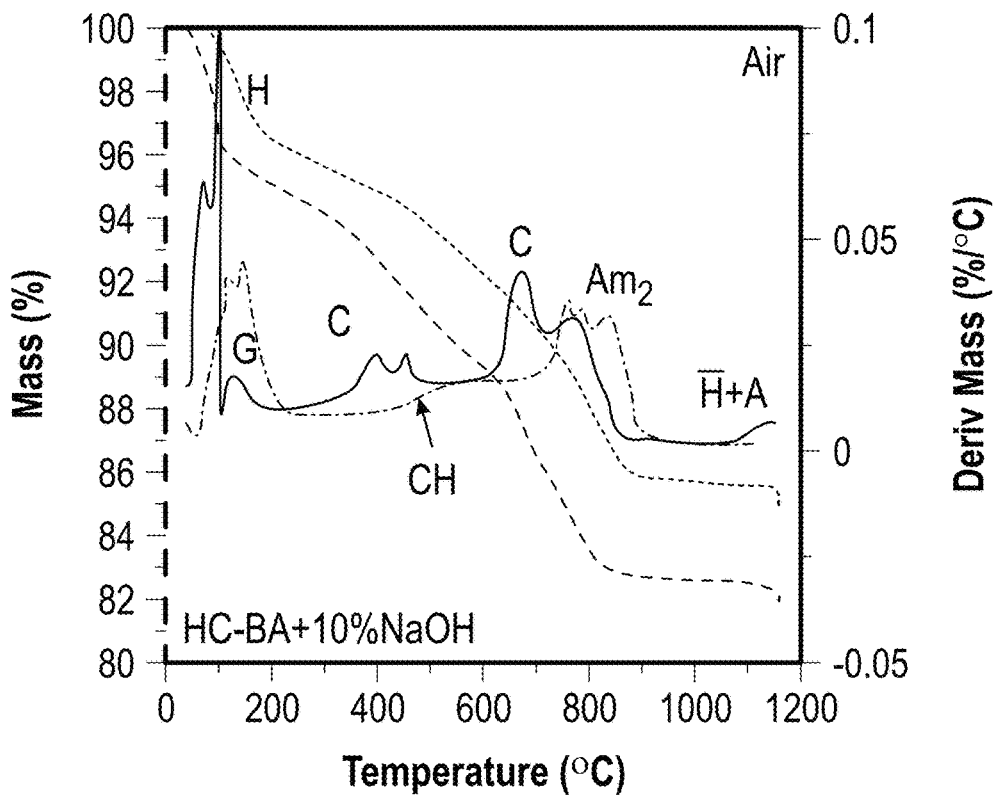
FIG. 21C is a graph showing TGA/DTG curves for HC-BA with 10% NaOH.
Figure 21D:
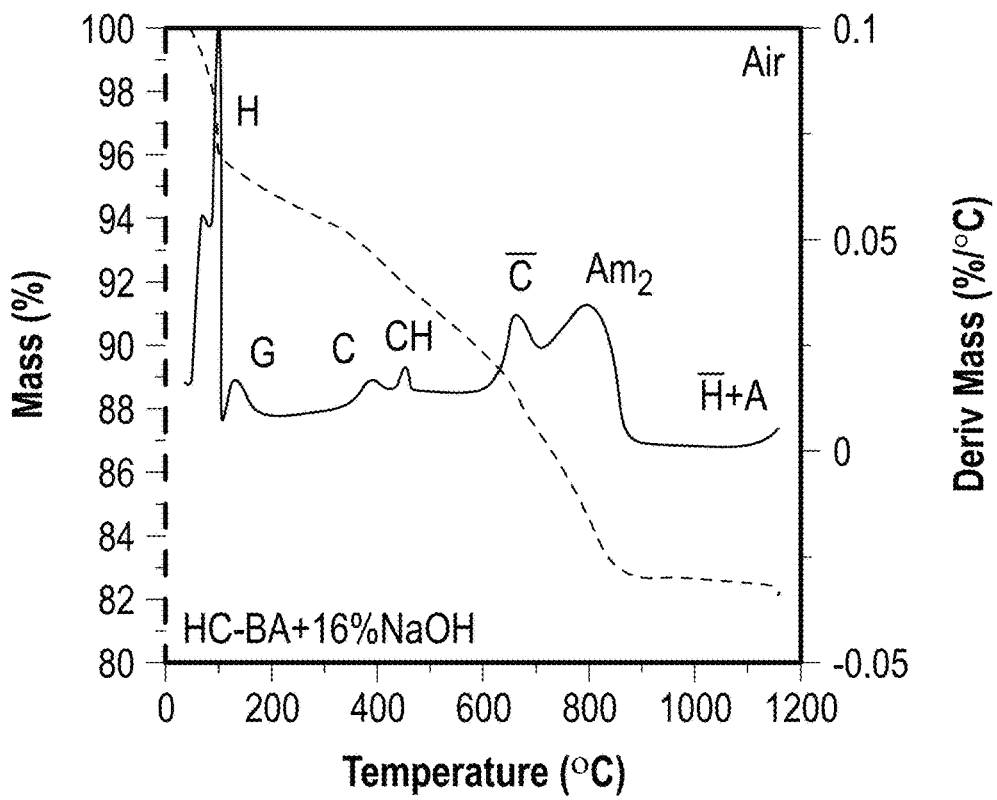
FIG. 21D is a graph showing TGA/DTG curves for HC-BA with 16% NaOH.

FIGS. 18A and 18B show estimated viscosity values for the solid-liquid system as a function of temperature for LC-BA and HC-BA with different concentrations of NaOH. Addition of NaOH as a fluxing agent decreased the viscosity values for both ashes at constant temperature. As presented in Equation 1 to Equation 4, slag viscosity is highly dependent on slag composition. Additionally, the fluxing agent influenced the slag viscosity values by (i) promoting formation of higher liquid phase content, and (ii) changing the composition of slag towards compositions with lower viscosity by increasing the $Na^+$ molar fraction.

Figure 17A:
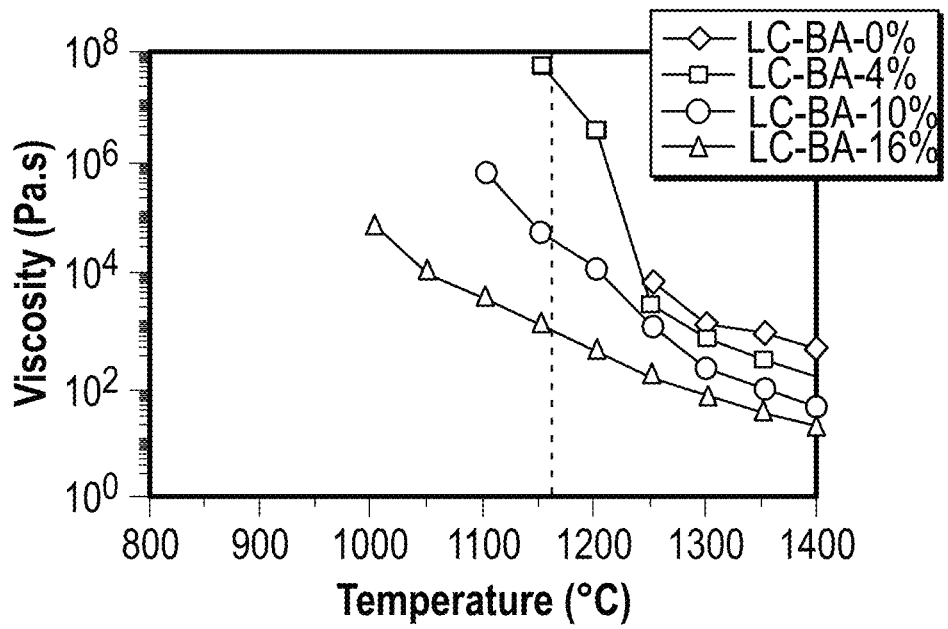
FIG. 17A is a graph of viscosity calculations for a solid-liquid suspension of LWA with various NaOH concentrations for LC-BA.
Figure 17B:
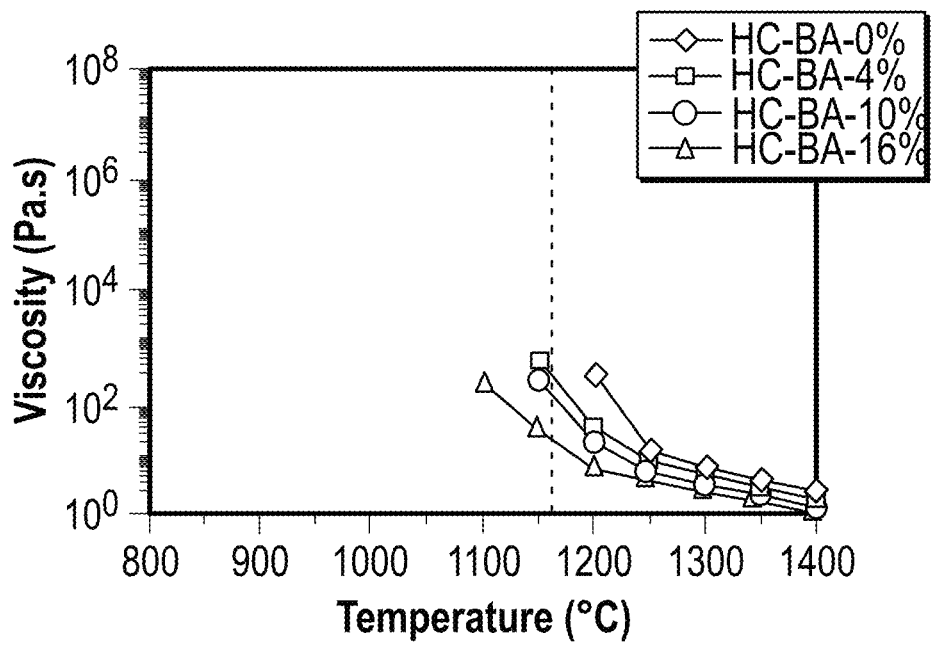
FIG. 17B is a graph of viscosity calculations for a solid-liquid suspension of LWA with various NaOH concentrations for HC-BA.

LC-BA (FIG. 17A) possessed higher viscosity values compared with HC-BA (FIG. 17B). This can be explained using Equation 3 where the slag composition of LC-BA had a higher $Si^{4+}$ molar fraction compared to HC-BA, leading to higher viscosity values. Additionally, the molar fraction of $Ca^{2+}$ was relatively negligible for LC-BA compared with HC-BA so that $Ca^{2+}$, which also has a fluxing role, decreased the HC-BA slag viscosity and consequently the solid-liquid suspension viscosity.

Gas Formation During Sintering

Determination of Free (Unburned) Carbon and Chemical Compounds in Raw Materials

Heating ash in an oxidizing atmosphere (here, air) leads to decomposition reactions overlapping with carbon oxidation, which makes the determination of the unburned carbon content complex. Accordingly, a heating cycle is generally added in an inert atmosphere (nitrogen) before the oxidizing atmosphere to prevent carbon oxidation while promoting decomposition reactions. In this study, a 2A-TGA procedure was followed to measure the unburned carbon content. FIGS. 18A, 18B, 19A, 19B show the 2A-TGA curves for raw LC-BA and HC-BA ashes, respectively. The unburned carbon content mass fractions for LC- and HC-BA were found to be 0.12% and 0.19%, respectively.

Table 4 shows the QXRD results for the raw LC- and HC-BA. A higher content of quartz was observed in the LC-BA compared with the HC-BA, which was consistent with XRF results. A higher calcite content was observed for HC-BA obtained by QXRD (see Table 4), which was reflected in the higher CaO content obtained by XRF. In addition, hematite ($Fe_2O_3$) and anhydrite ($CaSO_4$) as two possible phases that can contribute to gas release at the sintering temperature were found to be higher for HC-BA compared with LC-BA.

TABLE 4

Crystalline phase determination of raw ashes

| Phases name | Phase formula | Raw LC-BA | Raw HC-BA |
|---|---|---|---|
| Quartz | ($SiO_2$) | 18.2 ± *1.7 | 8.1 ± 0.3 |
| Katoit | ($Ca_3Al_2(SiO_4)_{(3-x)}(OH)_{4x}$ (X = 1.5 – 3)) | 0.1 ± 0.1 | 0.3 ± 0.2 |
| Anhydrite | ($CaSO_4$) | 0.4 ± 0.3 | 1.9 ± 0.2 |
| Merwinite | ($Ca_3Mg(SiO_4)_2$) | 0.0 ± 0 | 1.2 ± 1.3 |
| Mullite | ($3Al_2O_3 \cdot 2SiO_2$) | 10.6 ± 2.4 | 0.9 ± 0.2 |
| Hematite | ($Fe_2O_3$) | 0.4 ± 0.3 | 1.0 ± 0.7 |
| Anorthite | ($CaAl2Si2O8$) | 11.2 ± 0.5 | 8.4 ± 0.8 |
| Brucite | ($Mg(OH)2$) | 0.1 ± 0.1 | 0.4 ± 0.2 |
| Portlandite | ($Ca(OH)2$) | 0.0 ± 0.1 | 0.2 ± 0 |
| Augite | ((Ca, Na)(Mg, Fe, Al, Ti)(Si, Al)2O6) | 0.8 ± 0.1 | 9.4 ± 0.2 |
| Calcite | ($CaCO3$) | 0.9 ± 0.2 | 4.6 ± 0.7 |
| Gypsum | ($CaSO4 \cdot 2H2O$) | 0.4 ± 0.3 | 0.5 ± 0.4 |
| Anatase | ($TiO2$) | 1.2 ± 0.1 | — |
| Dolomite | ($CaMg(CO3)2$) | — | 0.6 ± 0.2 |
| Gehlenite | ($Ca2Al[AlSiO7]$) | — | 9.8 ± 0.6 |
| Amorphous phase | — | 55.6 ± 3 | 52.9 ± 1.2 |

Phase Development Through Geopolymerization

Table 5 shows the crystalline phases of geopolymerized LC-BA pellets after 24 h of curing at 40° C. and 30% RH. The quartz content started to decrease considerably in 16% NaOH addition. The anorthite content decreased and amorphous phase increased with increasing NaOH concentration. Considering the low CaO content (3.51%) of LC-BA, a geopolymerization reaction similar to that of class F fly ash can be considered for LC-BA during curing so that the amorphous phase contains N-A-S-H gel. N-A-S-H gel is formed through breaking Si—O—Si and Si—O—Al (i.e., from aluminosilicate sources) bonds into silica and alumina monomers by reacting with $OH^-$; further interaction of monomers leads to the formation of dimers, trimers and/or polymers.

TABLE 5

Crystalline phase of LC geopolymerized pellets

| Crystalline phases | Chemical formula | Raw LC-BA | LC-BA-4% | LC-BA-10% | LC-BA-16% |
|---|---|---|---|---|---|
| Quartz | ($SiO_2$) | 18.2 ± *1.7 | 17.7 | 17.4 | 13.7 |
| Anhydrite | ($CaSO_4$) | 0.4 ± 0.3 | 0.3 | 0.1 | 0 |
| Merwinite | ($Ca_3Mg(SiO4)_2$) | 0.0 ± 0 | 0.4 | 2 | 3.1 |
| Mullite | ($3Al_2O_3 \cdot 2SiO_2$) | 10.6 ± 2.4 | 12.2 | 8.5 | 8.0 |
| Hematite | ($Fe_2O_3$) | 0.4 ± 0.3 | 0.2 | 0.7 | 0.4 |
| Anorthite | ($CaAl_2Si_2O_8$) | 11.2 ± 0.5 | 8.2 | 5 | 6.5 |
| Brucite | ($Mg(OH)_2$) | 0.1 ± 0.1 | 0.5 | 0.5 | 0.6 |
| Portlandite | ($Ca(OH)_2$) | 0.0 ± 0.1 | 0 | 0.1 | 0.0 |
| Augite | ((Ca, Na)(Mg, Fe, Al, Ti)(Si, Al)$_2O_6$) | 0.8 ± 0.1 | 1.2 | 1.2 | 0.7 |
| Calcite | ($CaCO_3$) | 0.9 ± 0.2 | 0.4 | 0 | 0 |
| Gypsum | ($CaSO_4 \cdot 2H_2O$) | 0.4 ± 0.3 | 0.4 | 0 | 0.43 |
| Anatase | ($TiO_2$) | 1.2 ± 0.1 | 1.2 | 2.0 | 1.7 |
| Amorphous | — | 55.6 ± 3 | 57.2 | 62.5 | 64.8 |

Table 6 shows the crystalline phases and their quantities for HC-BA geopolymerized pellets. With increasing NaOH percentage, the content of the Ca bearing phases (such as anorthite, calcite, and gehlenite) decreased while the amorphous phase content increased. HC-BA had a high content of CaO (22.5%) and accordingly, it can be considered as a class C fly ash for its geopolymerization reaction with NaOH. In this regard, the alkali cation (Nat) acts as a catalyzer via ionic exchange with $Ca^{2+}$ ions. The main product of this reaction is calcium alumina silicate hydrate (C-A-S-H) gel. With reaction progress, small amounts of alkalis can be taken up into the gel structure due to any charge imbalance. It should be noted that increasing environmental pH (via higher NaOH concentration) favors the formation of C-A-S-H gel, which is probably reflected in the higher amorphous content.

TABLE 6

Crystalline phase of HC-BA geopolymerized pellets

| Crystalline phases | Chemical formula | Raw HC-BA | HC-BA-4% | HC-BA-10% | HC-BA-16% |
|---|---|---|---|---|---|
| Quartz | ($SiO_2$) | 8.1 ± 0.3 | 8.8 | 6.1 | 5.8 |
| Katoit | ($Ca_3Al_2(SiO_4)_{(3-x)}(OH)_{4x\ (X-1.5-3)}$) | 0.3 ± 0.2 | 0.1 | 0.3 | 0.3 |
| Anhydrite | ($CaSO_4$) | 1.9 ± 0.2 | 1.4 | 1.5 | 1.4 |
| Merwinite | ($Ca_3Mg(SiO_4)_2$) | 1.2 ± 1.3 | 0.8 | 1.3 | 1.9 |
| Mullite | ($3Al_2O_3 \cdot 2SiO_2$) | 0.9 ± 0.2 | 0.9 | 0.9 | 0.4 |
| Hematite | ($Fe_2O_3$) | 1.0 ± 0.7 | 0.5 | 0.4 | 0.2 |
| Anorthite | ($CaAl_2Si_2O_8$) | 8.4 ± 0.8 | 5.5 | 3.2 | 3.4 |
| Brucite | ($Mg(OH)_2$) | 0.4 ± 0.2 | 0.6 | 0.6 | 0.8 |

TABLE 6-continued

Crystalline phase of HC-BA geopolymerized pellets

| Crystalline phases | Chemical formula | Raw HC-BA | HC-BA-4% | HC-BA-10% | HC-BA-16% |
|---|---|---|---|---|---|
| Portlandite | (Ca(OH)$_2$) | 0.2 ± 0 | 0 | 0.1 | 0 |
| Augite | ((Ca, Na)(Mg, Fe, Al, Ti)(Si, Al)$_2$O$_6$) | 9.4 ± 0.2 | 7.6 | 6.6 | 5.9 |
| Calcite | (CaCO$_3$) | 4.6 ± 0.7 | 5.8 | 3.0 | 1.7 |
| Gypsum | (CaSO$_4$•2H$_2$O) | 0.5 ± 0.4 | 0.5 | 0.8 | 0.4 |
| Dolomite | (CaMg(CO$_3$)$_2$) | 0.6 ± 0.2 | 0 | 0 | 0.3 |
| Gehlenite | (Ca$_2$Al[AlSiO$_7$]) | 9.8 ± 0.6 | 8.3 | 7.3 | 5.4 |
| Amorphous | — | 52.9 ± 1.2 | 59.4 | 67.7 | 72.1 |

Evaluation of Sintering Mechanism of Geopolymerized Pellets Using TGA

TGA was performed on the geopolymerized pellets to simulate the sintering process and indirectly identify any possible reactions/decompositions that can lead to the formation of pores in the LWA. FIGS. 20A-20D show the TGA and differential thermogravimetry curves (DTG) for LC-BA prepared with 0%, 4%, 10%, and 16% NaOH concentrations. During the heating ramp, several mass reductions were measured that were associated with DTG peaks. Peak H (40° C. to 100° C.) was attributed to the release of free water. The increasing trend in peak H by increasing NaOH concentration was mainly associated with the deliquescence effect, by which the addition of NaOH salt increased the equilibrium RH in the ash. The second observed peak, i.e., G near 100° C. to 150° C., was mainly attributed to the release of water from the gypsum structure. The decomposition in the range of 400° C. to 550° C. (peak C) could be attributed to the decomposition of the amorphous phase in LC-BA, most likely C—S-H; the intensity of peak C decreased as NaOH concentration increased in the system preferably implying formations of other amorphous phases (i.e., peaks Am$_1$ and Am$_2$) in the system. Peak Am$_1$, which developed in the higher NaOH samples, could be related to the release of water from amorphous N-A-S-H gel developed through geopolymerization, while peak Am$_2$ was most likely related to the release of water from the amorphous structure of C-A-(N)—S-H type gel. The intensity of peak Am$_2$ increased as NaOH increased, which implied that an increasing pH environment favors the formation of C-A-(N)—S-H gel. No significant decomposition (reaction) was observed after 900° C. for the LC-BA samples. The gas release from 1100° C. to 1160° C. could be considered to contribute to pore formation in the LWA. For LC-BA samples, the mass reductions from 1100° C. to 1160° C. for LC-BA-0%, LC-BA-4%, LC-BA-10%, and LC-BA-16% were found to be equal to 0.080%, 0.218%, 0.300%, and 0.115%, respectively.

FIGS. 21A-21D show the TGA curves for HC-BA prepared with 0%, 4%, 10%, and 16% NaOH concentrations. Similar to LC-BA, the peak H in the HC-BA TGA curves is related to the release of free water, where the height of the peak increased as the NaOH concentration increased mainly due to the deliquescence phenomenon. Peak G was attributed to the release of water from the gypsum structure. Peak C (~350° C. to 450° C.) was related to the release of water from amorphous C—S-H gel. The decreasing trend of peak C with increasing NaOH concentration implied the transformation of C—S-H towards formation of C-A-(N)—S-H gel (i.e., peak Am$_2$) for the HC-BA samples. Additional peaks of C', CH, and C⁻ were observed that were most likely related to, respectively: (1) the presence of another form of C—S-H gel with different Si/Ca ratio than that of peak C leading to a different thermal decomposition range; (2) the decomposition of portlandite in geopolymerized pellets at ~450° C.; and (3) calcite (CaCO$_3$) decomposition and emission of CO$_2$ gas at ~620° C. to 750° C. Peak C' disappeared as the NaOH concentration increased to form C-A-(N)—S-H gel (peak Am$_2$). Peak C⁻ also decreased as the NaOH concentration increased (the trend was also consistent with that of measured by QXRD, where calcite as a Ca-bearing phase was consumed to form C-A-(N)—S-H gel (peak Am$_2$). Therefore, the intensity of the Am$_2$ peak increased as the NaOH concentration increased, which was compatible with the QXRD result (see Table 6) that there was an increase in amorphous phase content as the NaOH concentration increased. In contrast with the LC-BA geopolymerized pellets, a decomposition reaction could be observed in the HC-BA pellets near 1160° C. as demonstrated by peak H⁻+A. Peak H⁻+A is most likely associated with the release of gaseous phases from hematite and anhydrite. The mass reductions recorded between 1100° C. and 1160° C. for HC-BA-0%, HC-BA-4%, HC-BA-10%, and HC-BA-16% were equal to 0.55%, 0.48%, 0.45%, and 0.33%, respectively.

Figure 22C:
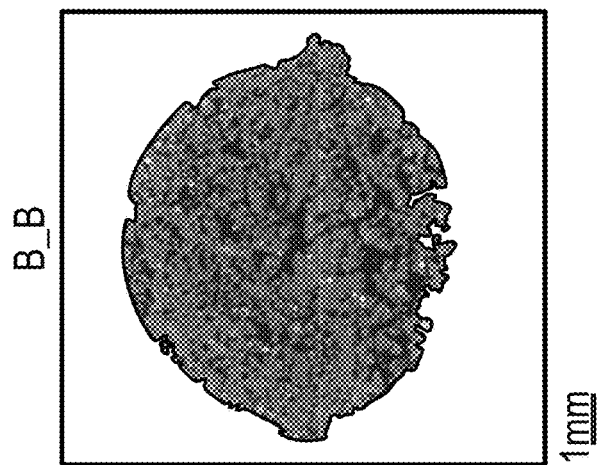
FIG. 22C is a sectional view of the pellet of FIG. 22A taken along plane B_B.
Figure 22B:
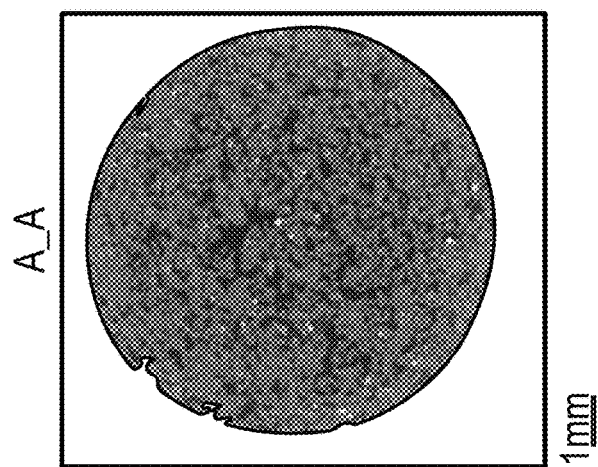
FIG. 22B is a sectional view of the pellet of FIG. 22A taken along plane A_A.
Figure 22A:
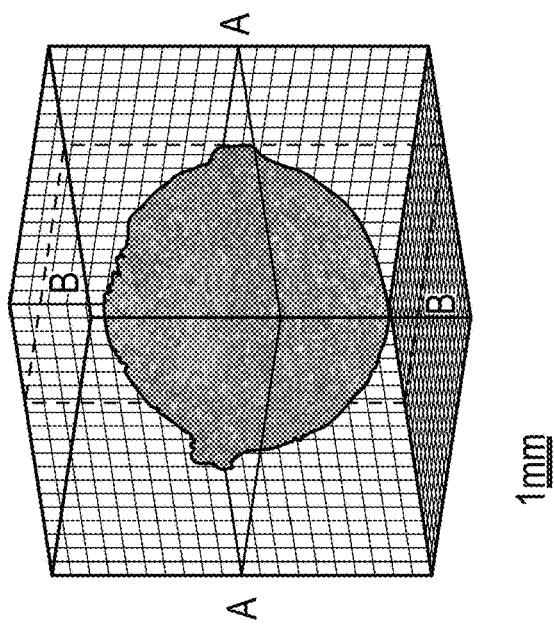
FIG. 22A is a three dimensional reconstruction of a pellet of LC-BA with 10% NaOH after geopolymerization and before sintering.
Figure 23C:
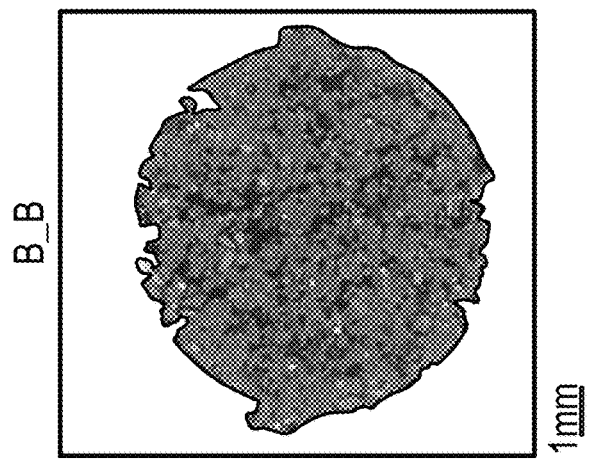
FIG. 23C is a sectional view of the pellet of FIG. 23A taken along plane B_B.
Figure 23B:
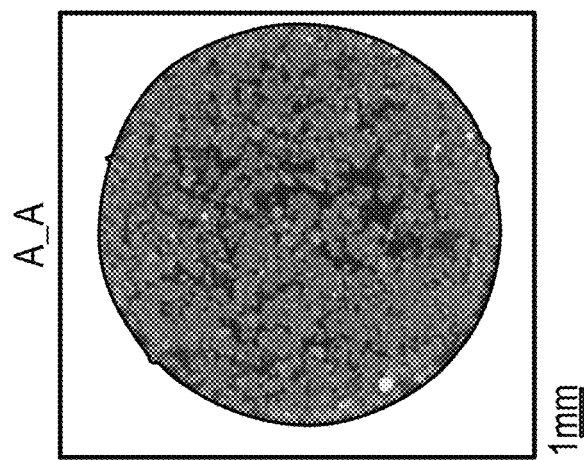
FIG. 23B is a sectional view of the pellet of FIG. 23A taken along plane A_A.
Figure 23A:
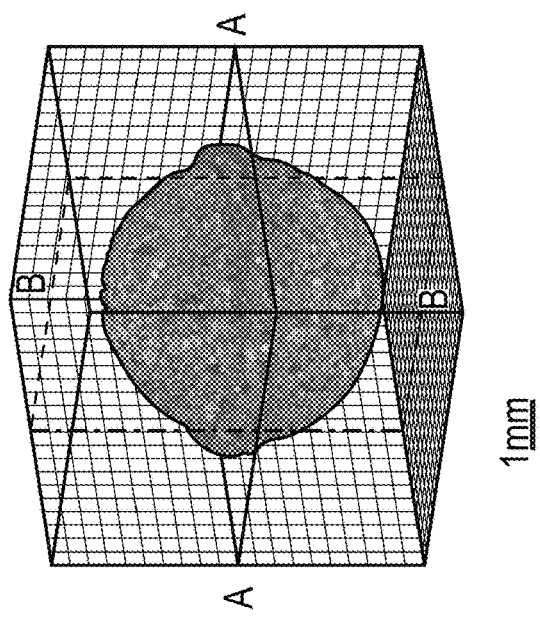
FIG. 23A is a three dimensional reconstruction of a pellet of HC-BA with 10% NaOH after geopolymerization and before sintering.
Figure 24C:
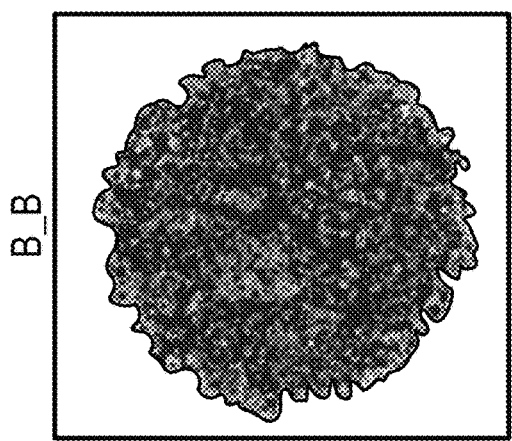
FIG. 24C is a sectional view of the pellet of FIG. 24A taken along plane B_B.
Figure 24F:
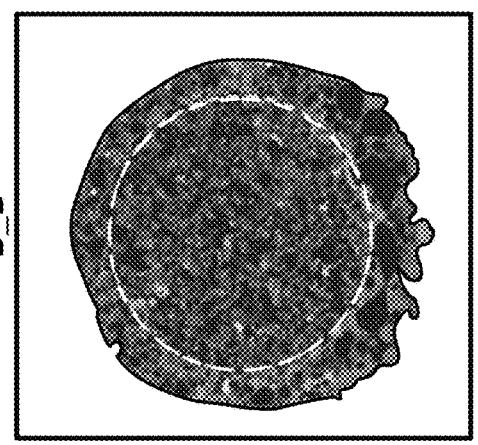
FIG. 24F is a sectional view of the pellet of FIG. 24D taken along plane B_B.
Figure 24B:
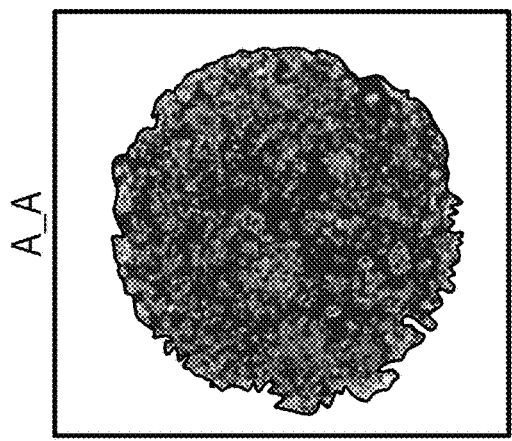
FIG. 24B is a sectional view of the pellet of FIG. 24A taken along plane A_A.
Figure 24E:
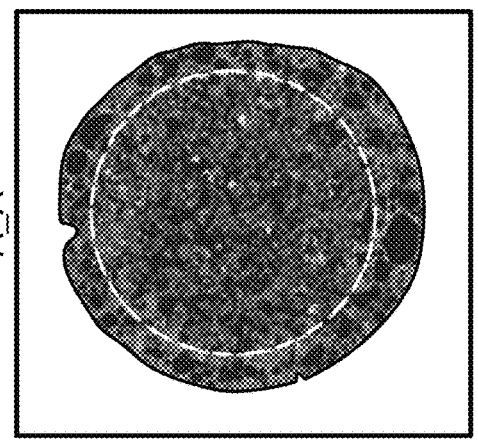
FIG. 24E is a sectional view of the pellet of FIG. 24D taken along plane A_A.
Figure 24A:
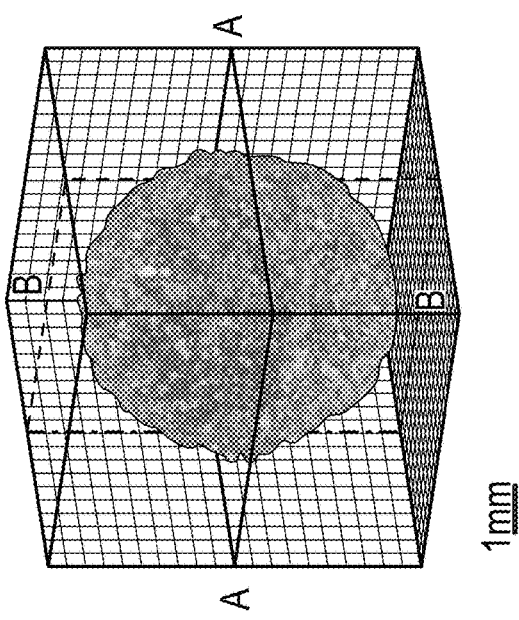
FIG. 24A is a three dimensional reconstruction of a pellet of LC-BA with 4% NaOH after sintering.
Figure 24D:
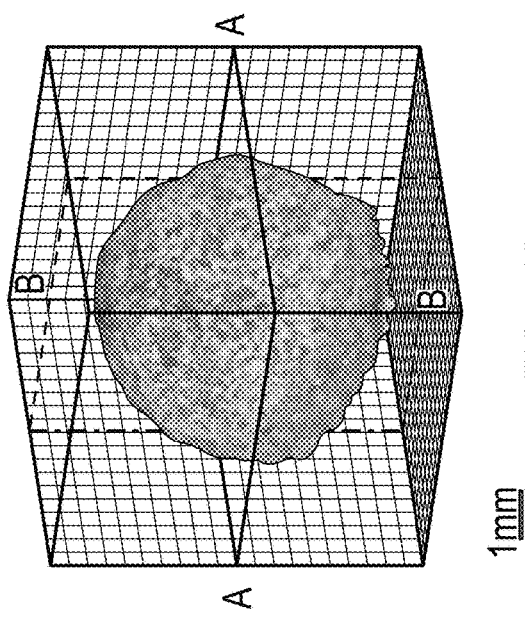
FIG. 24D is a three dimensional reconstruction of a pellet of LC-BA with 10% NaOH after sintering.
Figure 24I:
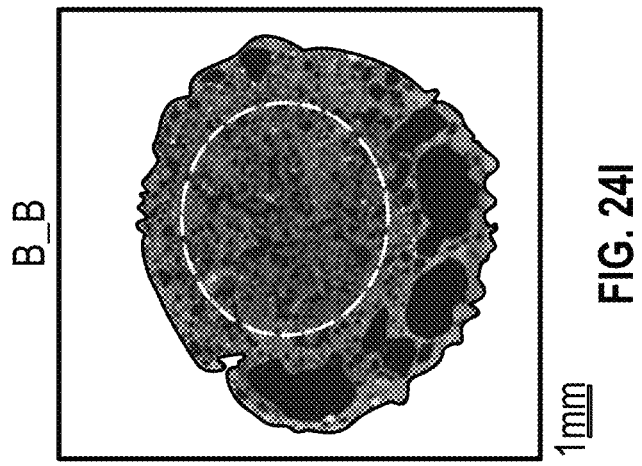
FIG. 24I is a sectional view of the pellet of FIG. 24G taken along plane B_B.
Figure 24H:
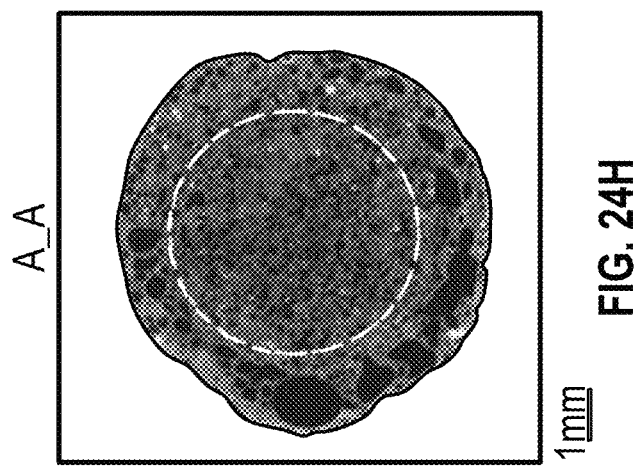
FIG. 24H is a sectional view of the pellet of FIG. 24G taken along plane A_A.
Figure 24G:
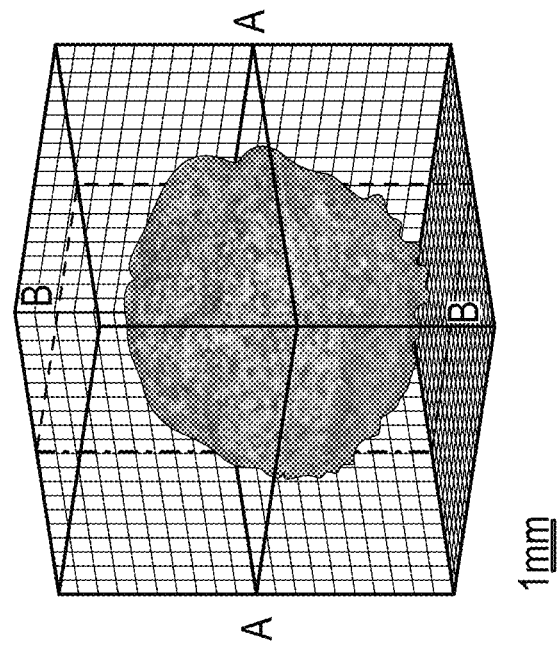
FIG. 24G is a three dimensional reconstruction of a pellet of LC-BA with 16% NaOH after sintering.
Figure 25C:
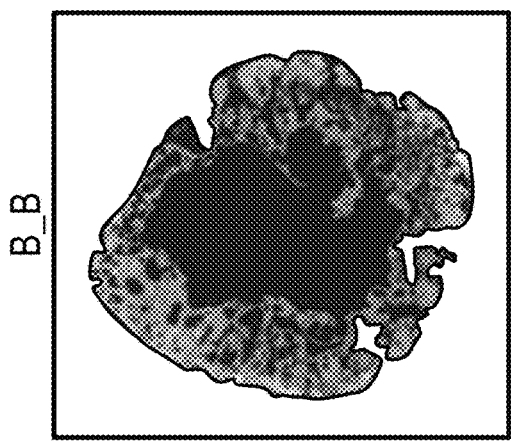
FIG. 25C is a sectional view of the pellet of FIG. 25A taken along plane B_B.
Figure 25F:
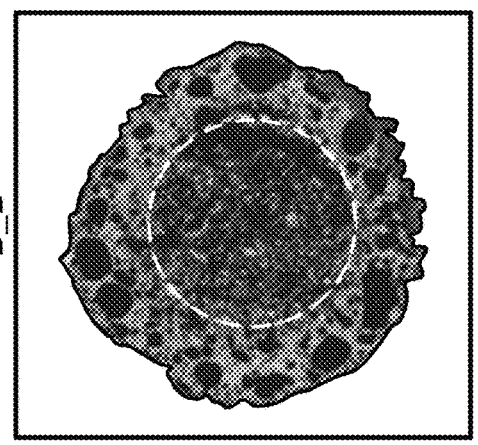
FIG. 25F is a sectional view of the pellet of FIG. 25D taken along plane B_B.
Figure 25B:
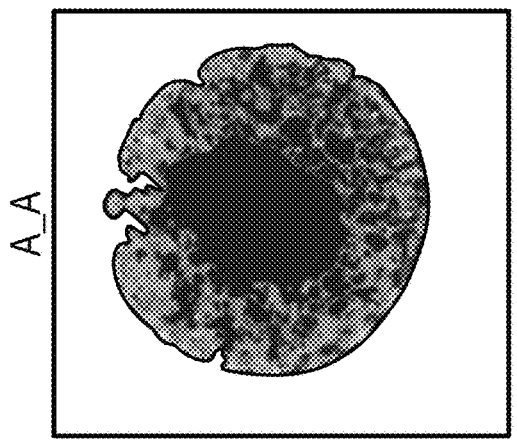
FIG. 25B is a sectional view of the pellet of FIG. 25A taken along plane A_A.
Figure 25E:
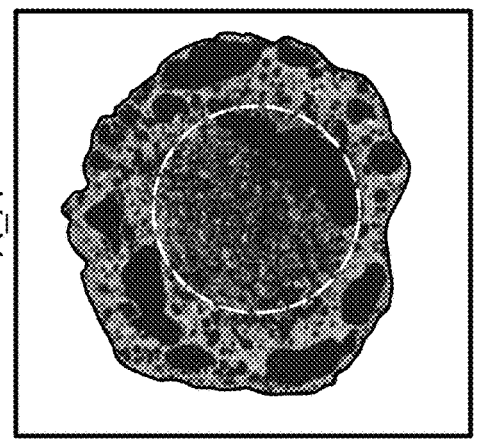
FIG. 25E is a sectional view of the pellet of FIG. 25D taken along plane A_A.
Figure 25A:
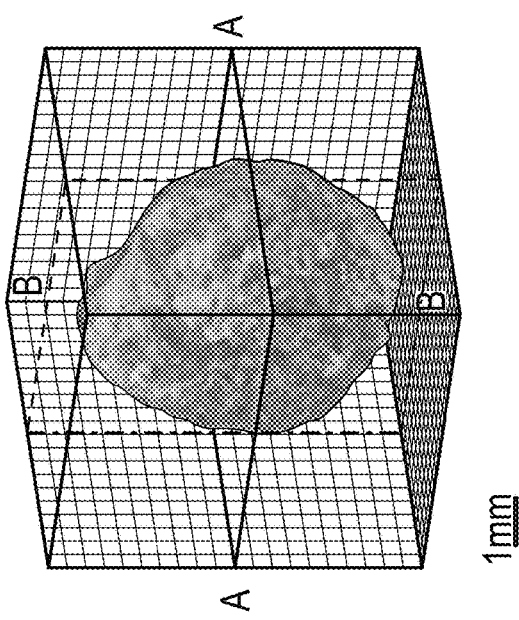
FIG. 25A is a three dimensional reconstruction of a pellet of HC-BA with 4% NaOH after sintering.
Figure 25D:
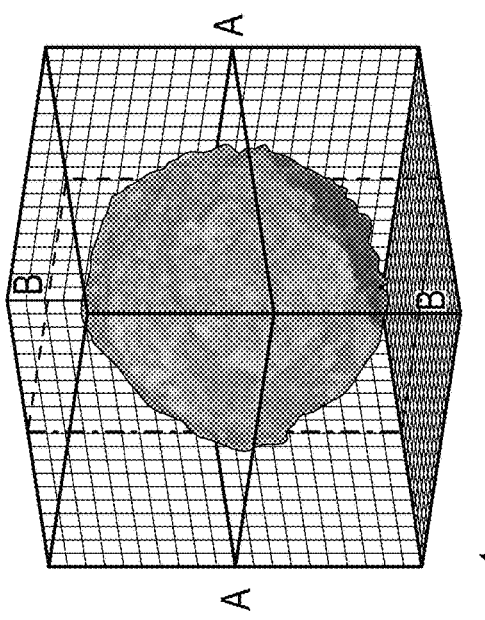
FIG. 25D is a three dimensional reconstruction of a pellet of HC-BA with 10% NaOH after sintering.
Figure 25I:
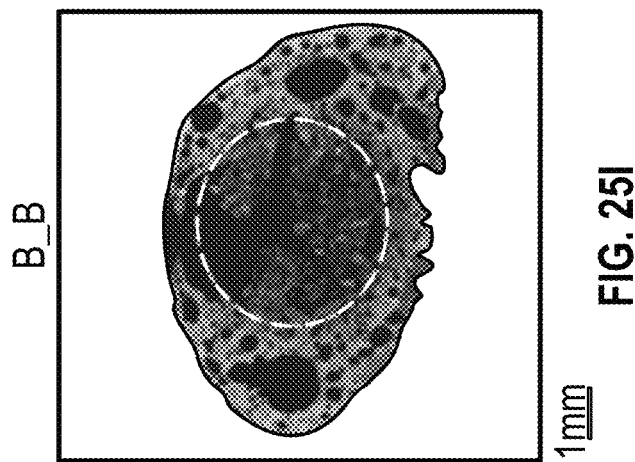
FIG. 25I is a sectional view of the pellet of FIG. 25G taken along plane B_B.
Figure 25H:
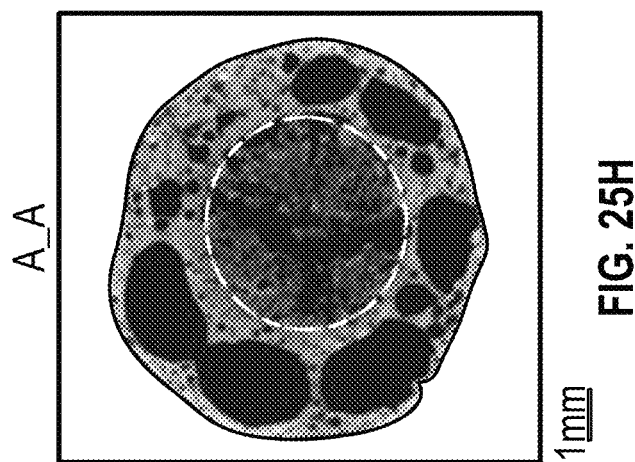
FIG. 25H is a sectional view of the pellet of FIG. 25G taken along plane A_A.
Figure 25G:
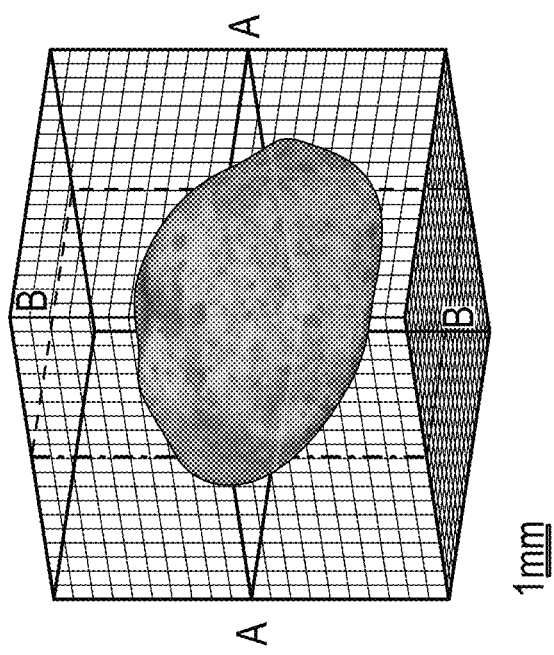
FIG. 25G is a three dimensional reconstruction of a pellet of HC-BA with 16% NaOH after sintering.

It was hypothesized that due to the rapid sintering of LWA for 4 min, dihydroxylation (i.e., the release of water) of amorphous phases available in the geopolymerized LC-BA and HC-BA samples may shift towards higher temperatures and accordingly can contribute to the formation of pores near sintering temperature (~1160° C.). To test this hypothesis, a heating ramp of 100° C./min (equal to the safe maximum capacity of the TGA device) was used to mimic the rapid sintering of LWA in TGA for LC-BA-10% and LC-BA-10%. The results are plotted in FIGS. 21C and 22C with solid and dashed lines for TGA and DTG curves, respectively. A slight temperature shift of peaks could be observed by ~+30° C.; however, no contribution from dehydroxylation (gaseous H$_2$O release) of amorphous phases could be observed near 1160° C. to contribute to pore formation during sintering.

Evaluation of Pore Structure Using X-CT

To observe the effect of sintering on LWA pore formation, X-CT was carried out, before and after sintering, for the LC-BA-10% and HC-BA-10% samples. The X-CT results for the geopolymerized LC-BA-10% and HC-BA-10% samples (i.e., before sintering) are shown in FIGS. 22A-22C and 23A-23C, respectively. Plane A_A and B_B were selected to represent the middle cross-section of LWA in two perpendicular directions. Light color defines regions with denser structure (i.e., solid phase) while darker color demonstrates regions with lesser density (i.e., pores). 2D slices of samples in both geopolymerized samples (FIGS. 22A-22C and 23A-23C) only contained coarse (i.e., random shape) pores, resulting from the coarse granular structure of bottom ash during the sample preparation. FIGS. 24A-I and 25A-I show the X-CT results of sintered samples for LC-BA and HC-BA LWA, respectively, made with 4%, 10%, and 16% NaOH concentration. Comparing 2D slices before and after sintering for a sample made using 10% NaOH, the porosity of LWA had increased by the end of the sintering process. The porosities of non-sintered LC-BA-10% and HC-BA-10%, which was measured using image analysis of XCT slices as the total volume of pores divided by the total volume of LWA and reported as percentage, were 36.4% and 36.3%, respectively. After sintering, LC-BA-10% and HC-BA-10% had porosities equal to 44% and 41.6%, respectively, as the formation of large pores could increase the porosity of LWA.

Generally, two zones can be identified on the 2D slices (except for LC-BA-4% and HC-BA-4%, most probably due to the lack of a liquid phase) of LWA, separated by white dashed lines (shown in FIGS. 24A-I and 25A-I). The inner part is referred to as "core", while the outer part is referred to as "shell". For both LWA types shown in FIGS. 24A-I and 25A-I, the rounded large pores were mainly formed in the shell region of the LWA. In contrast, the core appears to possess interconnected smaller pores that were not specifically created by gas release but rather by the sintering and grain growth mechanism. A possible explanation for the different morphologies of LWA core and shell could be that the shell acted as an insulating layer, delaying heat transfer to the LWA core and also limiting the diffusion of oxygen to the core. This phenomenon can lead to occurrence of a reducing atmosphere in the core of LWA while having a highly oxidizing atmosphere for the shell. In addition, coalescence of the pores (i.e., pores jointing together) in the shell led to the formation of stable pores with a larger volume.

Figure 26A:
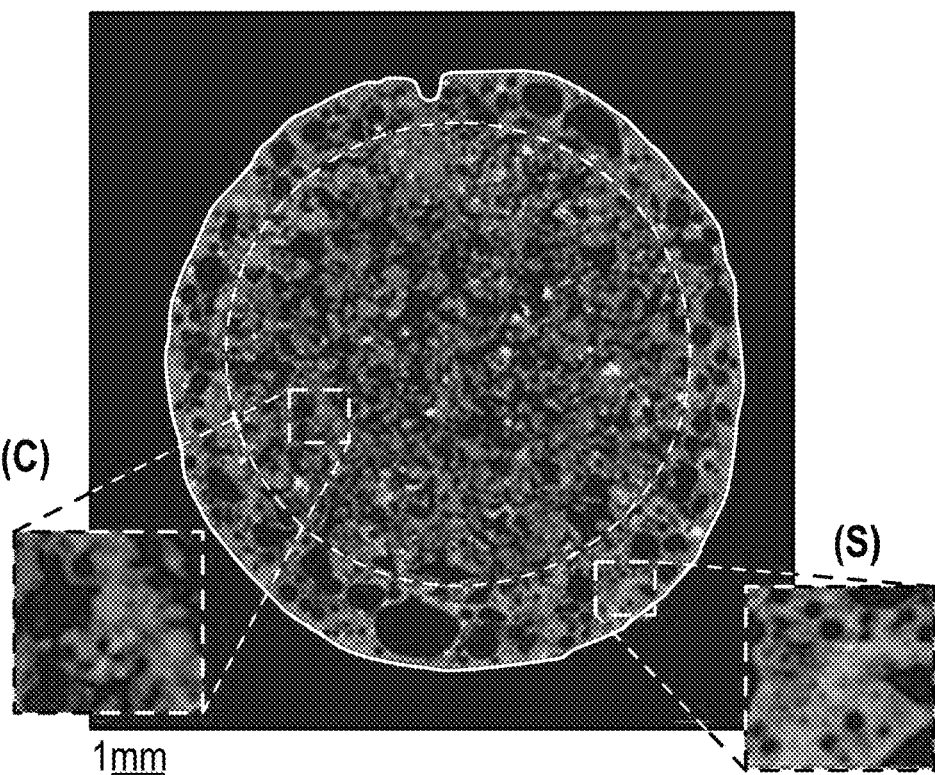
FIG. 26A is an enlarged view of FIG. 24E, showing the core and shell.
Figure 26B:
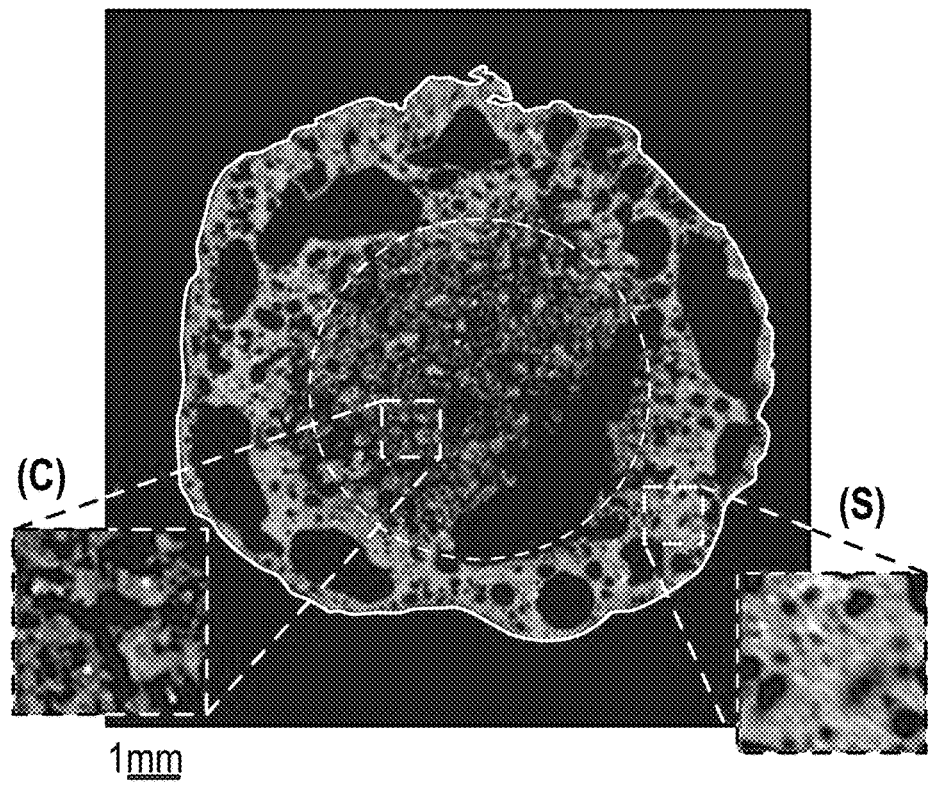
FIG. 26B is an enlarged view of FIG. 25E, showing the core and shell.

A closer images of the A_A 2D slices of LC-BA-10% and NC-BA-10% on the core and shell of LWA are provided in FIGS. 26A and 26B, respectively. The shell material is denser than the core material in both LWA. It is speculated that the shell material not only provides the structural integrity for the LWA, but it may also help to strengthen the LWA.

Formation of a sufficient amount of liquid phase on the LWA surface to entrap the emitted gaseous phases is a critical condition that needs to be achieved during sintering for successful LWA pore formation.

Figure 27:
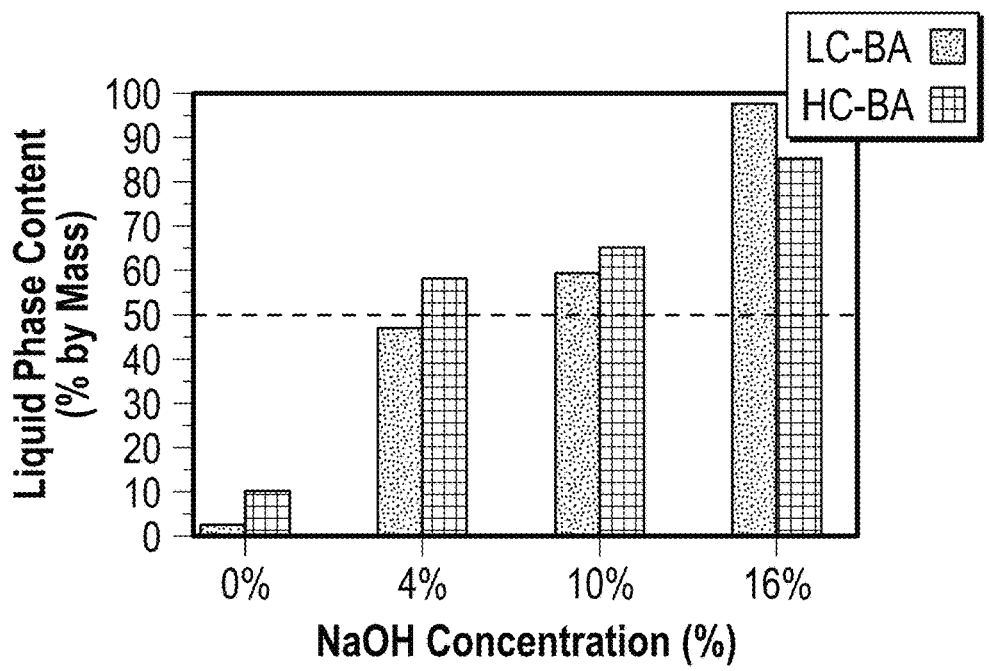
FIG. 27 is a graph showing liquid phase content of LC-BA and HC-BA at 1160° C. as a function of NaOH concentrations.

FIG. 27 shows the amount of the liquid phase at 1160° C. for the LWA. An increase in the NaOH concentration resulted in a higher liquid phase content for both LWA made using LC-BA and HC-BA ashes. NaOH has a lower melting temperature compared with the multi-component ash system; therefore, it provides a medium for easier ion diffusion and grain growth resulting in a lower melting temperature of the ash and NaOH blend.

For LC-BA-0%, as shown in FIG. 27, the liquid phase content was less than 3% while addition of 4% NaOH increased the liquid phase content for LC-BA-4% to 47.2%. Correlating this observation with 3D X-CT reconstruction and A_A and B_B 2D slices of LC-BA-4% provided in FIGS. 24A-I, no large rounded pore was observed for LC-BA-4% LWA. This finding implies that although some gas release has occurred during sintering, the low liquid phase content could not entrap the emitted gaseous phases. On the other hand, when liquid phase raised to 50% in LC-BA-10% and more prominently in LC-BA-16%, even a small amount of gas release can be entrapped by the liquid phase and larger pores can be formed (FIGS. 24 E, 24F, 24H, 24I).

Similar to the case of the LC-BA, the addition of 4% NaOH increased the liquid phase content for HC-BA-4% LWA to 58.3% while for HC-BA-O % this value was 10.3%. As observed in the 2D slices of the HC-BA-4% LWA in FIGS. 25B and 25C, the amount of liquid phase was sufficient to successfully entrap the released gas during sintering near 1160° C. Also similar to the LC-BA LWA, an increase in NaOH concentration increased the quantity of the liquid phase at 1160° C. Correlating the visualized 2D slices of HC-BA LWA in FIGS. 25A-25I with the liquid phase content, it can be inferred that higher content of liquid phase triggered the higher amount of gaseous phase entrapment, and consequently larger pores were formed. However, it should be noted that an excess amount of liquid phase may create deformation in the sintered LWA due to unnecessary reduction in the liquid-solid viscosity (as will be discussed later below) and the desired sphericity may not be achieved during the sintering process as observed in sample HC-BA-16% in FIGS. 25G-25I. It appears that a minimum amount of 50% liquid content (shown by dashed line in FIG. 27) is necessary during sintering bottom ashes to provide sufficient particles binding along with bloating (look at 2D slices in FIGS. 25A-25I and 26A-26I, in which the LWA with more that 50% liquid phase demonstrated formation of round large pores in the shell).

Viscosity of Liquid-Solid Phase During Sintering:

Viscosity plays two simultaneous roles in successful LWA production. First, it prevents excessive deformation of the LWA pellet during sintering so that the final product retains a round shape. Second, the viscosity of the liquid phase affects the LWA pore size distribution. Correlating the 3D reconstructions (FIGS. 24A-I) and viscosity values for LC-BA LWA (FIG. 4 (a)), it can be inferred that the viscosity of the LC-BA LWA was high enough to limit the deformation of LWA so as to preserve a spherical shape. Although the HC-BA LWA had lower viscosity values (FIG. 17A) compared with the LC-BA LWA, the same observation was made for HC-BA-4% and HC-BA-10%. The only HC-BA LWA that had excessive deformation under gravitational force was HC-BA-16%, which had a viscosity of 25·7 Pa·s at 1160° C. and a final elliptical shape. It appears a lower limit for liquid-solid viscosity is near that of HC-BA-10%, which was 85 Pa·s, in order to retain the LWA spherical shape during sintering.

The second role of the viscosity in controlling the pore size distribution can be observed in the A_A and B_B 2D projections of the LC-BA and HC-BA LWA in FIGS. 4A-I and 25A-I, respectively, where larger pores were formed in the HC-BA LWA compared to the LC-BA LWA. Since LC-BA LWA had higher viscosity compared with HC-BA LWA, lower viscosity seemingly led to easier expansion of gas inside liquid phase, resulting in the formation of larger pores. This observation can also be related to amount of gaseous release close to the sintering temperature, which will be discussed in the following section.

Formation of Gaseous Phase During Sintering:

As was observed in FIGS. 20A-D and 21A-D, the TGA/DTG results showed a more pronounced peak at 1160° C. for the HC-BA LWA compared with the LC-BA LWA. The mass reduction from 1100° C. to 1160° C. is believed to be associated with hematite and anhydrite compounds, the presence of which was confirmed by QXRD, to release $O_2$ and $SO_2$ gases, respectively. Both anhydrite and hematite were detected in raw ashes as well as in geopolymerized pellets. Moreover, the anhydrite content for the LC-BA geopolymerized pellets was found to be smaller than in the HC-BA pellets. This observation supports the fact that HC-BA LWA have higher potential for gas liberation at 1160° C., which can be another possible explanation for the formation of bigger pores in HC-BA LWA compared with LC-BA LWA. The reactions that can lead to gas liberation from the transition of hematite from $Fe^{3+}$ to $Fe^{2+}$ can happen through Equation 3 and Equation 4, while the reaction for anhydrite decomposition can be expressed as follows:

$$CaSO_4(s) \rightarrow CaO(s) + SO_2(g) + \frac{1}{2}O_2(g) \quad \text{Equation 8}$$

As was observed in the DTG curves for HC-BA geopolymerized pellets (FIGS. 20A-D), the peak at 1160° C. seems incomplete, i.e., the temperature was no high enough in order to let the complete decomposition occur. This may be attributed to the fact that a complete decomposition of $CaSO_4$ occurs at temperatures above 1200° C. A possible explanation for the reduction of hematite into wuestite (FeO) that could occur at temperature range of 1100° C. and 1160° C. is the formation of liquid phase on the LWA surface that could hinder oxygen diffusion and create a reducing atmosphere in the LWA core, thus leading to hematite reduction.

In this experiment, the unburned carbon content for LC-BA and HC-BA ashes was small (0.12% and 0.19%, respectively), and complete oxidation of carbon in the form of $CO_2$ and CO release would happen at temperatures below 1000° C. (see FIGS. 18A-B and 19A-B), which had some overlapping with the temperature at which the liquid phase started to form (see FIGS. 15A-D and 16A-D). This indicates that there could have been some contribution form the unburnt carbon to reduce the hematite and result in the release of $O_2$.

Figure 28:
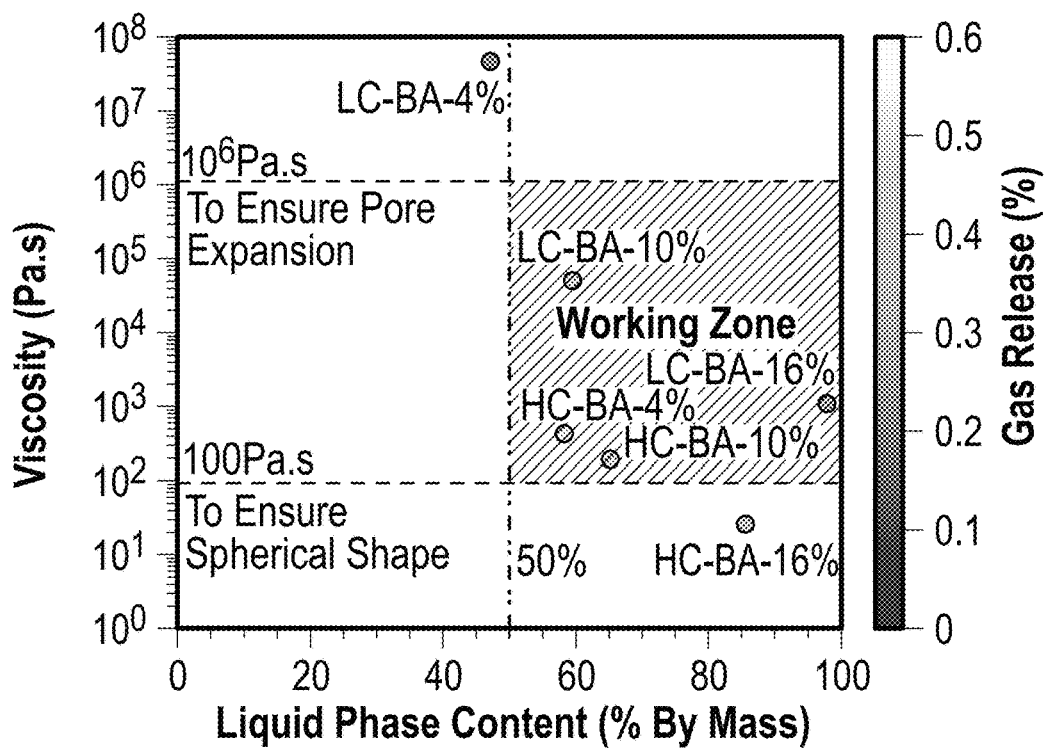
FIG. 28 is a plot showing a working zone satisfying the three necessary conditions for LWA production using bottom ash.

Required Sintering Conditions for Successful Production of Spherical LWA:

FIG. 28 proposes a holistic view of each LWA to provide the required conditions (liquid phase quantity, viscosity value, and emitted gas amount) during sintering for successful production of spherical LWA. It should be noted that LC-BA-0% and HC-BA-0% are shown on the Figure, since due to the lack of liquid phase their viscosity calculable. A minimum value of 50% liquid content (shown by vertical dashed line in FIG. 28) and a minimum viscosity value of 191 Pa·s (shown by bottom horizontal dashed line in FIG. 28) are required for successful LWA production. For LC-BA LWA, LC-BA-0% and LC-BA-4%, which had an inadequate amount of liquid phase (i.e., less than 50%), formation of rounded large pores was not observed in the X-CT images. The same observation was made for HC-BA-0%, which also had an insufficient amount of liquid phase. On the other hand, for LC-BA-10%, LC-BA-16%, HC-BA-4%, and HC-BA-10%, a sufficient amount of liquid phase (50% or more) accompanied with proper viscosity values (more than 191 Pa·s), led to producing LWA with the desired pore structure and sphericity. However, for HC-BA-16%, the viscosity value was about 26 Pa·s, which led to the deformation of the LWA under gravitational force and an undesired elliptical shape (see FIGS. 25G-I). An upper limit value of $10^6$ Pa·s was proposed (shown by top horizontal dashed line in FIG. 28) to ensure a viscosity for the liquid phase to be able to entrap the gaseous phase and let the pellets expand during sintering. $10^6$ Pa·s appeared to be placed between the viscosity values of LC-BA-4% and LC-BA-10%, and implied that a NaOH concentration between 4% and 10%, probably will result in the entrapment of pores in the LWA. FIG. 28 can be used to design a successful LWA with respect to the three required conditions including, sufficient amount of liquid phase, appropriate viscosity for solid-liquid suspension, and sufficient amount of gas release. If a LWA with the three associated characteristics places in the working zone shown in FIG. 28, it can be expected to achieve a desirable LWA.

The three required conditions that need to be achieved during sintering for successful LWA production from waste coal bottom ash are: (i) formation of a sufficient amount of the liquid phase; (ii) achievement of an appropriate viscosity for the combined liquid-solid phase; and (iii) emission of a sufficient amount of gaseous phase. Two types of coal bottom ash (BA), low-calcium (LC) and high-calcium (HC), were used to evaluate these three sintering conditions. The following main conclusions can be drawn from this example regarding the three necessary conditions for successful sintering/LWA production:

The presence of at least 50% (by mass) liquid phase enables successful gas entrapment and LWA pore formation. It was observed that for LC-4%, in which the liquid phase content was less than 50%, no gas-filled rounded pores could be seen achieved in the LWA pore structure. However, all LWA with more than 50% liquid phase during sintering possessed round gas filled pores in their structure (mainly in the outer shell part of the LWA structure).

The viscosity of the liquid-solid suspension was found to influence LWA pore formation and control LWA deformation during sintering. A minimum viscosity of 191 Pa·s was found to be necessary to retain the spherical shape of the LWA pellets during sintering. Above this minimum value, the HC-BA LWA, which had smaller viscosity values compared with the LC-BA LWA, possessed larger gas-filled pores. Lower viscosity values not only allowed easier movement of pores to coalesce, but also easier expansion of entrapped gases in the liquid phase medium. An upper limit of $10^6$ Pa·s was proposed for the liquid-solid phase in order to still be able to entrap emitted gases.

It was found that the emission of gaseous phases near the sintering temperature is necessary to create the desired LWA pore structure, given that the desired liquid phase content and viscosity values listed in (i) and (ii) are also achieved during sintering. All LWA demonstrated gas liberation near the sintering temperature where HC-BA LWA showed a slightly higher amount of gaseous phase formation compared with LC-BA LWA. The emitted gaseous phase was found to be most probably due to the reduction of hematite and the decomposition of anhydrite. Gas emission from other sources was at temperatures not near enough to the sintering temperature to be helpful in forming pores.

A diagram with respect to the three required conditions for successful production of LWA i.e., formation of enough liquid phase, appropriate solid-liquid viscosity, and enough gas emission was developed, and a working zone was defined on that. The working zone was constrained by a liquid phase of more than 50%, and a viscosity upper and lower limits of 191 Pa·s and $10^6$ Pa·s, respectively. The diagram can be used to predict whether the production of a LWA will be successful or not.

From a practical point of view and environmental perspective, a smaller NaOH concentration not only reduces the cost associated with LWA production, but also decreases the greenhouse gas emissions accrued during NaOH production. For successful LWA production from LC- and HC-BA, a NaOH concentration by mass between 4% and 10% was found to be an appropriate concentration range of this fluxing agent to achieve the desired three sintering conditions for LWA production at 1160° C.

The present invention determines the engineering properties of lightweight aggregate (LWA) manufactured from low calcium (F-FA) and high calcium (C-FA) waste fly ash that were designed using a previously-developed thermodynamics-guided process. LWA properties that were characterized include specific gravity, vacuum water absorption, water absorption over time, water desorption, porosity, pore size distribution, and permeability. The LWA studied had a low oven dry specific gravity ranging from 1.22 to 1.45. The vacuum absorption and total open porosity of F-FA LWA decreased as the fluxing agent (NaOH) concentration increased while the values for C-FA LWA varied with increasing amounts of fluxing agent.

All LWA passed the ASTM C 1761 water absorption/desorption requirements for application to the internal curing of concrete. X-ray computed tomography (XCT) and dynamic vapor sorption analyzer (DVSA) techniques were used to characterize the LWA pore structure. It was found that for F-FA LWA the normalized porosity, counting only pores smaller than 50 nm (gelpores+mesopores), ranged from 4% to 11.5%, while for C-FA LWA, this same pore size range had porosity ranging from 1.7% to 2.8%. Pore size distribution measurements of F-FA LWA using XCT showed that the pores became larger and the predicted permeability coefficient increased as the fluxing agent concentration increased. For C-FA LWA, the predicted permeability increased with increasing NaOH concentration. Since the pore size distribution had greater variability and did not follow a specific increasing trend, the increase in C-FA permeability could only be due to an increase in pore connectivity.

Fly ash constitutes approximately 35% of the annual production of W-CCA, of which only 55% to 60% is recycled. The main application of recycled fly ash is in concrete as a pozzolanic material. Unrecycled fly ash (so called "off-spec" fly ash) cannot be directly used in concrete because it does not meet the ASTM C618 or AASHTO M 295 requirements: (i) Loss on Ignition (LOI) of less than 5% (by mass), (ii) providing a strength index of greater than 75% through pozzolanic reaction with cement, and (iii) sulfur trioxide (SO)) content of less than 3% (by mass). However, unrecycled fly ash can be used as a raw material for the production of construction lightweight aggregate (LWA). Natural resources such as clay, shale, and slate are the raw materials commonly used for the production of traditional construction LWA. The use of waste fly ash for LWA production can reduce the use of these natural resources.

Accessibility of construction LWA for applications such as lightweight concrete, internal curing of concrete, and lightweight concrete masonry blocks is challenging within some states of the United States due to the absence of local construction LWA manufacturers (e.g., PA, NJ, and DE). For this reason, concrete manufacturers are forced to import construction LWA from far distances, which results in a high final cost due to the added transportation cost. Using waste fly ash, which is an abundant raw material in many states, can increase the local accessibility of construction LWA for concrete producers.

Many available studies in the literature focus on the production of LWA from in-spec fly ash (i.e., the fly ash that can be directly used in concrete) and use a trial-and-error method for their development. In a thermodynamics-based approach to convert W-CCA, including bottom ash and fly ash, into LWA, the three required conditions for the high temperature production of LWA are: (i) partial formation of a liquid phase, (ii) appropriate viscosity for solid-liquid phase, and (iii) formation of gaseous products that are entrapped by the liquid phase to create a porous LWA structure. Based on these conditions, the appropriate ranges of temperature and viscosity to successfully produce porous LWA were identified. The inventors evaluated the engineering properties of W-CCA LWA that were systematically produced based on the thermodynamics-based methodology developed previously.

LWA engineering properties relevant to applications such as structural lightweight concrete and concrete internal curing were characterized. Specific gravity and open porosity were measured to ensure the successful formation of LWA after the sintering process. Vacuum water absorption was performed to quantify the maximum absorption capacity of LWA. Time-dependent water absorption was assessed to obtain the practical absorption capacity of the LWA and determine whether the LWA is an appropriate candidate for concrete applications. Water desorption behavior of the LWA was evaluated using a dynamic vapor sorption analyzer (DVSA) to determine the capability of LWA in releasing absorbed water to the cement paste matrix during hydration and to characterize the pore size distribution of the LWA in the range of pores smaller than 50 nm, according to the Kelvin-Young-Laplace equation. X-ray computed tomography was used to characterize porosity, pore size distribution, and predicted permeability of the LWA for pores larger than 19 11 m. Table 7 summarizes the experimental program for this study.

TABLE 7

Experimental program

| Experiment | Purpose |
| --- | --- |
| Buoyancy | To assess the oven dry, saturated surface dry, and apparent specific gravity of the LWA |
| Vacuum absorption | To evaluate the maximum water absorption capacity and total open porosity of the LWA |
| Time dependent absorption | To assess the water absorption of LWA over time |
| DVSA | To evaluate the water desorption behavior of LWA and characterize its pore structure at pore range smaller than 50 nm |
| XCT | To characterize porosity, pore size distribution, and permeability of LWA at pore sizes greater than 19 μm |

Materials and Sample Preparation

Two types of off-spec fly ash were used in this study, which based on their chemical composition according to ASTM C618 can be categorized as: (i) low calcium class F fly ash (F-FA) and high calcium class C fly ash (C-FA). Table 8 shows the chemical oxide composition of the off-spec fly ashes as obtained through X-ray fluorescence (XRF). One of the most important requirements of ASTM C618 for fly ash is a LOI of less than 6% (by mass). In addition, based on AASHTO M 295, the LOI limit for fly ash in more than thirty-nine states must be less than 5%. Accordingly, fly ashes used in this study can be classified as off-spec fly ash owing to a high LOI content (see Table 8).

TABLE 8

Chemical oxides of off-spec fly ash based upon a single measurement

| Chemical Composition | Sample Name | |
| --- | --- | --- |
| (% by mass) | F-FA | C-FA |
| $SiO_2$ | 49.5 | 38.2 |
| $Al_2O_3$ | 23.8 | 18.8 |

TABLE 8-continued

Chemical oxides of off-spec fly ash based upon a single measurement

| Chemical Composition | Sample Name | |
|---|---|---|
| (% by mass) | F-FA | C-FA |
| $Fe_2O_3$ | 15.4 | 10.9 |
| $SO_3$ | 0.7 | 3.6 |
| CaO | 3.2 | 18.8 |
| $Na_2O$ | 0.4 | 1.1 |
| MgO | 1.6 | 3.6 |
| $K_2O$ | 2.3 | 1.0 |
| $P_2O_5$ | — | 0.7 |
| $TiO_2$ | — | 1.3 |
| Total | 97.0 | 97.9 |
| LOI | 5.3 | 8.5 |
| Unburnt Carbon | 2.3 | 7.0 |
| Initial moisture content | 0.4 | 1.2 |

Quantitative X-ray diffraction CQXRD) analysis was performed across the range of 50° to 80° 2θ with a 0.02° step size on both fly ashes to quantify their amorphous content and crystalline phases. 20% rutile ($TiO_2$) was used as an internal standard for the purpose of quantification. It is important to note that the use of rutile might result in underestimation of amorphous phase content. Table 9 shows the crystalline phases and amorphous content of the ashes, which indicates that a significant portion of the ashes is composed of an amorphous phase.

TABLE 9

The crystalline phases content of raw fly ashes (% by mass) based upon a single measurement

| Phase name | Sample Name | |
|---|---|---|
| | F-FA | C-FA |
| Quartz | 7.0 | 5.9 |
| Mullite | 10.7 | 3.5 |
| Hamatite | 4.5 | 1.0 |
| Anhydrite | 1.9 | 3.0 |
| Calcium aliminoferrite | 0 | 1.6 |
| Amorphous | 75.9 | 84.9 |

The manufacturing of FA-LWA includes four main steps: drying, pelletization, curing, and sintering. In the first step, the ashes were dried in an oven at 110° C.+5° C. for 24 hours to remove their moisture. In the second step, pelletization, the dried ash was mixed with NaOH aqueous solution with molarities of 0 mol/L (i.e., deionized (DI) water), 2.5 M, 5 M, 7.5 M, 10 M, or 12.5 M with a liquid to solid (L/S) mass ratio of 0.2. These concentrations led to mass concentrations (i.e., mass of solid NaOH per mass of solid fly ash) of 0%, 2%, 4%, 6%, 8%, and 10%. 'The ash and aqueous NaOH (or deionized water) were mixed thoroughly to achieve a homogenous mixture. Afterwards, a plastic mold of 16 mm diameter was used to pelletize each mixture into a spherical shape. An L/S ratio of 0.2 was found to be the minimum ratio needed for the successful formation of spherical fresh pellets. In step three, the pellets were cured in an environmental chamber at 40° C. and 30% relative humidity (RH) for 24 hours. In the final step, the fresh aggregates (i.e., the cured pellets) were sintered at 1160° C. for 4 min to produce FA-LWA. Samples are designated as XX-YY %, where XX shows the type of materials (i.e., either F-FA or C-FA), while YY represents the NaOH concentration.

Testing Methods
Specific Gravity Measurement

For each type of LWA with different NaOH concentrations, three replicates were randomly selected to perform the specific gravity test. The specific gravity of the aggregates was obtained by measuring their oven dry (OD), saturated surface dry (SSD), and apparent specific gravity in accordance with the ASTM C127 buoyancy method. The vacuum absorption capacity was measured to investigate the maximum possible absorption capacity of the aggregates. The LWA was dried in an oven at 100° C.±5° C. for a minimum of 24 hours to measure OD mass. About 1000 mL of deionized water was de-aerated in the vacuum pump for 1 hour to remove the gas inside the water. The pump was then turned off and the deionized water container was removed from the chamber of the vacuum pump and covered with a lid for later procedures.

The oven-dried LWA were de-aerated in a vacuum pump at a pressure of 1.33 kPa±0.33 kPa for 3 hours to remove gas in the pores. After 3 hours under vacuum conditions, the previously de-aerated deionized water was introduced to the LWA. The process lasted for an additional 1 hour until the LWA were fully submerged in the water. The vacuum pump was then turned off, and the beaker was taken out of the chamber and kept in atmospheric conditions for 24 hours. After vacuum saturation, the surface water of the aggregates was removed using an absorbent cloth and the SSD mass was recorded. After determining the SSD mass, the LWA was immediately placed into the buoyancy container filled with deionized water, and the apparent mass in the water was recorded at room temperature.

Absorption Over Time

For each type of LWA with different NaOH concentrations, three replicates were randomly selected to perform the water absorption test and measure the OD LWA water absorption property as a function of time. The LWA were dried in an oven at 110° C.±5° C. for 24 hours to remove the moisture inside the samples and the OD mass was measured. Next, the samples were placed in a container filled with tap water to fully cover the LWA samples. Then, at specific intervals, the samples were taken out of the container and their surface water was dried using an absorbent cloth to measure the SSD weight. Before each measurement, the container was carefully shaken to remove any potential entrapped air bubbles. The measurements were done at 30 min, 1 hour, 2 hours, 3 hours, 4 hours, 5 hours, 6 hours, 24 hours, 36 hours, 48 hours, and 72 hours after the first contact of LWA with water Dynamic Vapor Sorption Analyzer (DVSA)

The desorption/absorption behavior and nano/micropores of the LWA were characterized using a DVSA. A disk of 1 mm thickness was cut from the middle section of the lightweight aggregate using a diamond saw. The disk was broken into small pieces and soaked in water for 24 hours. A piece with a mass of about 60 mg was used for testing in the DVSA instrument. The SSD sample was placed in a quartz pan at a constant temperature of 23° C. for both the desorption and absorption cycle. The RH was initially set to 97.5% and decreased in increments of 1.5% down to 96%, then down to 90% in increments of 2%, then down to 80% in increments of 5%, and finally decreased all the way to 0% in increments of 10%. After each increment, the RH was kept constant for either 96 hours or, if the mass change was less than 0.001 mg over 15 min, then the instrument proceeded to the next RH value. This procedure was applied in reverse to increase the RH to 97.5% for the absorption cycle.

Due to the long duration of DVSA testing, only three NaOH concentrations (2%, 6%, and 10%) for both F-FA and C-FA were selected for testing.

X-Ray Computed Tomography (XCT)

A Zeiss Versa XRM 5001 was used to perform XCT and evaluate the LWA pore structure. The X-ray tube was set for a voltage of 120 kV and a current of 83 µA. The tube, specimen, and detector were arranged to give a reconstructed voxel size of about 19 µm. The exposure time per step for a rotation of 3600 was approximately 0.45 seconds. 2D projections of the LWA were collected and using the software supplied with the Zeiss Versa XRM 500, tomographic reconstruction was performed to reconstruct a 3D image, which was subsequently saved a stack of approximately 1000 2D cross-sectional slices each having thickness equal to the voxel size. The visualization and calculations presented in this paper were performed using Dragonfly Software.

Figure 29B:
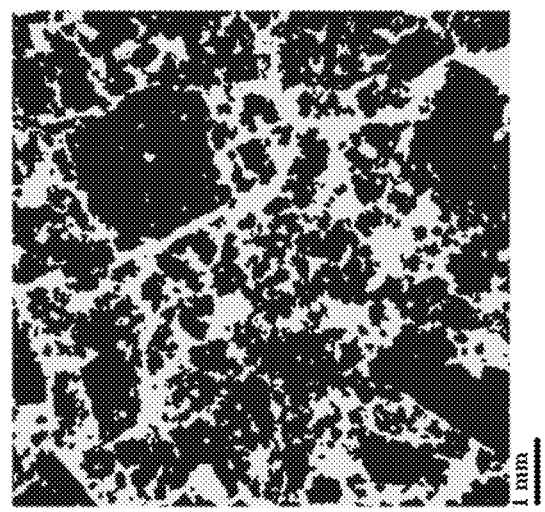
FIG. 29B is a micrograph showing the C-FA 6% LWA of FIG. 29A with the image segmented into pore (light area) and solid (dark area) phases through k-means ++ method.
Figure 29A:
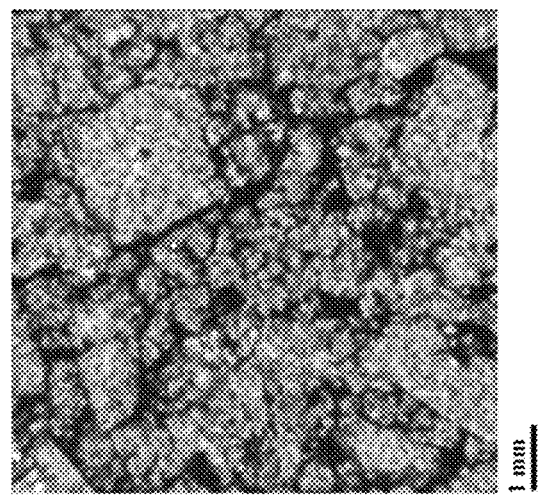
FIG. 29A is a micrograph showing C-FA 6% LWA in a aw image prior to segmentation.

In order to calculate the porosity of the LWA for each dataset, a cubic volume of interest (VOI) with a size of 7.5 mm×7.5 mm×7.5 mm was extracted from the center of each 3D XCT image. Different segmentation methods were tested (including Otsu, maximum entropy, and Bernsen) and it was found that K-means ++ clustering could yield the best performance in capturing the pore space in the images based upon visual comparison. K-means clustering segments all the pixels of an image into k clusters. In this method, first (i) the centroids of the clusters are initialized, next (ii) for each pixel of the image the Euclidean distance to the center is calculated, then (iii) based on the obtained distance, the nearest pixels are assigned to a cluster, after that (iv) based on the assigned pixels new centers will be calculated, and finally (v) the process is repeated until it satisfies a tolerance value. K-means clustering is generally affected by the selection of K centroids at the first step. K-means ++ is an improved form of the basic K-means algorithm, where the only difference is in the selection of initial centroids. In this method, (i) the first centroid is selected randomly, next (ii) the distance of each data point is calculated from the previously chosen centroid, then (iii) the next centroid is selected from the data points such that the probability of choosing that point as centroid is directly proportional to its distance from the nearest, previously chosen centroid, and finally (iv) steps (ii) and (iii) are repeated until K centroids are selected. It was found that using six clusters with eight iterations could most reasonably identify the pore space in the LWA. The high number of clusters was due to the close intensity of some portions of the solid and pore phases. The two first clusters were combined to form the pore space and the rest of the clusters were the solid phase. Due to resolution limitation many of the micropores (specifically those smaller than 3 to 5 times the voxel size) could not be captured by the XCT, which could possibly result in errors in the calculated final porosity and predicted permeability. FIGS. 29A and 29B show examples of raw and segmented images of C-FA 6% LWA, respectively.

Figure 30B:
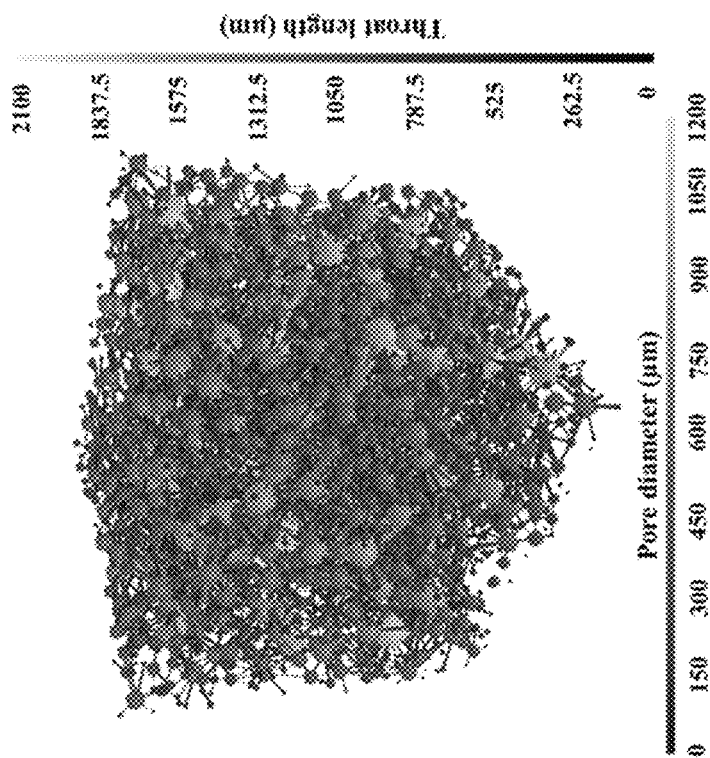
FIG. 30B is a pore network model of the C-FA 6% LWA of FIG. 30A representing pores and throats.
Figure 30A:
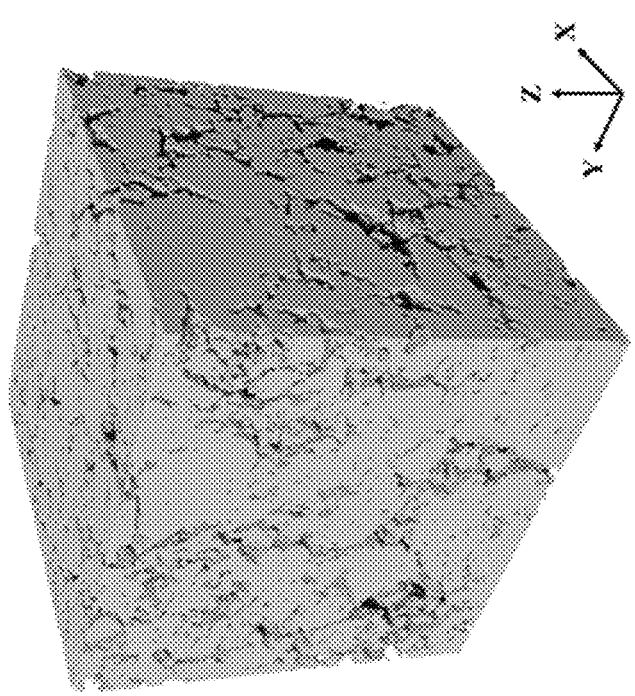
FIG. 30A is a VOI 3D reconstruction of C-FA 6% LWA in a segmented solid phase.
Figure 31A:
FIG. 31A is a front view of F-FA LWA sintered at 1160° C. for four minutes with 0% NaOH.
Figure 31B:
FIG. 31B is a front view of F-FA LWA sintered at 1160° C. for four minutes with 2% NaOH.
Figure 31C:
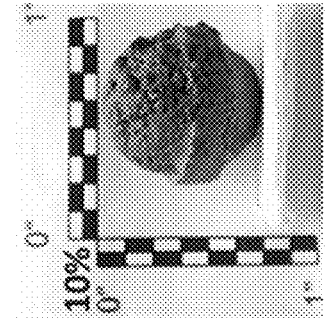
FIG. 31C is a front view of F-FA LWA sintered at 1160° C. for four minutes with 4% NaOH.
Figure 31D:
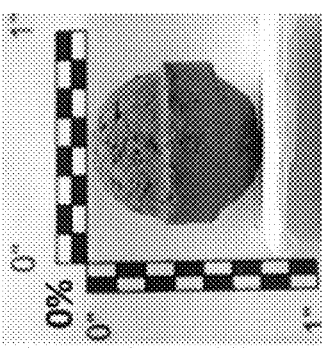
FIG. 31D is a front view of F-FA LWA sintered at 1160° C. for four minutes with 6% NaOH.
Figure 31E:
FIG. 31E is a front view of F-FA LWA sintered at 1160° C. for four minutes with 8% NaOH.
Figure 31F:
FIG. 31F is a front view of F-FA LWA sintered at 1160° C. for four minutes with 10% NaOH.
Figure 32C:
FIG. 32C is a front view of C-FA LWA sintered at 1160° C. for four minutes with 4% NaOH.
Figure 32F:
FIG. 32F is a front view of C-FA LWA sintered at 1160° C. for four minutes with 10% NaOH.
Figure 32B:
FIG. 32B is a front view of C-FA LWA sintered at 1160° C. for four minutes with 2% NaOH.
Figure 32E:
FIG. 32E is a front view of C-FA LWA sintered at 1160° C. for four minutes with 8% NaOH.
Figure 32A:
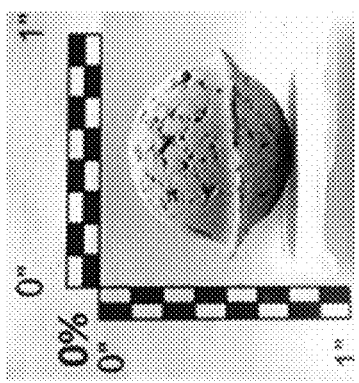
FIG. 32A is a front view of C-FA LWA sintered at 1160° C. for four minutes with 0% NaOH.
Figure 32D:
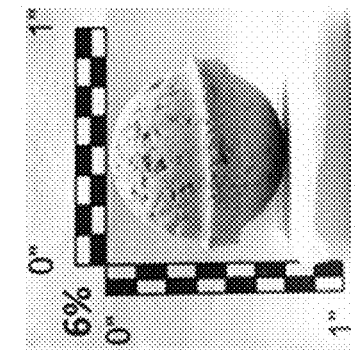

A plugin of Dragonfly software called OpenPNM1 was used for the extraction of pore network of the LWA from the segmented pore-solid phase. The plugin uses an algorithm referred to as SNOW (subnetwork of the over-segmented watershed), which is based on marker-based segmentation for the extraction of pores. This method consists of five steps. In the first step, the distance map of pore space in the binary image is obtained and smoothened using a Gaussian blur filter. In the second step, the peaks are identified in the distance map using a maximum filter with a spherical structuring element of radius R. A spherical structuring element with radius of 4 was used in this study. In the third step, any extraneous peaks in the previous step is trimmed, which is the key to avoiding over-segmentation. In step four, the image is segmented into pore regions using a marker-based watershed segmentation method, where the corrected maxima identified in the previous step are used as the markers. Finally, the segmented image is used to obtain information about the pore and throat (channel) size in the network. In this study, for pore size distribution analysis pores were characterized by their equivalent diameter, which is the diameter of a sphere with equivalent volume to that of the identified pore. FIG. 30A shows the 3D reconstruction of the segmented solid phase in C-FA 6% LWA, and FIG. 30B shows the extracted pore network model of the LWA in the VOI. Once the pore-throat network was extracted, the closed pores were excluded to generate a continuous medium of pore and throat to enable the calculation of the intrinsic permeability (or simply referred to as "permeability" herein) of the LWA.

At the pore-scale for incompressible fluid and a constant volume of a pore i, the sum of inflows and outflows must be equal, which can be written as the following equation:

$$\sum_{j=1}^{n} Q_{ij} = 0 \qquad \text{Equation 9}$$

where n is the number of connections to and from pore i, and $Q_{ij}$ is the volumetric flow from pore i to pore j, which is directly proportional to the pressure difference between the pores according to Equation 10:

$$Q_{ij} = g_{ij}(P_i - P_j) \qquad \text{Equation 10}$$

The parameter $g_{ij}$ is the conductance between pores i and j, and $P_i$ and $P_j$ are the fluid pressures in pores i and j. The conductance between pores is related to the throat diameter and length and fluid viscosity using Poiseuille's law according to Equation 11:

$$G_{ij} = \frac{\pi d_{ij}^4}{128 v L} \qquad \text{Equation 11}$$

where $d_{ij}$ is the throat diameter between pores i and j, L is the throat length between pores i and j, and v is the fluid viscosity.

Equations 9-11 can be combined to result in linear algebraic system for the unknown pore pressure at each pore. Considering the boundary conditions (pressure difference of 1 atm across the entire sample in each direction for calculating permeability at that direction), the equations can be solved to obtain the pore pressure at each pore. Knowing the pressure at each pore, the volumetric flow can be calculated. Finally, the permeability of the system is determined based on Darcy's law according to Equation 12:

$$K = \frac{Q v L}{A \Delta P} \qquad \text{Equation 12}$$

where Q is the total volume flow through the network, L is the length of the network, A is the cross-sectional area of the pore network perpendicular to the direction of flow, and $\Delta P$ is the boundary pressure difference (1 atm) in the x, y, and z directions. Therefore, the associated permeability coefficient i.e., $K_{xx}$, $K_{yy}$, and $K_{zz}$ (double subscript indicates flow in the same direction as the applied pressure gradient) can be obtained.

Results and Discussion

LWA Physical Appearance

For each FA type, multiple replicates were produced to evaluate their physical appearance. The selected LW were chosen to investigate how LWA physical appearance might change with respect to the FA type and NaOH concentration. High-quality digital camera images were taken from the front view of the LWA, where the distance between the LWA and camera was kept constant to achieve the same magnification for all images. FIGS. 4A-4F show the front view physical appearance of the F-FA LWA samples at various NaOH percentages. F-FA 0% showed a red-brown color, while adding NaOH to the samples shifted the color toward dark brown. The addition of NaOH for F-FA 2%, F-FA 4%, and F-FA 6% caused the occurrence of a subtle shiny surface, suggesting the formation of a liquid phase in the LWA during the sintering process. A local melting could be observed on the surface of F-FA 10%, which probably suggests the presence of excessive NaOH concentration in the 14 LWA.

FIGS. 32A-F show the front view physical appearance of the C-FA LWA samples at various NaOH percentages. The addition of NaOH changed the color of C-FA LWA from yellow for C-FA 0% to light brown for C-FA 10%, except C-FA 8%, which showed a dark brown color. As can be seen, C-FA 0%, which was prepared with DI water without NaOH addition, had a smaller size compared to other C-FA LWA, which suggests shrinkage occurred after sintering. In addition, severe cracking could be observed on the surface of C-FA 0%, probably caused by a combination of lack of liquid phase formation and thermal shrinkage during cooling after sintering. The cracking was less observable on the surface for the C-FA LWA prepared with NaOH (i.e., C-FA 2% to C-FA 10%), which could be related to the formation of a liquid phase in the LWA by addition of NaOH.

Some local melting appeared on the surface of C-FA 80/0 suggesting an NaOH concentration in excess of what was needed for sample preparation. It should be noted that all LWA had enough integrity and strength after sintering to be handled for further testing.

Specific Gravity

Figure 33B:
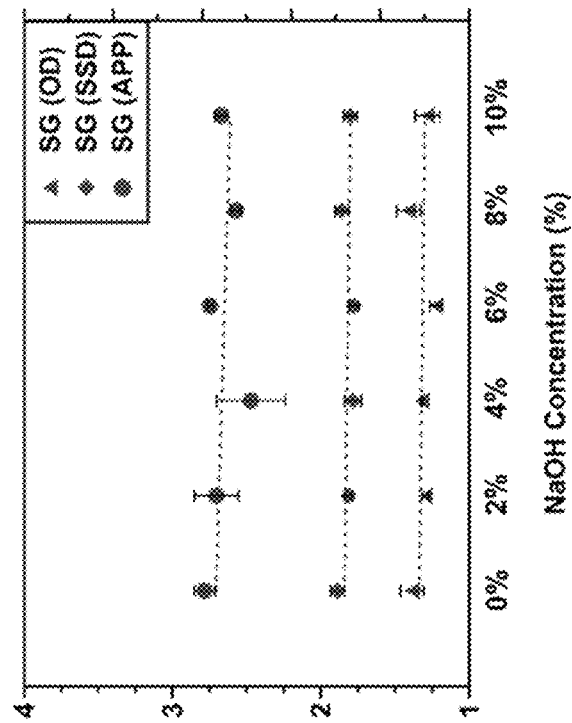
FIG. 33B is a graph showing apparent (APP), oven dry (OD), and saturated surface dry (SSD) specific gravity of C-FA LWA.
Figure 33A:
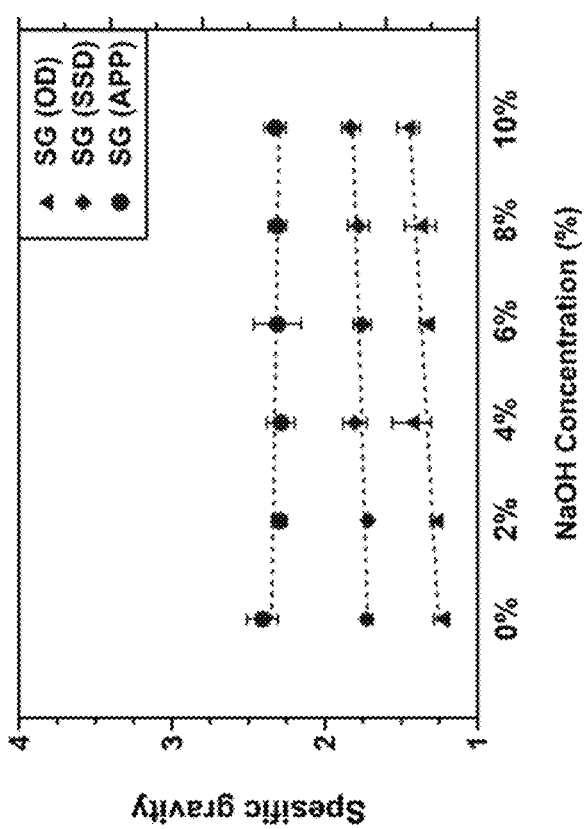
FIG. 33A is a graph showing apparent (APP), oven dry (OD), and saturated surface dry (SSD) specific gravity of F-FA LWA.

FIGS. 33A and 33B show the oven dry (OD), saturated surface dry (SSD), and apparent (APP) specific gravity of F-FA LWA and C-FA LWA, respectively. Since the measured specific gravity for all the aggregates manufactured in this study is less than 2, they can all be classified as LWA according to EN 13055. FIG. 33A shows that for F-FA LWA, increasing the NaOH concentration from 0% to 10% slightly increased the OD and SSD specific gravity while the OD specific gravity changed from 1.24 to 1.45. This could be related to the increase in the solid weight of LWA due to the addition of higher solid NaOH concentration to the LWA. On the other hand, FIG. 33B shows that for C-FA LWA, the OD specific gravity had some variations at each NaOH concentration, and a clear trend could not be observed. The lowest specific gravity for C-FA LWA was that of C-FA 6%, which was equal to 1.22. The APP specific gravity pertains to the solid portion of the LWA and the pore space among particles accessible to water is not considered. Comparing the apparent specific gravity of F-FA and C-FA LWA implies a higher net volume of solid particles for F-FA LWA, which has led to lower apparent specific gravity values for F-FA LWA.

Vacuum and Time-Dependent Water Absorption

Figure 34B:
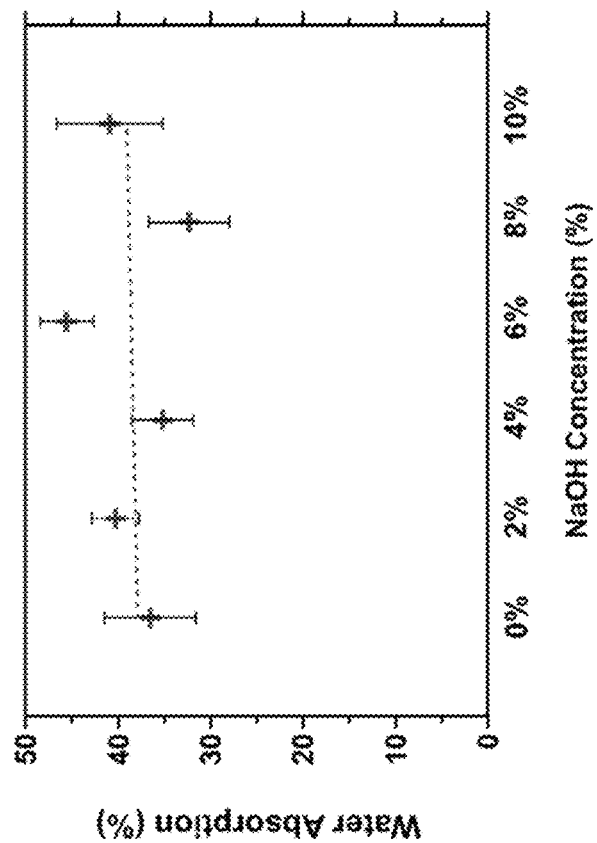
FIG. 34B is a graph showing vacuum water absorption of C-FA LWA (the error bars indicate ±one standard deviation computed from three replicates.
Figure 34A:
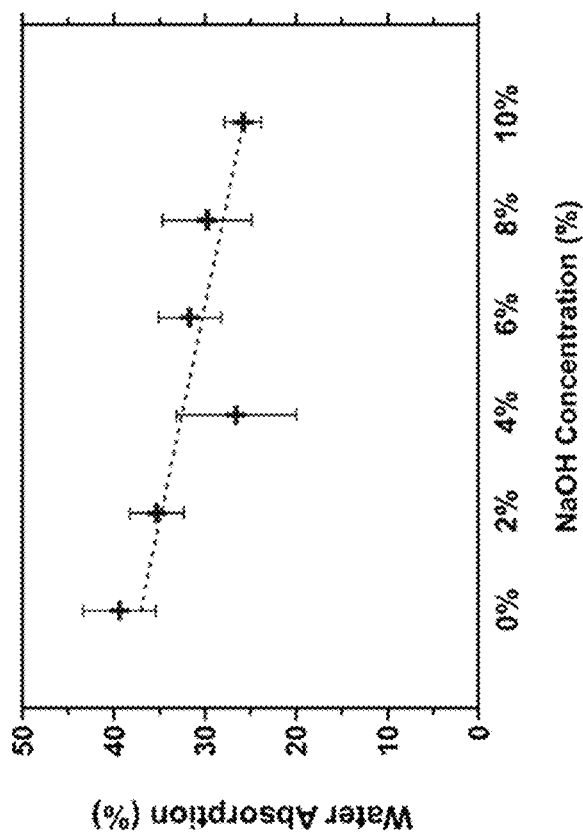
FIG. 34A is a graph showing vacuum water absorption of F-FA LWA (the error bars indicate ±one standard deviation computed from three replicates.

FIGS. 34A and 34B show the vacuum water absorption for F-FA and C-FA LWA. Vacuum water absorption demonstrates the maximum possible absorption capacity for an LWA. As can be seen from FIG. 34A, the vacuum absorption capacity of F-FA LWA decreased as the NaOH concentration increased. This could be related to the fact that higher NaOH concentration led to the development of closed porosity in F-FA LWA, which decreased vacuum absorption capacity. The vacuum absorption capacity for C-FA LWA, shown in FIG. 34B, displays a seemingly variable behavior, where the highest average vacuum absorption capacity was 45.6% for C-FA 6%. This variable behavior was previously observed for LWA made from high calcium bottom ash. This observation implies the highly random nature of pore structure development in LWA made from high calcium coal ash, both fly ash and bottom ash.

Figure 35B:
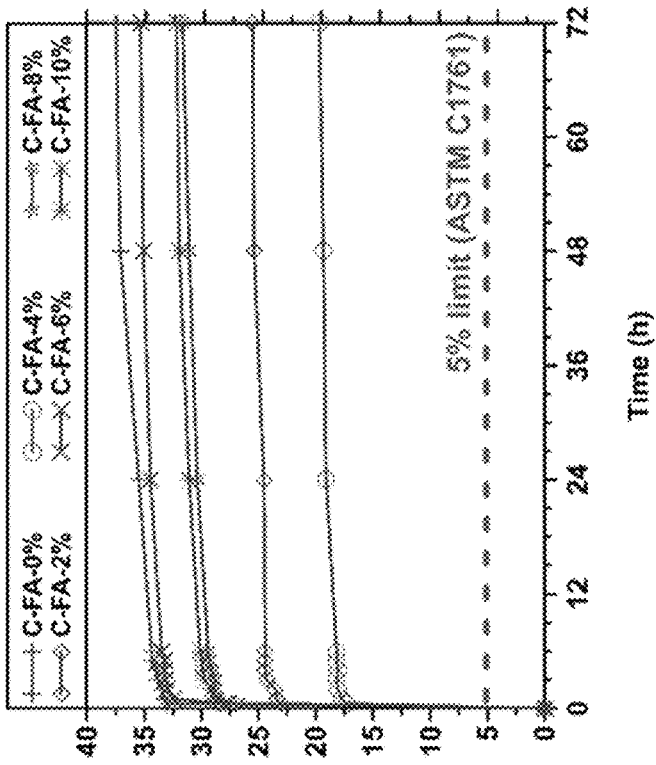
FIG. 35A is a graph showing measured water absorption of F-FA as a function of time up to 72 hours for three replicates at various concentrations of NaOH.
Figure 35A:
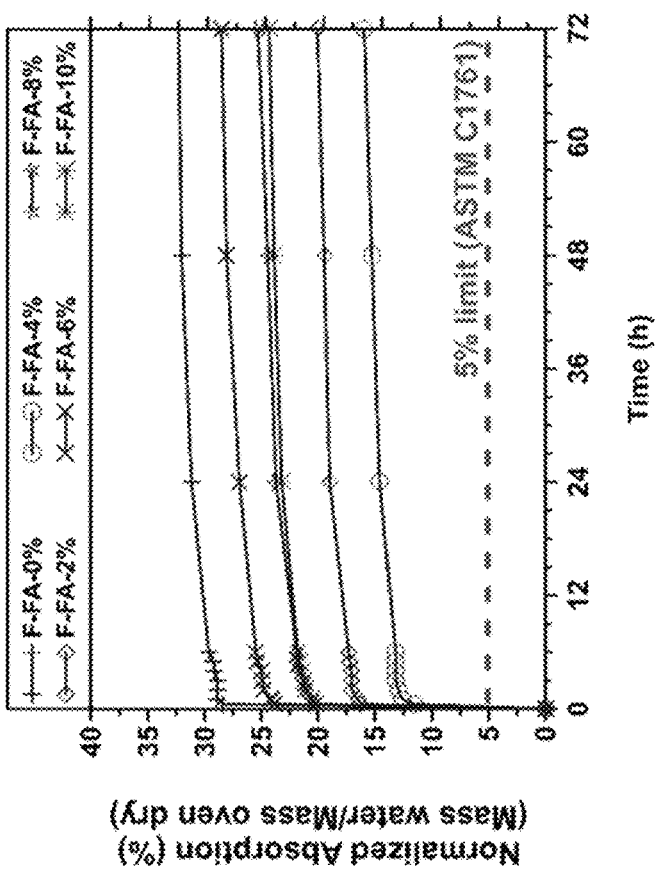

FIGS. 35A and 35B show the water absorption of F-FA and C-FA LWA, respectively, over a 72 hour period. All the LWA had a 72 hour water absorption of greater than 5%, as required by ASTM C 1761 for a LWA to be used for internal curing of concrete. The first water absorption measurement was made 30 min after soaking the LWA in water. As can be seen for both types of LWA, more than 70% of the 72 hour water absorption occurred in the first 30 min. This observation demonstrates the highly connected pore structure of LWA with a high number of capillary pores that led to rapid and efficient water absorption.

For F-FA LWA (FIG. 35A), the 72 hour water absorption order was as follows: F-FA 0%>F-FA 6%>F-FA 8%>F-FA 10%>F-FA 2%>F-FA 4%. Comparing the water absorption for F-FA 0% to other F-FA LWA suggests that the addition of NaOH to the LWA decreased the absorption capacity of the LWA. The same behavior is also observed in C-FA LWA (FIG. 35B). The water absorption order of C-FA LWA was as follows: C-FA 0%>C-FA 6%>C-FA 10%>F-FA 8%>C-FA 2%>C-FA 4%. C-FA LWA showed a higher water absorption capacity compared to the respective F-FA LWA with the same NaOH concentration. This behavior could be related to a smaller number of closed pores available in the microstructure of C-FA LWA so that water absorption through the connected pores could be higher.

Figure 36B:
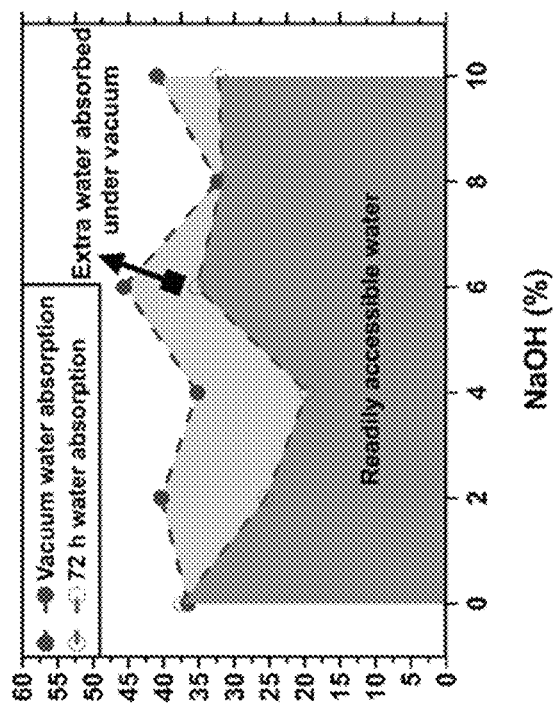
Figure 36A:
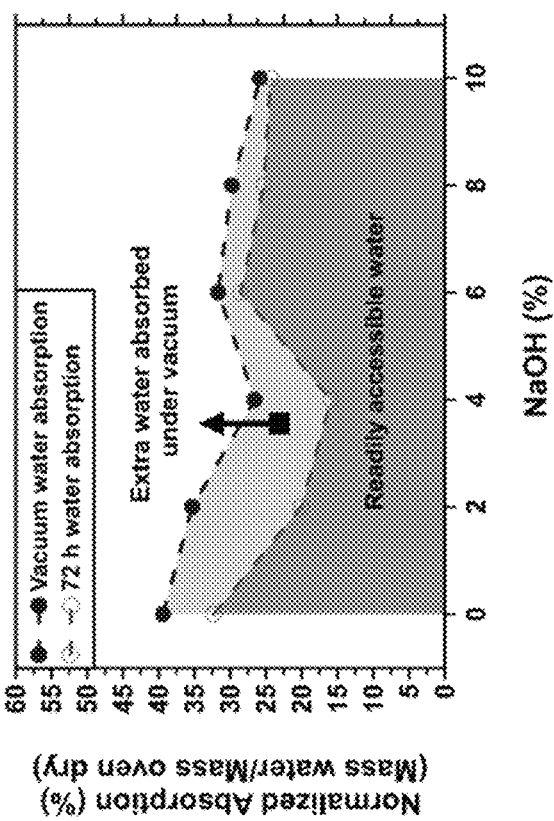

FIGS. 36A and 36B show a comparison between the vacuum and 72 hour water absorption for F-FA and C-FA LWA. The vacuum water absorption shows the maximum possible water absorption for the LWA, whereas the 72 hour water absorption is the value that is usually used in practice. The upper area shown on the figure demonstrates the amount of extra water absorbed by the LWA under vacuum compared to the 72 hour water absorption. The extra amount of water could not be absorbed through capillary suction of the pores in the LWA during the 72 hour period. In theory, if the LWA is soaked in water for an infinite amount of time, the time dependent absorption should approach the vacuum water absorption. On the other hand, differences between the vacuum and 72 hour water absorption indicates that not all the pores could be filled with water during the 72 hour period. This could be caused by the presence of trapped gas in the pores during water absorption, which can delay the absorption mechanism in the LWA. For F-FA LWA, the upper area in FIGS. 36A and 36B, which is the difference between the 72 hour and vacuum water absorption, got smaller at higher NaOH concentrations (F-FA 6%, F-FA 8%, and F-FA 10%), meaning the vacuum and 72 hour water absorption values were becoming closer in value. In contrast, the difference between vacuum absorption and 72 hour absorption showed a variable behavior as a function of NaOH for C-FA LWA. The 72 hour absorption of both F-FA and C-FA LWA showed that the addition of NaOH up to 4% decreased the absorption but beyond this amount the absorption sharply increased and remained relatively constant from 6% to 10%. This trend could be related to the formation of liquid phase, which is promoted by the amount of NaOH in LWA. The liquid phase forms on the surface of LWA, which could potentially acts as a barrier for LWA water absorption. When the NaOH concentration passed 4%, rearrangement of pores in the excessive liquid phase (formed by higher NaOH concentration) that had a lower viscosity enabled higher 72 h water absorption.

Porosity

Figures 37A, 37B:
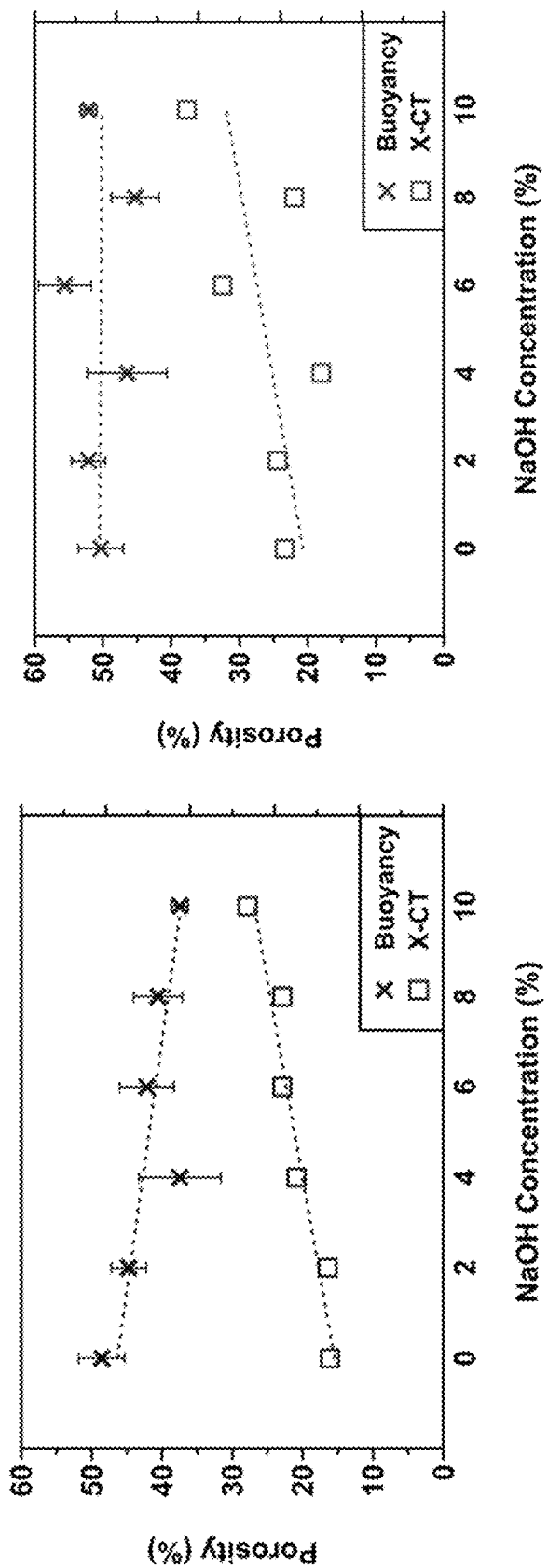

FIGS. 37A and 37B show the porosity of the open or connected porosity of F-FA and C-FA LWA, respectively, obtained using buoyancy and XCT techniques. The open porosity should follow the trend that was observed for vacuum absorption. This is because open porosity refers to the volume percentage of the pores that are capable of absorbing water as measured by vacuum absorption (see FIGS. 34A and 34B).

As can be seen from FIG. 37A, the buoyancy open porosity decreased for F-FA LWA as the NaOH concentration increased exhibiting a behavior similar to that of the vacuum absorption. In other words, the addition of NaOH to F-FA LWA led to an increase of closed pores. For C-FA LWA, the buoyancy open porosity values also showed the same trend as did the vacuum absorption, demonstrating the randomness of the pore structure during sintering. C-FA 6% had the highest average open porosity, equal to 55.8%.

The empty square symbols represent the open porosity obtained through XCT. It should be noted that XCT scanning produced a voxel size of about 19 μm; therefore, any pores with size below that value were not distinguishable in segmentation, and thus were not reflected in the measured porosity. As a result, the porosity measured through XCT for both F-FA and C-FA LWA had lower values than those obtained through the buoyancy method. The difference between the open porosity values obtained through these two methods indicates the porosity contribution from the pores smaller than 19 μm. Moreover, it should be noted that for the porosity obtained by XCT to be comparable with the buoyancy porosity, the XCT open porosity values are shown in FIGS. 37A and 37B. For this purpose, the closed porosity was calculated and deducted from the total porosity to obtain the open porosity through the XCT method. To obtain the closed porosity, first, in the segmented solid dataset the inner enclosed voxels (i.e., voxels associated with pore phase that are not finding any path to touch the VOI surface) were filled (added to the dataset) using the available function in the Dragonfly software. Next, the obtained dataset was subtracted from the segmented solid dataset to only obtain the closed pore volume. Finally, the volume of closed pores was divided by the VOI's volume to obtain the closed porosity. The maximum closed porosity measured by XCT for all the LWA was that of F-FA 2%, which was equal to 1.1%. For F-FA LWA, the general trend suggests that increasing the NaOH concentration increased the porosity obtained through XCT. This is opposite to the trend observed for total porosity measured through the buoyancy method. The XCT porosity trend implies the formation of larger pores (in the category of >19 μm) in the LWA that were distinguishable by XCT. Interestingly, the measured XCT porosity for C-FA LWA followed the same point-by-point trend as the total open porosity obtained through the buoyancy method. At the same time, the general trend for the XCT porosity was to increase as the amount of NaOH increased. This could be related to the formation of larger pores that were distinguishable by the XCT method.

The difference between buoyancy and XCT porosity indicates that how the porosity as measured by XCT depends on the voxel size, since pores smaller than one voxel would not contribute to the XCT porosity. More discussion on the porosity in different pore categories is provided below.

Water Desorption Behavior

Figures 38A, 38B:
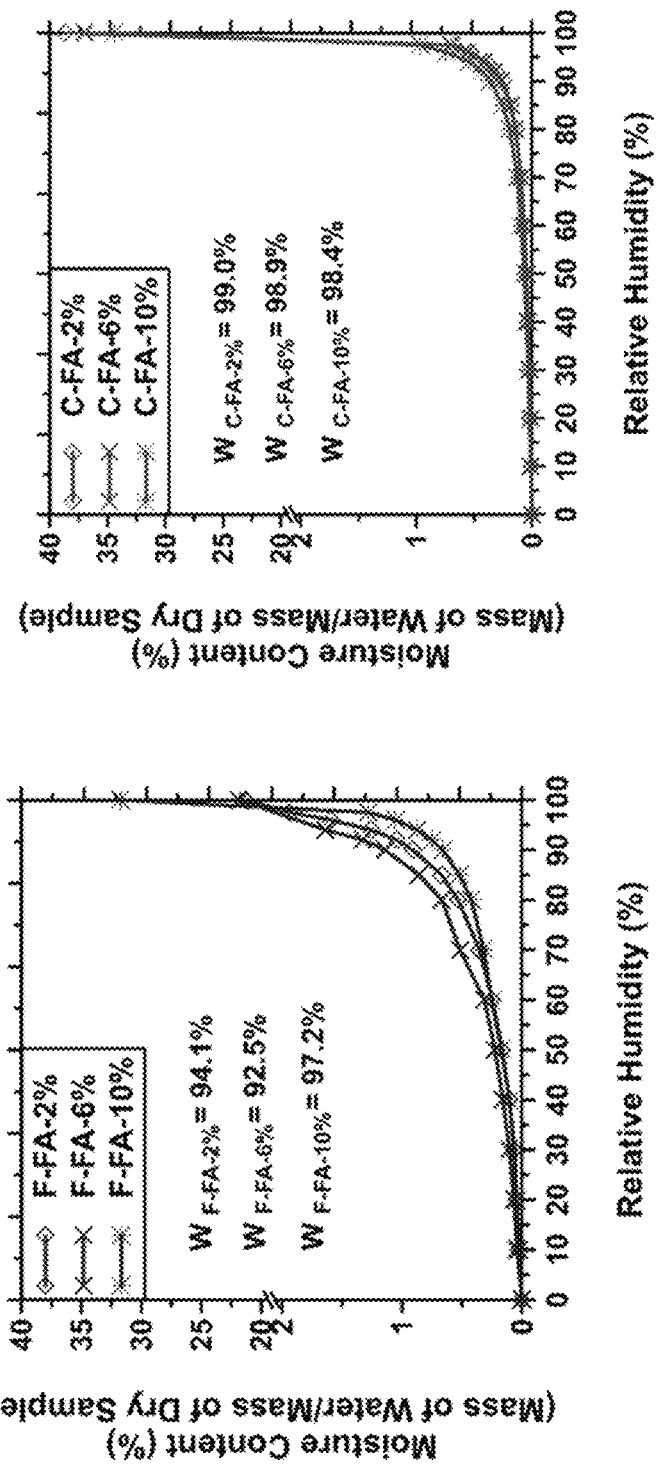

The water desorption behavior of a LWA is particularly important if the LWA is to be used for the internal curing of the concrete. The desorption isotherm can indicate how water is released from the LWA pore structure to the concrete matrix during the concrete self-desiccation period. FIGS. 38A and 38B show the desorption isotherms for F-FA and C-FA LWA with 2%, 6%, and 10% NaOH concentration. According to ASTM C1761, the LWA must release more than 85% of its absorbed water at 94% RH. For F-FA LWA (FIG. 38A), all the LWA released more than 92% of their absorbed water at 94% RH, in the following order:

F-FA 10%>F-FA 2%>F-FA 6%. The coarser the pore structure of LWA (in the range of less than 50 nm), the easier it will be for the LWA to release the absorbed water as the RH decreases. This is because larger pores have lower capillary suction and so less ability to hold on to the absorbed water. Accordingly, it appears that the F-FA 10% had a coarser pore structure compared to F-FA 2%, and F-FA 2% had a coarser pore structure compared to F-FA 6%. More discussion on the pore size distribution of the LWA is provided below.

All C-FA LWA (FIG. 38B) released more than 98% of their absorbed water as the RH fell below 94. The C-FA LWA had very similar desorption isotherms indicating that these LWA should have a similar pore structure in the range of less than 50 nm pore size. A general comparison between F-FA LWA and C-FA LWA suggests that C-FA LWA released more of its absorbed water than did F-FA LWA as the RH decreased. Accordingly, it can be inferred that C-FA LWA had a coarser pore structure compared to F-FA LWA.

Pore Size Distribution

To characterize the pore structure of the LWA, a combination of DVSA and XCT was used. DVSA combined with the Kelvin-Young-Laplace equation can be used to obtain the distribution of pores smaller than 50 nm. Moreover, using this technique the normalized volume pores in the macro pore region i.e., pores greater than 50 nm can be obtained. XCT was used to characterize the porosity and distribution of the pores greater than 19 μm. In the following sections, first, using a combination of DVSA and XCT the porosity share distribution of the LWA is characterized. Next, using DVSA the pore size distribution in the range of pores smaller than 50 nm is discussed. Finally, using the XCT the pore size distribution of the LWA in the range of pores greater than 19 μm is characterized.

Porosity Share Distribution

Figure 39B:
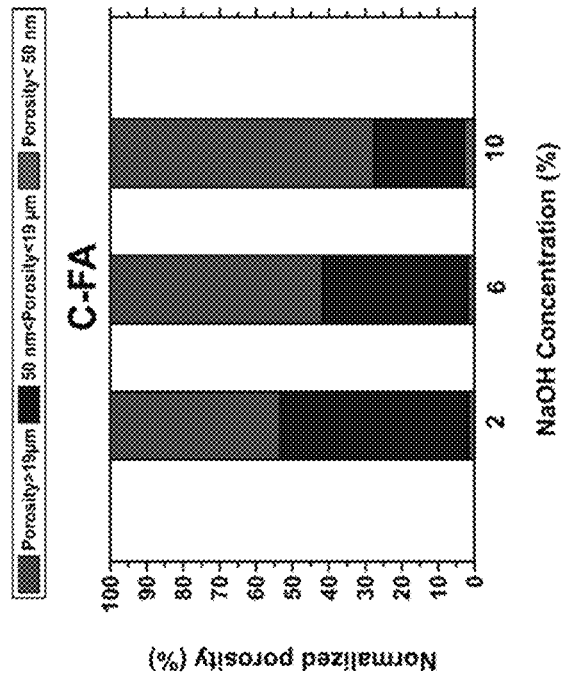
Figure 39A:
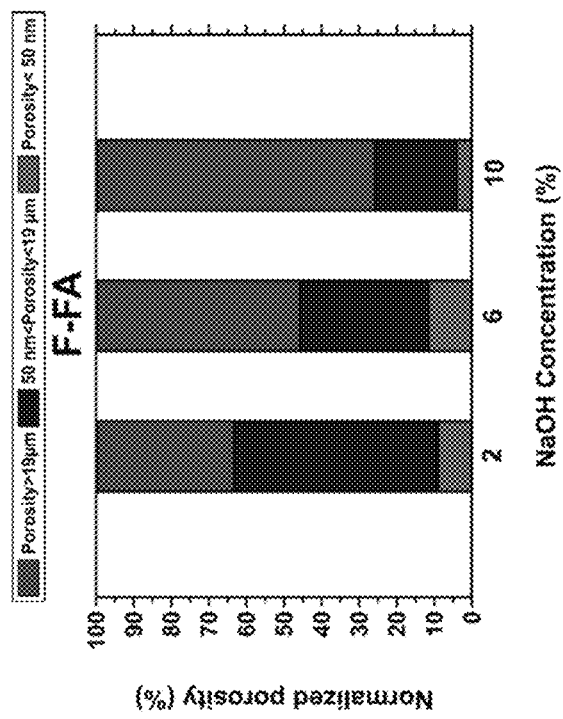

FIGS. 39A and 39B show the normalized porosity for three pore size categories: greater than 19 μm, between 19 μm and 50 nm, and less than 50 nm. In this case, "normalized" means that the sum of these three porosities equals 100%. The normalized porosity of LWA in the range of pores smaller than 50 nm can be obtained according to Equation 13. The normalized porosity for the pores greater than 19 μm was obtained according to Equation 14. Finally, normalized porosity for the pores between 50 nm and 19 μm was obtained using Equation 15.

$$\text{Normalized porosity}_{(<50\ nm)} = \quad \text{Equation 13}$$

$$\frac{(1 - \text{Moisture content @ 97.5\%}}{RH/\text{Moisture content @ }SSD)} * 100\%$$

$$\text{Normalized porosity}_{(>19\ \mu m)} = \frac{XCT\ \text{porosity}}{\text{Buoyancy porosity}} * 100\% \quad \text{Equation 14}$$

$$\text{Normalized porosity}_{(50\ nm<<19\ \mu m)} = 100\% - \quad \text{Equation 15}$$

$$\text{Normalized porosity }(<50\ nm) + \text{Normalized porosity}_{(>19\ \mu m)}$$

As can be seen for F-FA LWA FIG. 39A, the porosity originating from pores smaller than 50 nm constituted the smallest portion of the normalized total porosity. This porosity type was the largest for F-FA 6% and the smallest for F-FA 10% with 11.5% and 4% normalized porosity, respectively. As the NaOH concentration increased, the intermediate porosity share (i.e., the pores bigger than 50 nm and smaller than 19 μm) decreased, while the normalized porosity of the pores greater than 19 μm increased (macropore region). This observation demonstrated the effect of NaOH as the fluxing agent on the liquid phase formation and its viscosity and consequently the pore structure of the LWA. Indeed, the addition of higher NaOH concentration coarsened the pore structure of the LWA. For all C-FA LWA (FIG. 39B), the porosity fraction of the pores smaller than 50 nm was even smaller than that of F-FA LWA and had a contribution of less than 3% to the normalized total porosity. In other words, the majority (more than 97%) of the pores belong to the macropore region (i.e., pores greater than 50 nm). This observation suggested that macropores in C-FA LWA were mostly responsible for the 72 hour water absorption. The same trend as observed in F-FA LWA was seen for C-FA LWA for intermediate porosity and porosity originating from the pores greater than 19 μm.

Pore characterization through DVSA

The desorption isotherms obtained through DVSA (see FIGS. 38A and 38B) can be used to characterize the pore size distribution of a porous material based on the change in RH and desorbed water from the pore. The Kelvin-Young-Laplace equation correlates the pore radius to RH in a water-filled pore according to Equation 16, where y is water surface tension, RH is relative humidity, $V_m$ is molar mass, R is gas constant i.e., 8.314 J·K$^{-1}$·mol$^{-1}$, and T is temperature (K).

$$R = \frac{2\gamma}{\text{Ln}(RH)} * \frac{V_m}{RT} \quad \text{Equation 16}$$

Figure 40B:
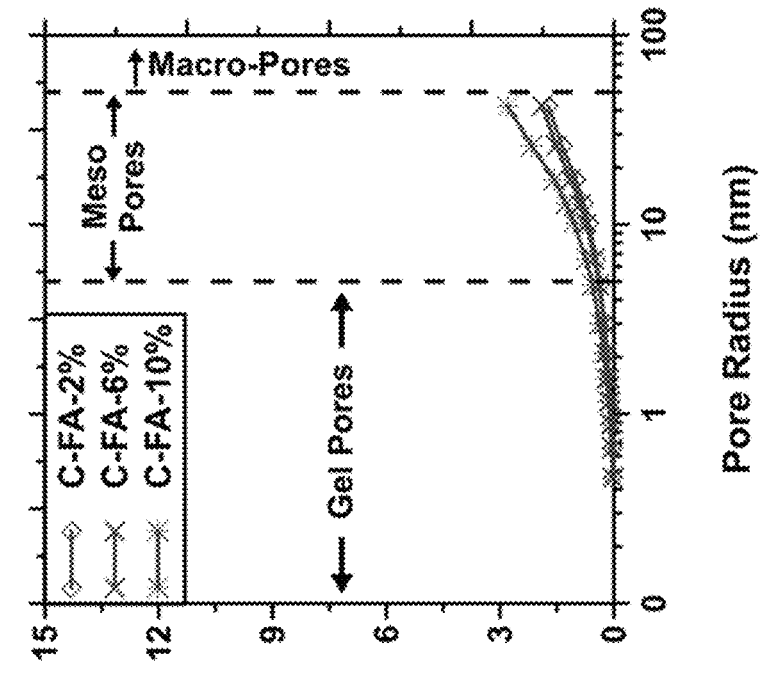
Figure 40A:
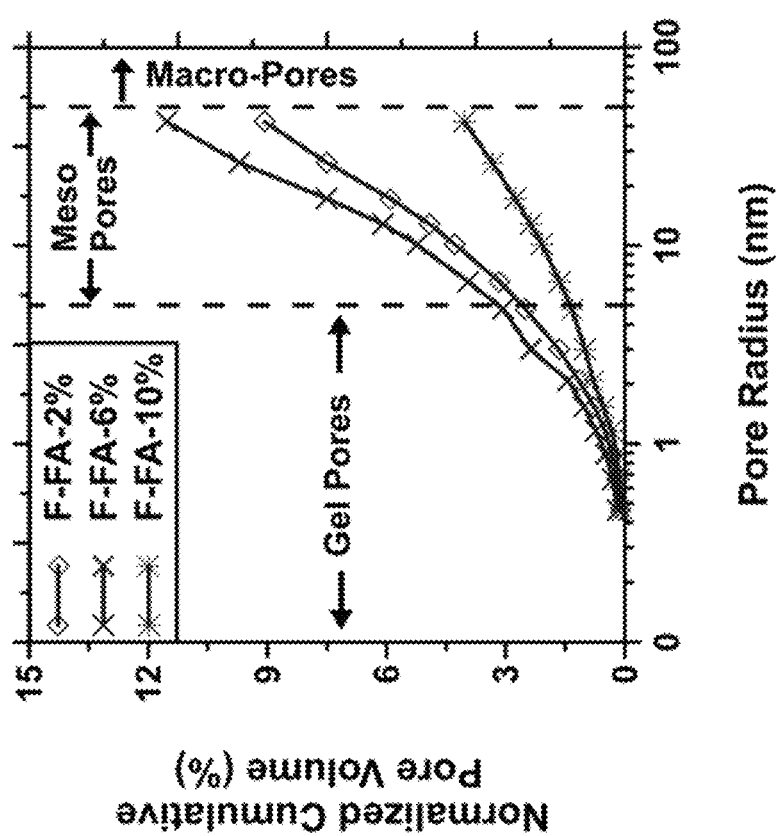

FIGS. 40A and 40B show the pore size distribution for F-FA and C-FA LWA. The pores are categorized in the range of gelpores (less than 5 nm), mesopores (between 5 nm and 50 nm) and macropores (greater than 50 nm). FIG. 40A shows that F-FA 6% had the finest pore structure where 3% of the pores were placed in the gelpore region, about 9% of the pores were in the mesopore region, and more than 88% of the pores were in the macropore region. F-FA 2% had a slightly coarser pore structure compared to that of F-FA 6%, where more than 91% of the pore volume were in the macro pore region. However, increasing the NaOH concentration to 10% had a significant effect on the F-FA LWA pore structure. F-FA 10% had the coarsest pore structure, where the distribution of the pores shifted from the gelpore and mesopore categories toward the macropore category. For F-FA 10%, more than 96% of the pores were placed in the macropore category, indicating that addition of high NaOH concentration promotes the formation of macropores, easing water release from the LWA.

The pore size distribution for the C-FA 2%, 6%, and 10%, shown in FIG. 40B, indicated a very similar pore structure with different NaOH concentrations in the gelpores and mesopores regions. It appears that more than 97% of the pores are in the macropore region. The addition of NaOH to the C-FA LWA has a minimal impact on the pore structure in the gel and mesopore regions. This could be related to low viscosity of liquid phase in the C-FA LWA due to high CaO content that allowed easier expansion of the gas filled pores during sintering and forming more larger pores As such, the majority of the pores (more than 97%) were macropores.

A comparison between F-FA and C-FA LWA suggests a finer pore structure for F-FA LWA. The chemical composition of fly ash significantly affects the viscosity of the LWA during the sintering process. Since F-FA LWA had only 3.2% CaO, higher viscosity values were obtained for the solid-liquid phase in the LWA compared to C-FA LWA (which had 18.8% CaO), leading to a smaller pore size formed during the sintering.

Pore Characterization Through XCT

Figure 41A:
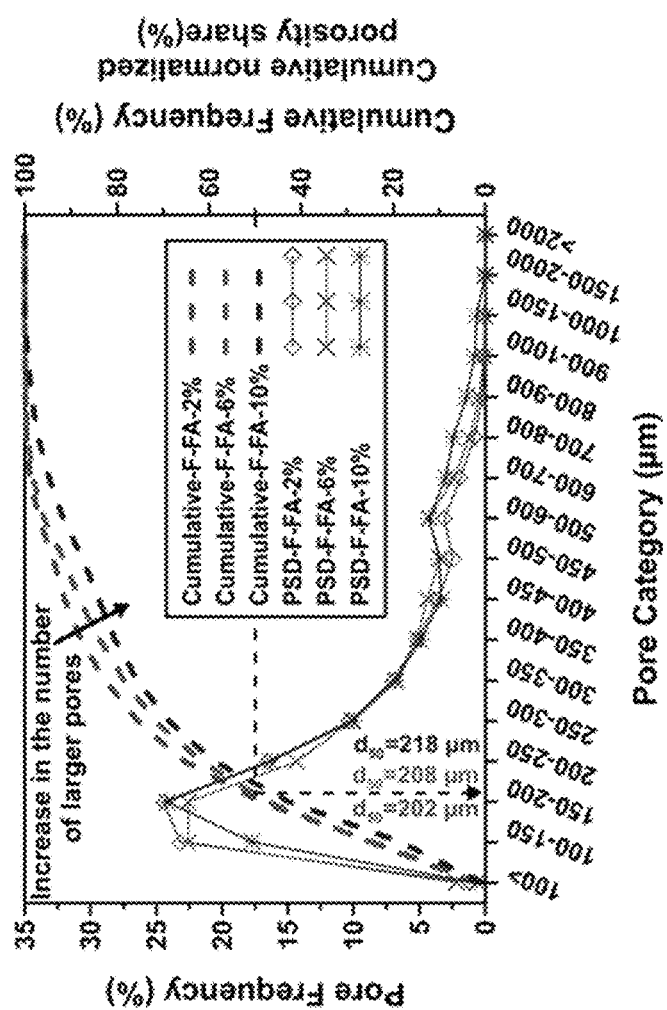

FIG. 41A shows the pore size distribution for F-FA LWA obtained through XCT, with only pores with size greater than 19 μm measured. As can be seen from the cumulative distribution of the number of pores (see FIG. 41A), $d_{50}$ (i.e., the pore size below/above which 50% of the pores by volume are smaller/larger) for F-FA 2%, F-FA 6%, and F-FA 10% were 202 μm, 208 μm, and 218 μm, respectively. Based on the cumulative distribution of the pores for F-FA LWA, it can be inferred that increasing the NaOH concentration led to the development of larger pores in this LWA. This is mainly due to the formation of a higher amount of liquid phase with lower viscosity in the LWA during sintering that led to the formation of larger pores and coalescence of small pores to form larger pores. FIG. 41B shows the cumulative normalized porosity fraction of different pore categories in F-FA LWA. $D_{50}$ shown on the figure is defined as the pore size at which cumulative normalized porosity reaches 50%. For F-FA 2%, F-FA 6%, and F-FA 10%, the $D_{50}$ was 500 μm, 534 μm, and 714 μm, respectively. The increase in $D_{50}$ with the increase in the NaOH concentration confirmed the formation of larger pores in the F-FA LWA.

As can be seen from FIG. 42A, the $d_{50}$ value for all the C-FA LWA samples was about 213 μm. Based on the cumulative distribution of the pores, it can be observed that among the C-FA LWA samples, C-FA 2% had a higher frequency of pores smaller than 300 μm in its pore structure compared to C-FA 6% and C-FA 10%. On the other hand, C-FA 6% and C-FA 10% had a very comparable pore frequency distribution in their pore structure with some higher pore frequency for C-FA 6% in the 500 μm to 600 μm pore size category. According to FIG. 42B, the $D_{50}$ for the C-FA 2%, C-FA 6%, and C-FA 10%, were 745 μm, 614 μm, and 738 μm, respectively. In contrast to the F-FA LWA, where a clear trend between the NaOH concentration and the value of $D_{50}$ was revealed, there was no clear trend between these two parameters for C-FA LWA. According to $D_{50}$ obtained for C-FA LWA (FIG. 42B) C-FA 2% and C-FA 10% had larger pores forming their pore structure compared to C-FA6%.

Table 10 shows the calculated permeability coefficients for F-FA and C-FA LWA in x, y, and z directions for the pores greater than 19 μm. The permeability coefficient can be used as an indication of pore connectivity in the LWA and to understand the effect of NaOH concentration on the development of pore structure. For F-FA LWA, as the NaOH concentration increased, the permeability coefficients increased in all directions. This observation further indicates that higher NaOH concentrations led to the formation of larger pores that are highly connected, leading to a higher permeability coefficient. The average permeability (averaged over three directions) for F-FA 6% was 533% higher than that of F-FA 2%, and the F-FA 10% average permeability was 429% higher than that of F-FA 6%.

The same trend of permeability coefficient was observed for C-FA LWA. The average permeability for C-FA 6% was 102% higher than that of C-FA 2%, and C-FA 10% average permeability was 26% higher than that of C-FA 6%. The effect of NaOH on increasing the permeability coefficient for C-FA was less significant compared to that of F-FA. Comparing the permeability coefficients between F-FA LWA and C-FA LWA indicates that all C-FA LWA samples had a higher permeability coefficient compared to the comparable F-FA LWA. This observation may justify the higher water absorption results obtained (see FIG. 34B) for C-FA LWA.

TABLE 10

The predicted permeability coefficient of F-FA and C-FA LWA in x, y, and z directions obtained through XCT based upon single measurement.
Permeability Coefficient ($10^{-8} \times m^2$)

| Sample | $K_{xx}$ | $K_{yy}$ | $K_{zz}$ | Average in x, y, and z directions |
|---|---|---|---|---|
| F-FA 2% | 0.7 | 1.3 | 0.4 | 0.8 |
| F-FA 6% | 3.1 | 8.7 | 3.4 | 5.1 |
| F-FA 10% | 27.0 | 16.6 | 36.7 | 26.8 |
| C-FA 2% | 44.1 | 24.8 | 19.9 | 29.6 |
| C-FA 6% | 60.0 | 55.5 | 64.4 | 60.0 |
| C-FA 10% | 64.3 | 49.4 | 112.9 | 75.5 |

Summary and Conclusions

The present invention characterized the engineering properties and pore structure of spherical F-FA (low calcium FA) and C-FA (high calcium FA) LWA that were prepared through sintering using NaOH as the fluxing agent. The LWA were prepared following a thermodynamics-guided framework for LWA production. Properties including specific gravity, vacuum and time-dependent water absorption, porosity, water desorption, pore size distribution, and permeability of the LWA were characterized.

The specific gravity measurements demonstrated that the OD specific gravity for F-FA LWA ranged from 1.24 to 1.45 and C-FA from 1.22 to 1.41. Therefore, all the LWA were categorized as lightweight according to EN13055 due to having an OD specific gravity of less than 2. The OD specific gravity of the F-FA LWA slightly increased by with increasing NaOH concentration, which was due to addition of solid NaOH to the LWA. However, the OD specific gravity for the C-FA LWA samples showed no significant change upon addition of NaOH.

The vacuum water absorption capacity, which indicates the maximum absorption capacity for the LWA by filling all the accessible pores, showed that for F-FA LWA, vacuum absorption linearly decreased by 1.4% per percentage of NaOH addition. However, the C-FA LWA vacuum absorption showed a variable trend as the NaOH increased. The linear and variable behavior for vacuum water absorption of F-FA and C-FA LWA could be attributed to the low and high calcium content in the fly ashes, respectively. The 72 hour water absorption for all the LWA was well above 5% (the ASTM C1761 requirement for LWA to be used in concrete), showing great potential for these LWA to be used for concrete internal curing. The 72 hour absorption of both F-FA and C-FA LWA indicated that the addition of NaOH up to 4% decreased the absorption and beyond this point the absorption sharply increased and by further NaOH addition reached a plateau. This trend could be related to formation of a liquid phase in the LWA. By addition of NaOH the liquid phase starts to form on the surface of LWA, which acts as a barrier for water absorption in the LWA. When the NaOH concentration increased beyond 4%, potential rearrangement of pores in the excessive liquid phase in LWA enabled higher 72 hour water absorption. This observation indicates that high concentrations of NaOH may not be required for production of FA-LWA and a NaOH concentration between 0% and 2% may result in the desired 72 h water absorption. The difference between the vacuum and 72 hour water absorption showed that not all the open pores could be filled with water in 72 hour. This observation can be related to the fact that some of the pores were filled with gas, which slowed down the capillary absorption of the LWA.

The total open porosity obtained through the buoyancy method followed a trend similar to that of the vacuum water absorption for both F-FA and C-FA LWA. However, open porosity measured using XCT demonstrated an increasing trend as the NaOH concentration increased. Increase in the XCT porosity was due to the formation of larger pores in the LWA that became distinguishable by XCT, which only measured pores of size 19 μm or larger.

The desorption isotherms showed that both F-FA and C-FA LWA released more than 85% of their absorbed water at 94% RH, which makes them suitable for concrete internal curing applications according to ASTM C 1761. The DVSA method along with the Kelvin-Young-Laplace equation was used to characterize the pore structure of the LWA in the range of pores less than 50 nm. For F-FA LWA, increasing the NaOH concentration shifted the pores to the macropore region, which was due to formation of higher liquid phase content upon addition of higher NaOH concentration. For all C-FA LWA, more than 96% of the pores fell in the macropore region, which indicated that mostly macropores are responsible for water absorption of the LWA.

The LWA pore structure characterization indicated that the normalized porosity for F-FA LWA in the range of pores smaller than 50 nm ranged from 4% to 11.5%, while for C-FA LWA this normalized porosity ranged from 1.7% to 2.8%, suggesting a finer pore structure for F-FA LWA compared to C-FA LWA. The resulting finer structure for F-FA LWA in comparison with C-FA LWA could be related to higher solid-liquid phase viscosity that makes pore expansion and movement harder. In addition, it was found that increasing the NaOH concentration for both types of LWA increased the normalized porosity in the range of pores greater than 19 μm.

The pore size distribution obtained through XCT indicated that for F-FA LWA, the frequency of large pores increased as the NaOH concentration increased. For F-FA 2%, F-FA 6%, and F-FA 10%, the $d_{50}$ and $D_{50}$ values increased, implying the formation of larger pore. On the other hand, for C-FA 2%, C-FA 6%, and C-FA 10%, $d_{50}$ was constant and about 213 11 m, while the $D_{50}$ indicated a coarser pore structure for C-FA 2% and C-FA 10% compared to C-FA 6%. The observed randomness in the pore structure of C-FA LWA may be attributed to the higher calcium content in the fly ash.

The calculated permeability coefficient for both C-FA and F-FA LWA in three directions, using a pore-throat network derived from the XCT data, increased as the amount of NaOH increased, suggesting that the increase in pore connectivity allowed easier water movement in the LWA pore structure. However, LWA with low NaOH concentrations (0% and 2%) had high enough 72 hour water absorption which implies the permeability was probably high enough to allow sufficient water penetration and absorption.

The inventors determined that a combination of techniques might be used to characterize the pore structure of the porous materials. DVSA was used to characterize the pores smaller than 50 nm (gel and mesopores) while XCT was used to characterize the macropores greater than 19 μm. Using XCT technique and depending on the XCT instrument resolution, pores greater than 500 nm might be characterized. However, to characterize the pores that are left out of these two techniques, Mercury Intrusion Porosimetry (MIP) could be used.

The present results outlined above suggest that a small concentration of NaOH (between 0% and 2%) might be used to produce FA-LWA with engineering properties desired for internal curing in concrete. Higher NaOH concentrations might result in improved engineering properties, but the environmental impact and cost associated with the use of NaOH might suggest using smaller doses of this fluxing agent.

FA-LWA might be used for applications such as geotechnical filling, lightweight concrete production, and internal curing of concrete. As such, scaling up the production of spherical FA-LWA using a pelletizer (to produce spherical fresh pellets) and rotary furnace to bring the process closer to pilot-scale can be used.

It will be further understood that various changes in the details, materials, and arrangements of the parts which have been described and illustrated in order to explain the nature of this invention may be made by those skilled in the art without departing from the scope of the invention as expressed in the following claims.

We claim:

1. A lightweight aggregate comprised of a waste coal combustion ash, the lightweight aggregate comprising:
    (a) a specific gravity between about 1.22 and about 1.45; and
    (b) a normalized porosity of pores smaller than 50 nm between about 1.7% and about 11.5%.

2. The lightweight aggregate according to claim 1, wherein the aggregate comprises pores having a diameter between 1 nm and 3 mm.

3. The lightweight aggregate according to claim 1, wherein the waste coal combustion ash comprises fly ash.

4. The lightweight aggregate according to claim 3, wherein the fly ash comprises low calcium fly ash.

5. The lightweight aggregate according to claim 4, wherein, for the pores smaller than 50 nm, the normalized porosity is between about 4% and about 11.5%.

6. The lightweight aggregate according to claim 3, wherein the fly ash comprises high-calcium fly ash.

7. The lightweight aggregate according to claim 6, wherein, for the pores smaller than 50 nm, the normalized porosity is between about 1.7% and about 2.8%.

8. The lightweight aggregate according to claim 1, wherein the lightweight aggregate has a water absorption greater than 5% over a 72 hour period.

9. The lightweight aggregate according to claim 1, wherein the lightweight aggregate further comprises between 0% and about 10% sodium hydroxide by weight.

10. The lightweight aggregate according to claim 1, wherein the waste coal combustion ash comprises bottom ash.

11. The lightweight aggregate according to claim 10, wherein the waste coal combustion ash comprises low-calcium bottom ash.

12. The lightweight aggregate according to claim 10, wherein the waste coal combustion ash comprises high calcium bottom ash.

13. The lightweight aggregate according to claim 1, further a normalized porosity of pores greater than 50 nm greater than 97%.

* * * * *